(12) United States Patent
Won et al.

(10) Patent No.: US 12,300,135 B2
(45) Date of Patent: *May 13, 2025

(54) DISPLAY APPARATUS INCLUDING DISPLAY PANEL HAVING FLAT MODE AND BENT MODE, AND METHOD OF CONTROLLING THE SAME

(71) Applicant: Samsung Display Co., Ltd., Yongin-Si (KR)

(72) Inventors: Byeonghee Won, Yongin-si (KR); Jungtae Park, Yongin-si (KR); Youngseok Seo, Yongin-si (KR)

(73) Assignee: Samsung Display Co, Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,596

(22) Filed: Jul. 24, 2023

(65) Prior Publication Data
US 2023/0377498 A1 Nov. 23, 2023

Related U.S. Application Data

(63) Continuation of application No. 17/530,348, filed on Nov. 18, 2021, now Pat. No. 11,710,433.

(30) Foreign Application Priority Data

Mar. 24, 2021 (KR) .......................... 10-2021-0038184

(51) Int. Cl.
*G09G 3/00* (2006.01)
*F16M 11/18* (2006.01)
*G09F 9/30* (2006.01)

(52) U.S. Cl.
CPC ............. *G09G 3/035* (2020.08); *F16M 11/18* (2013.01); *G09F 9/301* (2013.01); *G09G 2354/00* (2013.01)

(58) Field of Classification Search
CPC ........ F16M 11/18; F16M 11/00; G09F 9/301; G09F 19/02; G09F 9/30;
(Continued)

(56) References Cited

U.S. PATENT DOCUMENTS 9,123,290 B1 * 9/2015 Cho ...................... G06F 1/1652
9,202,395 B2 12/2015 Cho et al.
(Continued)

FOREIGN PATENT DOCUMENTS

KR 10-2013-0050794 A 5/2013
KR 10-1319543 B1 10/2013
(Continued)

OTHER PUBLICATIONS

Greta D'angelo (2014). 3D printed multi material fractal with negative poisson's ratio.(https://www.youtube.com/watch?v=5wpRszZZhYQ).

*Primary Examiner* — Richard J Hong
(74) *Attorney, Agent, or Firm* — Innovation Counsel LLP

(57) ABSTRACT

A display apparatus is disclosed that includes a display panel and a controller. The display panel includes a first edge extending in a first direction, a second edge extending in a second direction that intersects the first direction, and a display area where an image is displayed. The controller is configured to obtain information to bend the display panel and, in response, to bend the display panel to a bent display panel. In the bent display panel, the first edge has a first display-panel curvature and the second edge has a second display-panel curvature.

14 Claims, 39 Drawing Sheets

(58) Field of Classification Search
CPC ....... G09G 2320/0261; G09G 2354/00; G09G 3/035; G09G 3/3225; H05K 5/02; H10K 59/40; H10K 59/1213; H10K 50/844; G06F 1/1601; G06F 1/1652; G02F 1/133; G02F 1/133308
See application file for complete search history.

(56) References Cited

U.S. PATENT DOCUMENTS

| | | | |
|---|---|---|---|
| 9,406,703 | B2 | 8/2016 | Kwon et al. |
| 9,891,442 | B2 | 2/2018 | Gu et al. |
| 10,031,360 | B2 | 7/2018 | An et al. |
| 10,978,669 | B2 | 4/2021 | Lee et al. |
| 2010/0188422 | A1 | 7/2010 | Shingai et al. |
| 2013/0114193 | A1 | 5/2013 | Joo et al. |
| 2013/0155655 | A1* | 6/2013 | Lee .................. G02F 1/133 361/752 |
| 2014/0004906 | A1 | 1/2014 | Chi et al. |
| 2014/0118910 | A1 | 5/2014 | Sung et al. |
| 2014/0226266 | A1* | 8/2014 | Kang .................. H05K 5/02 361/679.01 |
| 2014/0268584 | A1* | 9/2014 | Song .................. G06F 1/1601 361/728 |
| 2014/0314999 | A1* | 10/2014 | Song .................. G09F 9/30 428/174 |
| 2015/0009635 | A1* | 1/2015 | Kang .................. G09F 19/02 361/749 |
| 2015/0029166 | A1 | 1/2015 | Park et al. |
| 2015/0223358 | A1 | 8/2015 | Nam et al. |
| 2016/0192519 | A1* | 6/2016 | Song .................. F16M 11/00 361/679.01 |
| 2016/0268352 | A1 | 9/2016 | Hong et al. |
| 2016/0353592 | A1* | 12/2016 | Li .................. G02F 1/133308 |
| 2018/0114825 | A1 | 4/2018 | Hong et al. |
| 2019/0198802 | A1* | 6/2019 | Lee .................. H10K 59/1213 |
| 2019/0207155 | A1 | 7/2019 | Lee et al. |
| 2020/0035061 | A1 | 1/2020 | Froy |
| 2020/0073443 | A1 | 3/2020 | Seo et al. |
| 2020/0410906 | A1* | 12/2020 | Chen .................. H10K 59/40 |
| 2022/0199920 | A1* | 6/2022 | Kim .................. H10K 50/844 |

FOREIGN PATENT DOCUMENTS

| | | |
|---|---|---|
| KR | 10-2015-0049822 A | 5/2015 |
| KR | 10-2016-0020039 A | 2/2016 |
| KR | 10-2019-0082362 A | 7/2019 |
| KR | 10-2041883 B1 | 11/2019 |
| KR | 10-2104588 B1 | 4/2020 |
| KR | 10-2144432 B1 | 8/2020 |
| WO | 2016203321 A2 | 12/2016 |

* cited by examiner

DISPLAY APPARATUS INCLUDING DISPLAY PANEL HAVING FLAT MODE AND BENT MODE, AND METHOD OF CONTROLLING THE SAME

CROSS-REFERENCE TO RELATED APPLICATION

This application is a continuation of U.S. patent application Ser. No. 17/530,348, filed on Nov. 18, 2021, which is based on and claims priority under 35 U.S.C. § 119 to Korean Patent Application No. 10-2021-0038184, filed on Mar. 24, 2021, in the Korean Intellectual Property Office, the disclosures of which are incorporated by reference herein in their entireties.

BACKGROUND

1. Field

The present inventive concept relates to a display apparatus and a method of controlling the same.

2. Description of the Related Art

A display apparatus may provide an image to a user by using a display panel. When a display apparatus is a curved TV, the display apparatus may provide an image to a user through a display panel that is concavely curved so that a distance from the user's eyes to the center and both sides of a screen is constant. In this case, a three-dimensional effect of the image may increase. Accordingly, the immersion of the user who watches the image may increase, and the user's eye fatigue may decrease.

However, a curved TV may take a lot of space, and a user may feel a screen distortion according to a location where the user watches the curved TV. Also, when a plurality of users watch a curved TV, users other than a user who is located at the center of curvature of the curved TV may feel a screen distortion.

SUMMARY

According to one or more embodiments, a display apparatus includes a display panel including a first edge extending in a first direction, a second edge extending in a second direction that intersects the first direction, and a display area where an image is displayed, and a controller configured to obtain information to bend the display panel, and control the display panel to be bent and display the image by considering the obtained information, wherein, in the bent display panel, the first edge has a first display-panel curvature and the second edge has a second display-panel curvature.

The display area may include a central display area, and a corner display area located between the central display area and a corner where the first edge and the second edge meet each other, wherein, in the bent display panel, the corner display area is bent from the first direction to a third direction that intersects the first direction and the second direction, and is bent from the second direction to the third direction.

The corner display area may include a first corner display area and a second corner display area, wherein, in the bent display panel, the first corner display area includes a first curvature in a cross-section in the first direction, and a second curvature in a cross-section in the second direction, and the second corner display area includes a third curvature in a cross-section in the first direction, and a fourth curvature in a cross-section in the second direction, wherein the first curvature and the third curvature are different from each other.

The information obtained to bend the display panel may include at least one of a first information corresponding to a manipulation of a remote controller connected to the display apparatus, a second information corresponding to a voice signal of a user who watches the image, and a third information based on a type of content included in the image.

The information obtained to bend the display panel may include location information of at least one user who watches the image.

The display apparatus may include a frame assembly located behind the display panel and configured to bend the display panel under control of the controller, wherein the frame assembly includes a first frame extending in the first direction and configured to bend the display panel from the first direction to a third direction that intersects the first direction and the second direction, and a second frame extending in the second direction and configured to bend the display panel from the second direction to the third direction.

The frame assembly may include a plurality of supporters supporting the display panel, extending in the first direction, and spaced apart from one another in the second direction, wherein the first frame is further configured to bend the plurality of supporters from the first direction to the third direction.

The frame assembly may include a plurality of supporters supporting the display panel, extending in the first direction, and spaced apart from one another in the second direction, wherein the second frame is further configured to move at least one of the plurality of supporters in the third direction.

The frame assembly may include a plurality of supporters supporting the display panel, extending in the first direction, and spaced apart from one another in the second direction, wherein the display apparatus further includes a cushion layer between the display panel and the plurality of supporters.

The display panel may include a through-portion passing through the display panel.

According to one or more embodiments, a method of controlling a display apparatus includes displaying an image in a display area of a display panel including a first edge extending in a first direction and a second edge extending in a second direction that intersects the first direction, obtaining information to bend the display panel, and bending the display panel so that he first edge has a first display-panel curvature and the second edge has a second display-panel curvature by considering the obtained information.

The display area may include a central display area, and a corner display area located between the central display area and a corner where the first edge and the second edge meet each other, wherein the bending of the display panel includes bending the corner display area from the first direction to a third direction that intersects the first direction and the second direction, and bending the corner display area from the second direction to the third direction.

The corner display area may include a first corner display area and a second corner display area, wherein the first corner display area includes a first curvature in a cross-section in the first direction and a second curvature in a cross-section in the second direction, and the second corner display area includes a third curvature in a cross-section in the first direction and a fourth curvature in a cross-section in the second direction, wherein the first curvature and the third curvature are different from each other.

The information obtained to bend the display panel may include at least one of a first information corresponding to a manipulation of a remote controller connected to the display apparatus, a second information corresponding to a voice signal of a user who watches the image, and a third information based on a type of content included in the image.

The information obtained to bend the display panel may include location information of at least one user who watches the image.

The method may include bending a first frame located behind the display panel and extending in the first direction, from the first direction to a third direction that intersects the first direction and the second direction, and bending a second frame located behind the display panel and extending in the second direction, from the second direction to the third direction.

The method may include bending, from the first direction to the third direction, a plurality of supporters supporting the display panel, extending in the first direction, and spaced apart from one another in the second direction.

The method may include moving, in the third direction, at least one of a plurality of supporters supporting the display panel, extending in the first direction, and spaced apart from one another in the second direction.

The method may include rotating the display panel using the second direction as an axis.

The method may include changing a shape of a through-portion passing through the display panel.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
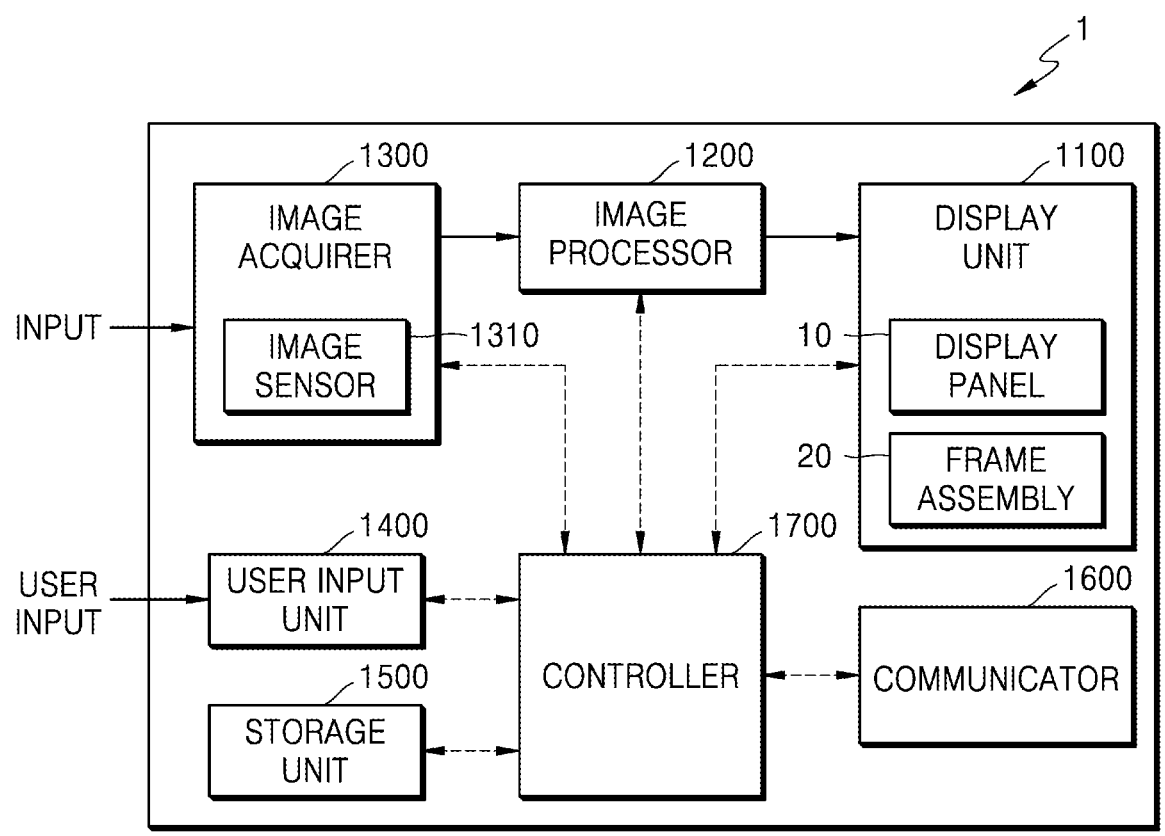
FIG. 1 is a block diagram illustrating a configuration of a display apparatus, according to an embodiment.

One or more embodiments include a display apparatus for controlling a display panel to be bent into various shapes. The various shapes into which the display panel is bent may be determined by considering a location where a user watches, a type of an image that is displayed, and a method of controlling the display apparatus.

Additional aspects will be set forth in part in the description which follows and, in part, will be apparent from the description, or may be learned by practice of the presented embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the word "or" means logical "or" so, unless the context indicates otherwise, the expression "A, B, or C" means "A and B and C," "A and B but not C," "A and C but not B," "B and C but not A," "A but not B and not C," "B but not A and not C," and "C but not A and not B."

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Reference will now be made in detail to embodiments, examples of which are illustrated in the accompanying drawings, and in the drawings, the same elements are denoted by the same reference numerals, and thus a repeated description thereof will be omitted.

Although the terms "first," "second," etc. may be used to describe various elements, these elements should not be limited by these terms. These terms are only used to distinguish one element from another.

It will be further understood that the terms "comprises," "comprising," "includes," and "including" used herein specify the presence of stated features or components, but do not preclude the presence or addition of one or more other features or components.

It will be further understood that, when a layer, region, or component is referred to as being "on" another layer, region, or component, it may be directly on the other layer, region, or component, or may be indirectly on the other layer, region, or component with intervening layers, regions, or components therebetween.

Sizes of elements in the drawings may be exaggerated or contracted for convenience of description. For example, because sizes and thicknesses of elements in the drawings are arbitrarily illustrated for convenience of description, the disclosure is not limited thereto.

When a certain embodiment may be implemented differently, a specific process order may be different from the described order. For example, two consecutively described processes may be performed substantially at the same time or may be performed in an order opposite to the described order.

It will be understood that when a layer, region, or component is referred to as being "connected," the layer, the region, or the component may be directly connected or may be indirectly connected with intervening layers, regions, or components therebetween. For example, when layers, regions, or components are referred to as being "electrically connected," the layers, the regions, or the components may be directly electrically connected, or may be indirectly electrically connected with intervening layers, regions, or components therebetween.

A display apparatus that is an apparatus for displaying a moving image or a still image may be used as a display screen of not only a portable electronic device such as a mobile phone, a smartphone, a tablet personal computer (PC), a mobile communication terminal, an electronic organizer, an electronic book, a portable multimedia player (PMP), a navigation device, or an ultra-mobile PC (UMPC) but also any of various products such as a television, a laptop computer, a monitor, an advertisement board, or an Internet of things (IoT) product. Also, the display apparatus according to an embodiment may be used in a wearable device such as a smart watch, a watch phone, a glasses-type display, or a head-mounted display (HMD). Also, the display apparatus according to an embodiment may be used as a center information display (CID) located on an instrument panel, a center fascia, or a dashboard of a vehicle, a room mirror display replacing a side-view mirror of a vehicle, or a display located on the back of a front seat for entertainment for a back seat of a vehicle.

FIG. 1 is a block diagram illustrating a configuration of a display apparatus 1, according to an embodiment. The display apparatus 1 may include a display unit 1100, an image processor 1200, an image acquirer 1300, a user input unit 1400, a storage unit 1500, a communicator 1600, and a controller 1700.

The display unit 1100 may display an image. In an embodiment, the display unit 1100 may display an image based on an image signal processed by the image processor 1200. In an embodiment, the display unit 1100 may display a digital image. The display unit 1100 may include a display panel 10 and a frame assembly 20. The display panel 10 may display an image. The frame assembly 20 may bend the display panel 10. Accordingly, the display panel 10 may be bent into various shapes.

In an embodiment, the display unit 1100 may display communication interface information supported by the communicator 1600. The controller 1700 may control the display unit 1100 to display the communication interface information stored in the storage unit 1500 to be displayed on the display panel 10.

The image processor 1200 may process an image signal received from the outside. The image processor 1200 may perform preset various image processing operations on the image signal. The image processor 1200 may output an image signal obtained after the image processing operations to the display unit 1100, so that an image is displayed on the display panel 10.

The image processor 1200 may include an image receiver (not shown) that receives an image signal from the outside. The image receiver may be implemented in various ways in accordance with an implementation type of the display apparatus 1 and the standard of the received image signal. For example, the image processor 1200 may wirelessly receive a radio frequency (RF) signal output from a broadcasting station (not shown), or may receive by wire an image signal based on standards such as composite video, component video, super video, SCART, and high definition multimedia interface (HDMI). When an image signal is a broadcast signal, the image processor 1200 may include a tuner that tunes the broadcast signal for each channel.

In another embodiment, an image signal may be input from an external device. For example, an image signal may be input from an external device such as a PC, an audio/visual (AV) device, a smartphone, or a smart pad. In another embodiment, an image signal may be produced from data received through a network such as the Internet. In this case, the display apparatus 1 may perform network communication through the communicator 1600. In another embodiment, an image signal may be produced from data stored in the storage unit 1500 that is a non-volatile storage unit such as a flash memory or a hard disk. The storage unit 1500 may be provided inside or outside the display apparatus 1. When the storage unit 1500 is provided outside the display apparatus 1, a connector (not shown) to which the storage unit 1500 is connected may be further provided.

A type of an image processing operation performed by the image processor 1200 is not limited. For example, the image processing operation may include at least one of decoding corresponding to various image formats, de-interlacing, frame refresh rate conversion, scaling, noise reduction for improving image quality, detail enhancement, and line scanning. The image processor 1200 may be implemented as a group of individual elements that may independently perform each process, or may be implemented as a system-on-chip (SoC) where various functions are integrated.

The image acquirer 1300 may obtain an external image by photographing an external environment. The image acquirer 1300 may be an image obtainer. In an embodiment, the image acquirer 1300 may be implemented as a camera that captures an image of an external environment. In this case, the camera may be installed at a certain position of the display apparatus 1. For example, the camera may be installed on the display apparatus 1, or may be installed inside the display unit 1100. A position of the camera is not limited, and when necessary, the camera may be separated from a main body of the display apparatus 1 and may be installed outside the display apparatus 1.

The image acquirer 1300 may include a lens (not shown) through which an image is transmitted, and an image sensor 1310 that senses the image transmitted through the lens. The image sensor 1310 may be a charge-coupled device (CCD) image sensor or a complementary metal-oxide-semiconductor (CMOS) image sensor. An image input through the image acquirer 1300 may be processed by the image processor 1200.

The user input unit 1400 may receive an input of a user. The user input unit 1400 may transmit preset various control commands or unlimited information to the controller 1700, according to a manipulation and an input of the user.

In an embodiment, the user input unit 1400 may receive an input signal from an input device that is provided in the main body of the display apparatus 1 or is spaced apart from the display apparatus 1. For example, the user input unit 1400 may receive an input signal through a keypad (or an input panel) (not shown) including buttons such as numeric keys or menu keys provided on the main body of the display apparatus 1. Alternatively, the user input unit 1400 may receive an input signal through a separate input device such as a remote controller, a keyboard, or a mouse which generates a command/data/information/signal preset to remotely control the display apparatus 1 and transmits the command/data/information/signal to the display apparatus 1. In this case, the separate input device may be an external device that is connected to the main body of the display apparatus 1 and is capable of performing wireless communication, and examples of the wireless communication may include infrared communication, RF communication, and wireless local area network (LAN). The input device may be manipulated by the user to transmit a preset command to the display apparatus 1. Alternatively, the user input unit 1400 may receive a voice signal of the user.

The storage unit 1500 may store various data. The storage unit 1500 may store unlimited data under the control of the controller 1700. The storage unit 1500 may include at least one of a volatile memory and a non-volatile memory. Examples of the volatile memory may include a dynamic random-access memory (DRAM) and a static RAM (SRAM), and examples of the non-volatile memory may include a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), a hard disk drive (HDD), and a solid-state drive (SSD).

The storage unit 1500 may be accessed by the controller 1700, and may read/write/modify/delete/update data. Data stored in the storage unit 1500 may include operating system data for driving the display apparatus 1, various applications executable on an operating system, image data, and additional data.

The storage unit 1500 may store a signal or data input/output according to an operation of each element under the control of the controller 1700. The storage unit 1500 may store a control program for controlling the display apparatus 1, images for providing a graphical user interface (GUI) related to an application provided by a manufacturer or downloaded from the outside, user information, documents, databases, or related data.

The communicator 1600 may perform wired or wireless communication with an external device. In an embodiment, the communicator 1600 may support at least one of communication interfaces such as Wi-Fi, Bluetooth, RF, Zigbee, wireless LAN, infrared communication, ultra-wideband (UWB), and near-field communication (NFC).

The communicator 1600 may be embedded in the main body of the display apparatus 1, and in another embodiment, the communicator 1600 may be implemented as a dongle or a module and may be attached to and detached from a connector (not shown) of the display apparatus 1.

The controller 1700 may control the display apparatus 1. The controller 1700 may control an overall operation of the display apparatus 1 and a signal flow between elements of the display apparatus 1. The controller 1700 may process data. The controller 1700 may control power supply from a power supply unit (not shown) to internal elements. In an embodiment, when there is an input of the user or a preset and stored condition is satisfied, the controller 1700 may execute an operating system (OS) and various applications stored in the storage unit 1500.

The controller 1700 may obtain information to bend the display panel 10, and may control the display panel 10 to be bent and display an image by considering the obtained information. In an embodiment, the controller 1700 may control the frame assembly 20 to bend the display panel 10.

Figure 2A:
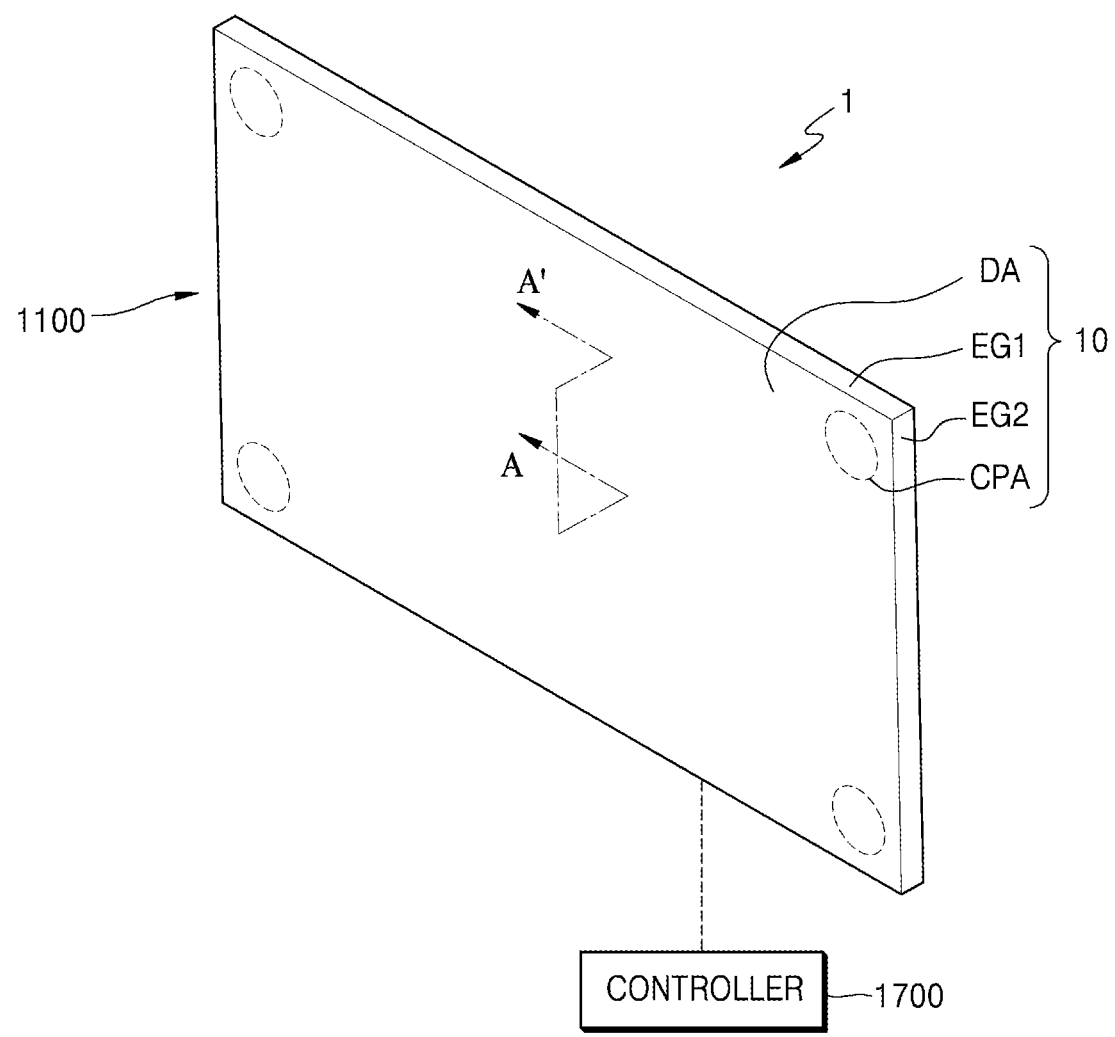
FIG. 2A is a perspective view illustrating a display apparatus, according to an embodiment.
Figure 2B:
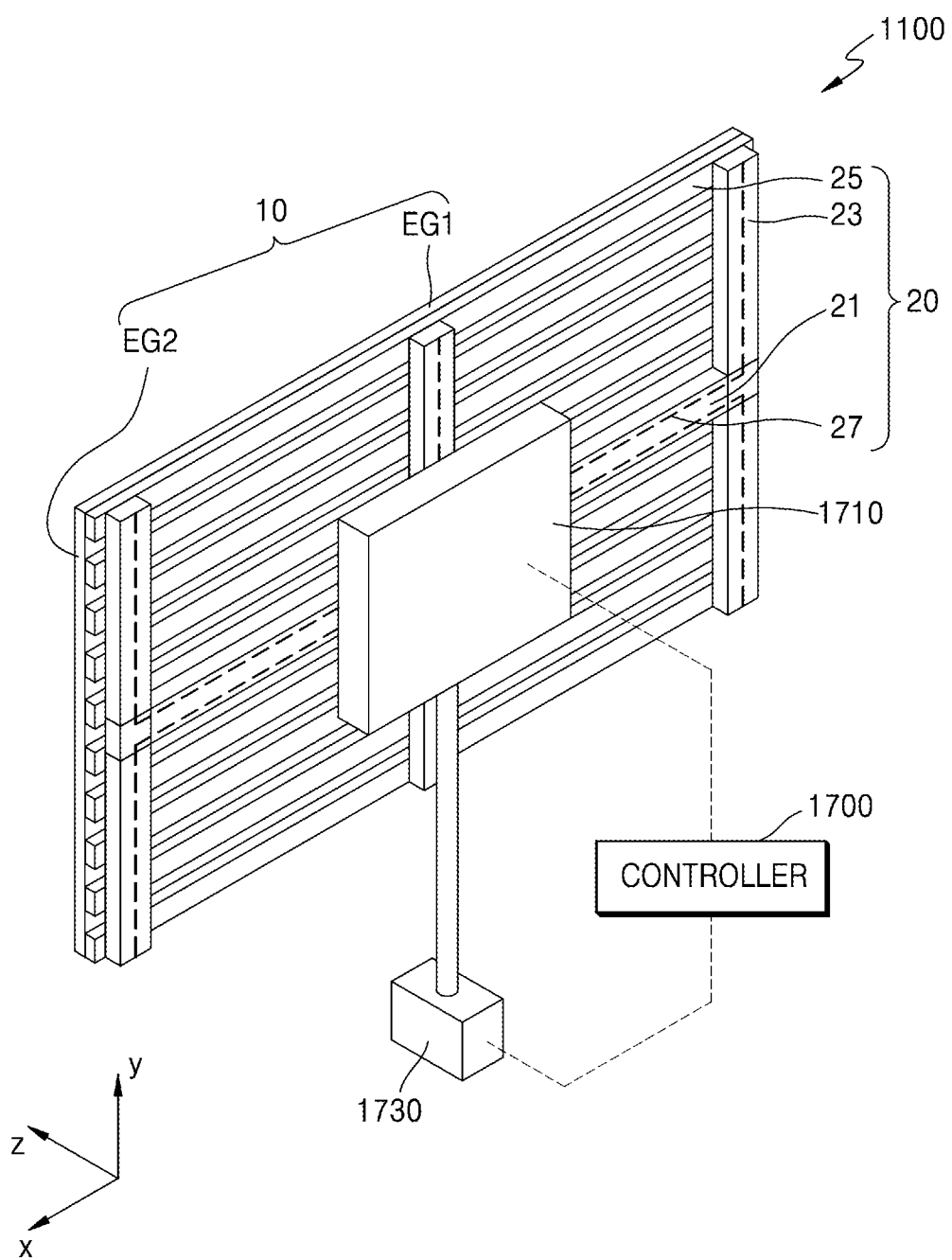
FIGS. 2B and 2C are perspective views illustrating a display apparatus, according to various embodiments.
Figure 2C:
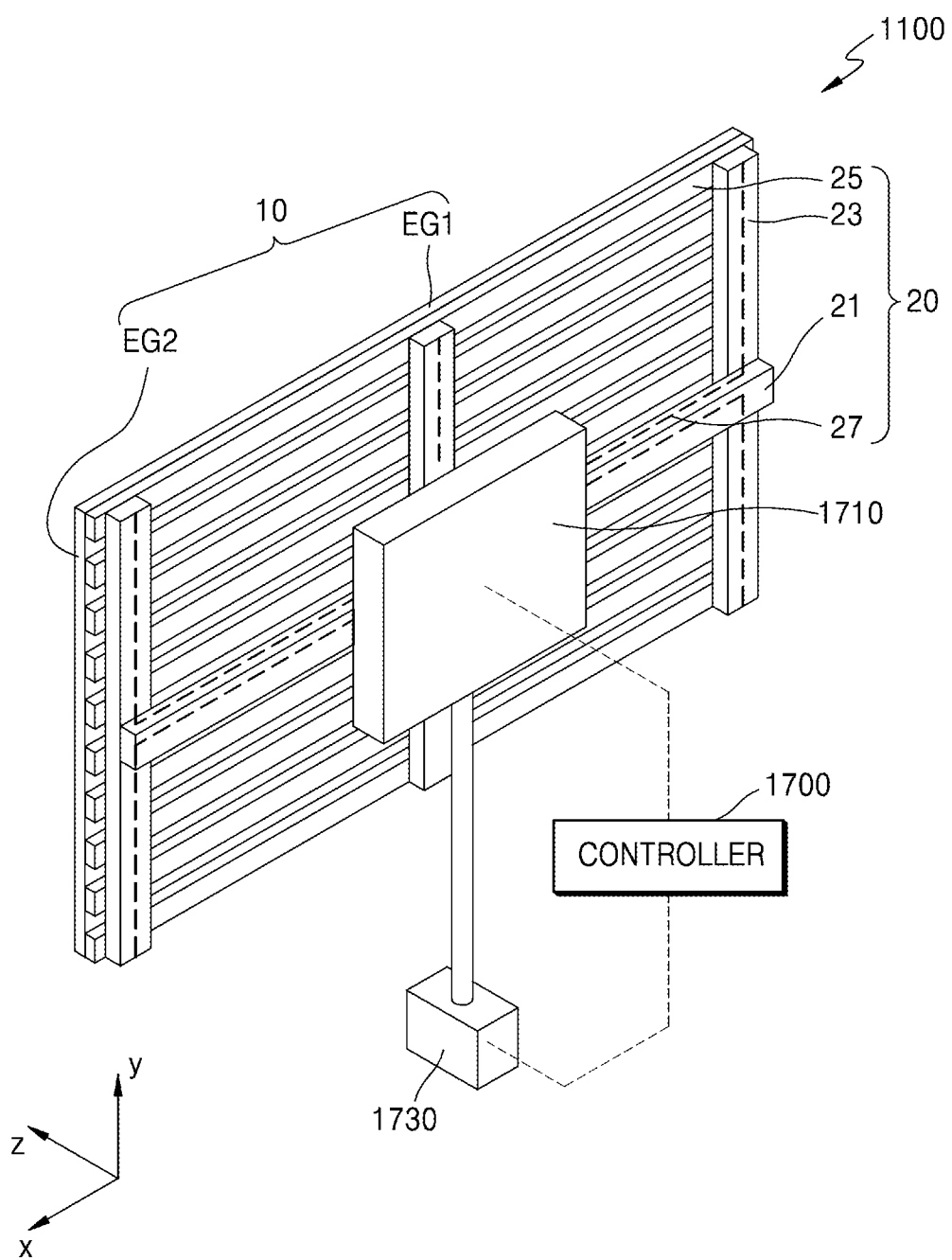

FIG. 2A is a perspective view illustrating the display apparatus 1, according to an embodiment. FIGS. 2B and 2C are perspective views illustrating the display apparatus 1, according to various embodiments. FIG. 2A is a perspective view illustrating a front surface of the display unit 1100. FIGS. 2B and 2C are perspective views illustrating a rear surface of the display unit 1100.

Referring to FIG. 2A, the display apparatus 1 may include the display unit 1100 and the controller 1700. The display unit 1100 may include the display panel 10.

The display panel 10 may include edges. The display panel 10 may include a first edge EG1 and a second edge EG2. The first edge EG1 and the second edge EG2 may be ends of the display panel 10. In an embodiment, the first edge EG1 and the second edge EG2 may meet each other. In this case, the first edge EG1 and the second edge EG2 may intersect each other. Alternatively, the first edge EG1 and the second edge EG2 may meet each other in a curved shape.

The first edge EG1 may extend in a first direction. The second edge EG2 may extend in a second direction. In this case, the first direction and the second direction may intersect each other. For example, an acute angle, a right angle, or an obtuse angle may be provided between the first direction and the second direction. The following will be described assuming that the first direction is an x direction or a −x direction (i.e. minus x direction) and the second direction is a y direction or a −y direction (i.e. minus y direction).

The display panel 10 may be bent. In an embodiment, the display panel 10 may be bent from the first direction (e.g., the x direction or the −x direction) to a third direction. The third direction may provide an acute angle, a right angle, or an obtuse angle with the first direction (e.g., the x direction or the −x direction) and the second direction (e.g., the y direction or the −y direction). In an embodiment, the third direction may be a z direction or a −z direction. When the display panel 10 is bent from the first direction (e.g., the x direction or the −x direction) to the third direction (e.g., the z direction or the −z direction), it means that a cross-section of the display panel 10 intersecting a plane (e.g., an xz plane) extending in the first direction (e.g., the x direction or the −x direction) and the third direction (e.g., the z direction or the −z direction) is bent to be concave or convex.

In another embodiment, the display panel 10 may be bent from the second direction (e.g., the y direction or the −y direction) to the third direction (e.g., the z direction or the −z direction). When the display panel 10 is bent from the second direction (e.g., the y direction or the −y direction) to the third direction (e.g., the z direction or the −z direction), it means that a cross-section of the display panel 10 intersecting a plane (e.g., a yz plane) extending in the second direction (e.g., the y direction or the −y direction) and the third direction (e.g., the z direction or the −z direction) is bent to be concave or convex.

In another embodiment, the display panel 10 may be bent from the first direction (e.g., the x direction or the −x direction) to the third direction (e.g., the z direction or the −z direction), and may be bent from the second direction (e.g., the y direction or the −y direction) to the third direction (e.g., the z direction or the −z direction). In this case, the display panel 10 may be stretched or contracted in the first direction (e.g., the x direction or the −x direction) or the second direction (e.g., the y direction or the −y direction). When the display panel 10 is not stretched or contracted in the first direction (e.g., the x direction or the −x direction) or the second direction (e.g., the y direction or the −y direction), relatively large stress may occur at a corner of the display panel 10 and the display panel 10 may be damaged.

The display panel 10 according to an embodiment may be a stretchable display panel that may be stretched or contracted in the first direction (e.g., the x direction or the −x direction) or the second direction (e.g., the y direction or the −y direction). Accordingly, even when the display panel 10 is bent in various directions, relatively small stress may be applied to the display panel 10 and damage to the display panel 10 may be prevented or reduced.

The display panel 10 may include a display area DA. The display area DA may display an image. In an embodiment, the display panel 10 may display an image in the display area DA under the control of the controller 1700.

A pixel may be located in the display area DA. In an embodiment, a plurality of pixels may be located in the display area DA. The display panel 10 may provide an image by using light emitted from a pixel. In an embodiment, the pixel may include a display element.

In an embodiment, the display panel 10 may include a component area CPA. The component area CPA may be an area where a component capable of performing various functions is located. In an embodiment, the component may include an image acquirer such as a sensor or a camera using light. The component area CPA may include a transmissive area through which light of the sensor or light travelling to the camera is transmitted.

The component area CPA may be at least partially surrounded by the display area DA. For example, the component area CPA may be entirely surrounded by the display area DA. Alternatively, only a part of the component area CPA may be surrounded by the display area DA.

In an embodiment, a plurality of component areas CPA may be provided. In an embodiment, the plurality of component areas CPA may be spaced apart from one another in the first direction (e.g., the x direction or the −x direction) or the second direction (e.g., the y direction or the −y direction).

The component area CPA may be located offset from the center of the display panel 10 in the first direction (e.g., the x direction or the −x direction) or the second direction (e.g., the y direction or the −y direction).

In an embodiment, the component area CPA may have a circular shape or an elliptical shape on a plane (e.g., a xy plane). In another embodiment, the component area CPA may have a polygonal shape such as a quadrangular shape on a plane. In another embodiment, the component area CPA may have a curved shape.

A component (not shown) may overlap the component area CPA. In this case, the component area may be located inside the display unit 1100. The component may be an electric element using light or sound. Examples of the electronic element may include a sensor that receives and uses light such as an infrared sensor, a camera that captures an image by receiving light, a sensor that measures a distance or recognizes a fingerprint by outputting and detecting light or sound, a small lamp that outputs light, and a speaker that outputs sound. When the component is an electronic element using light, the component may use light of various wavelength bands such as visible light, infrared light, or ultraviolet light.

In an embodiment, the component area CPA may be entirely a transmissive area. In this case, the component area CPA may not display an image. In another embodiment, the component area CPA may display an image. In this case, a pixel may be located in at least a part of the component area CPA, and at least a part of the component area CPA where a pixel is not located may be a transmissive area.

In some embodiments, the component area CPA may be omitted. In this case, the component may be located outside the display unit 1100. For example, the component may be attached to the first edge EG1 or the second edge EG2.

Referring to FIGS. 2B and 2C, the display unit 1100 may include the display panel 10 and a frame assembly 20. The frame assembly 20 may bend the display panel 10. The frame assembly 20 may be located behind the display panel 10. The frame assembly 20 may be located opposite to the display area.

The frame assembly 20 may bend the display panel 10 from the first direction (e.g., the x direction or the −x direction) to the third direction (e.g., the z direction or the −z direction) that intersects the first direction (e.g., the x direction or the −x direction) and the second direction (e.g., the y direction or the −y direction). The first edge EG1 of the bent display panel 10 may have a curvature. The first edge EG1 of the bent display panel 10 may be bent from the first direction (e.g., the x direction or the −x direction) to the third direction (e.g., the z direction or the −z direction).

The frame assembly 20 may bend the display panel 10 from the second direction (e.g., the y direction or the −y direction) to the third direction (e.g., the z direction or the −z direction). In this case, the second edge EG2 of the bent display panel 10 may have a curvature. The second edge EG2 of the bent display panel 10 may be bent from the second direction (e.g., the y direction or the −y direction) to the third direction (e.g., the z direction or the −z direction).

The frame assembly 20 may bend the display panel 10 from the first direction (e.g., the x direction or the −x direction) to the third direction (e.g., the z direction or the −z direction), and may bend the display panel 10 from the second direction (e.g., the y direction or the −y direction) to the third direction (e.g., the z direction or the −z direction). Each of the first edge EG1 and the second edge EG2 of the bent display panel 10 may have a curvature.

The frame assembly 20 may be controlled by the controller 1700. The frame assembly 20 may be controlled by the controller 1700 to be bent from the first direction (e.g., the x direction or the −x direction) to the third direction (e.g., the z direction or the −z direction). The frame assembly 20 may be controlled by the controller 1700 to be bent from the second direction (e.g., the y direction or the −y direction) to the third direction (e.g., the z direction or the −z direction). The frame assembly 20 may include a first frame 21, a second frame 23, and a plurality of supporters 25.

The first frame 21 may extend in the first direction (e.g., the x direction or the −x direction). The first frame 21 may be located behind the display panel 10. Although one first frame 21 is located behind the display panel 10 in FIG. 2B, in another embodiment, a plurality of first frames 21 may be provided behind the display panel 10.

In an embodiment, the first frame 21 may include austenitic stainless steel. In another embodiment, the first frame 21 may be formed of stainless steel, invar, nickel (Ni), cobalt (Co), a nickel alloy, or a nickel-cobalt alloy. In another embodiment, the first frame 21 may be formed of any of various metal materials. In another embodiment, the first frame 21 may include a high-molecular compound, for example, a polymer.

The first frame 21 may be bent from the first direction (e.g., the x direction or the −x direction) to the third direction (e.g., the z direction or the −z direction). The first frame 21 may be bent under the control of the controller 1700. Accordingly, the first frame 21 may bend the display panel 10 from the first direction (e.g., the x direction or the −x direction) to the third direction (e.g., the z direction or the −z direction). Also, the first frame 21 may bend the first edge EG1 of the display panel 10 to have a curvature.

In an embodiment, the first frame 21 may be integrally provided in the first direction (e.g., the x direction or the −x direction). In another embodiment, the first frame 21 may include a plurality of first frame portions spaced apart from one another with the second frame 23 therebetween.

The second frame 23 may extend in the second direction (e.g., the y direction or the −y direction). The second frame 23 may be located behind the display panel 10. In an embodiment, a plurality of second frames 23 may be located behind the display panel 10. In another embodiment, one second frame 23 may be located behind the display panel 10.

In an embodiment, the second frame 23 may include austenitic stainless steel. In another embodiment, the second frame 23 may be formed of stainless steel, invar, nickel (Ni), cobalt (Co), a nickel alloy, or a nickel-cobalt alloy. In another embodiment, the second frame 23 may be formed of any of various metal materials. In another embodiment, the second frame 23 may include a high-molecular compound, for example, a polymer.

The second frame 23 may be bent from the second direction (e.g., the y direction or the −y direction) to the third direction (e.g., the z direction or the −z direction). The second frame 23 may be bent under the control of the controller 1700. Accordingly, the second frame 23 may bend the display panel 10 from the second direction (e.g., the y direction or the −y direction) to the third direction (e.g., the z direction or the −z direction). Also, the second frame 23 may bend the second edge EG2 of the display panel 10 to have a curvature.

In an embodiment, the second frame 23 may be integrally provided in the second direction (e.g., the y direction or the −y direction). In another embodiment, the second frame 23 may include a plurality of second frame portions spaced apart from one another with the first frame 21 therebetween.

The first frame 21 and the second frame 23 may be connected to each other. Referring to FIG. 2B, the first frame 21 and the second frame 23 may be integrally provided. Referring to FIG. 2C, each of the first frame 21 and the second frame 23 may be an independent frame. In an embodiment, the second frame 23 may be located between the first frame 21 and the display panel 10.

In an embodiment, a wire 27 may be located inside the first frame 21 or the second frame 23. The wire 27 may bend the first frame 21 or the second frame 23. For example, when the wire 27 is contracted or a length of the wire 27 is reduced by a motor, the first frame 21 or the second frame 23 may be bent.

The plurality of supporters 25 may support the display panel 10. In an embodiment, the plurality of supporters 25 may be located between the display panel 10 and the first frame 21. The plurality of supporters 25 may be fixed to the first frame 21. In an embodiment, the plurality of supporters 25 may be located between the display panel 10 and the second frame 23. The plurality of supporters 25 may be fixed to the second frame 23.

The plurality of supporters 25 may maintain a shape of the display panel 10. In an embodiment, the display panel 10 may be a stretchable display panel. In this case, a shape of the display panel 10 may be changed in various ways. That is, the display panel 10 may be flexible. Because the plurality of supporters 25 support the display panel 10, the plurality of supporters 25 may maintain a shape of the display panel 10.

In an embodiment, the plurality of supporters 25 may extend in the first direction (e.g., the x direction or the −x direction). In this case, the plurality of supporters 25 may be spaced apart from one another in the second direction (e.g., the y direction or the −y direction). In another embodiment, the plurality of supporters 25 may extend in the second direction (e.g., the y direction or the −y direction). In this case, the plurality of supporters 25 may be spaced apart from one another in the first direction (e.g., the x direction or the −x direction). The following will be described assuming that the plurality of supporters 25 extend in the first direction (e.g., the x direction or the −x direction).

In an embodiment, the supporters 25 may include austenitic stainless steel. In another embodiment, the supporters 25 may be formed of stainless steel, invar, nickel (Ni), cobalt (Co), a nickel alloy, or a nickel-cobalt alloy. In another embodiment, the supporters 25 may be formed of any of various metal materials. In another embodiment, the supporters 25 may include a high-molecular compound, for example, a polymer.

The plurality of supporters 25 may be bent from the first direction (e.g., the x direction or the −x direction) to the third direction (e.g., the z direction or the −z direction). In an embodiment, the first frame 21 may bend the plurality of supporters 25 from the first direction (e.g., the x direction or the −x direction) to the third direction (e.g., the z direction or the −z direction). For example, when the first frame 21 is bent from the first direction (e.g., the x direction or the −x direction) to the third direction (e.g., the z direction or the −z direction), the plurality of supporters 25 may also be bent from the first direction (e.g., the x direction or the −x direction) to the third direction (e.g., the z direction or the −z direction). Accordingly, the display panel 10 may be bent from the first direction (e.g., the x direction or the −x direction) to the third direction (e.g., the z direction or the −z direction).

At least one of the plurality of supporters 25 may move in the third direction (e.g., the z direction or the −z direction).

For example, the supporter 25 adjacent to the first edge EG1 from among the plurality of supporters 25 may move in the third direction (e.g., the z direction or the −z direction). In an embodiment, the second frame 23 may move at least one of the plurality of supporters 25 in the third direction (e.g., the z direction or the −z direction). For example, when the second frame 23 is bent from the second direction (e.g., the y direction or the −y direction) to the third direction (e.g., the z direction or the −z direction), at least one of the plurality of supporters 25 may move in the third direction (e.g., the z direction or the −z direction). Accordingly, the display panel 10 may be bent from the second direction (e.g., the y direction or the −y direction) to the third direction (e.g., the z direction or the −z direction).

The controller 1700 may obtain information to bend the display panel 10, and may bend the display panel 10 by considering the obtained information. The controller 1700 may include a first driver 1710 and a second driver 1730.

The first driver 1710 may control the frame assembly 20. In an embodiment, the first driver 1710 may control bending of the first frame 21 or the second frame 23. In an embodiment, the first driver 1710 may include a motor. The motor may contract the wire 27, or may reduce a length of the wire 27 by winding the wire 27.

In an embodiment, the first driver 1710 may include a plurality of motors. Each of the plurality of motors may control bending of the first frame 21 and the second frame 23. In an embodiment, the plurality of motors may control bending of one frame. For example, when the plurality of motors control the first frame 21, the plurality of motors may independently adjust bending of both ends of the first frame 21. In another example, when the plurality of motors control the second frame 23, the plurality of motors may independently adjust bending of both ends of the second frame 23. Accordingly, the display panel 10 may be bent into various shapes.

In an embodiment, the first driver 1710 may be located behind the display unit 1100. In this case, the first driver 1710 may include a fixing member for fixing the display unit 1100 to an external wall surface or the like. For example, the fixing member may include a bracket.

The second driver 1730 may control the display unit 1100 to rotate about the second direction (e.g., the y direction or the −y direction). In an embodiment, the second driver 1730 may include a motor. The motor may rotate the display unit 1100 about the second direction (e.g., the y direction or the −y direction). Accordingly, the display panel 10 may rotate about the second direction (e.g., the y direction or the −y direction) due to the controller 1700.

Figure 3:
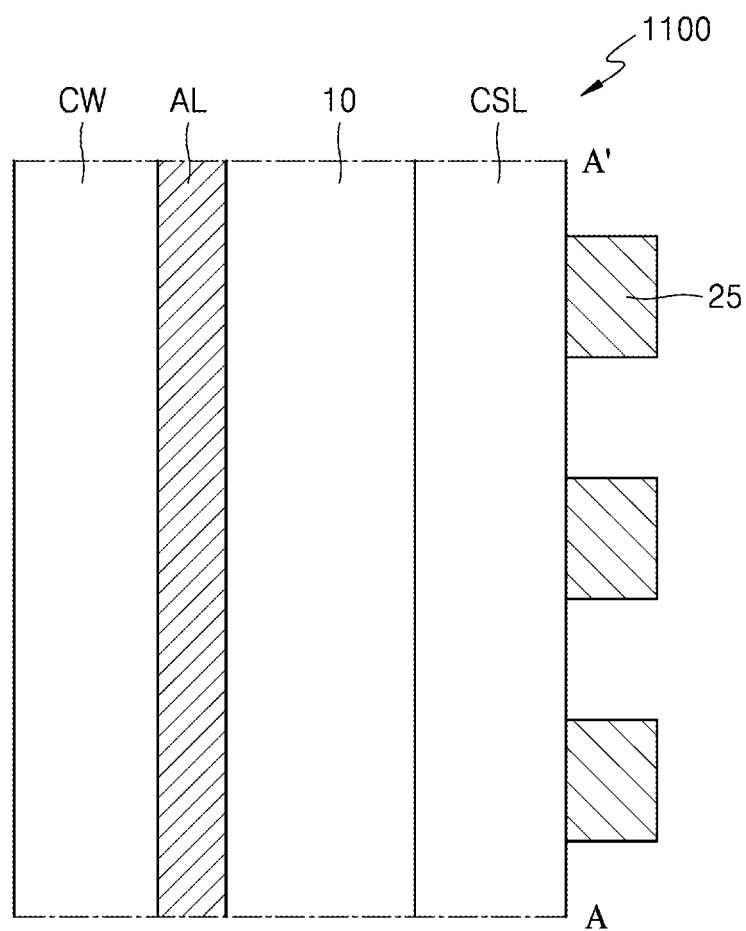
FIG. 3 is a cross-sectional view illustrating a display unit taken along line A-A' of FIG. 2A.

FIG. 3 is a cross-sectional view illustrating the display unit 1100 taken along line A-A' of FIG. 2A. In FIG. 3, the same elements as those illustrated in FIGS. 2A and 2B are denoted by the same reference numerals, and thus a repeated description thereof will be omitted.

Referring to FIG. 3, the display unit 1100 may include the display panel 10, a cover window CW, an adhesive layer AL, a cushion layer CSL, and the plurality of supporters 25.

The cover window CW may be located on the display panel 10. The cover window CW may be a flexible window. The cover window CW may protect the display panel 10 by being easily bent by an external force without generating cracks. In an embodiment, the cover window CW may be a stretchable cover window that may be stretched or contracted.

The cover window CW may include an organic material. For example, the cover window CW may include a urethane-based material. The cover window CW may include poly-urethane. The cover window CW may include a high-molecular compound, for example, a polymer.

The adhesive layer AL may be located between the display panel 10 and the cover window CW. The adhesive layer AL may attach the display panel 10 and the cover window CW to each other. In an embodiment, the adhesive layer AL may include an optically clear adhesive (OCA).

The cushion layer CSL may be located between the display panel 10 and the plurality of supporters 25. The cushion layer CSL may act as a buffer between the display panel 10 and the plurality of supporters 25. For example, each of the plurality of supporters 25 may move in the third direction (e.g., the z direction or the −z direction). Distances by which the plurality of supporters 25 move in the third direction (e.g., the z direction or the −z direction) may be different from one another. In this case, a position of the cushion layer CSL may be continuously changed according to discontinuous moving distances of the plurality of supporters 25. Accordingly, a position of the display panel 10 may be continuously changed by the cushion layer CSL and the plurality of supporters 25, and may be bent. Also, the cushion layer CSL may prevent or reduce damage to the display panel 10 due to the plurality of supporters 25.

In an embodiment, the cushion layer CSL may include an elastomer. For example, the cushion layer CSL may include a vulcanized natural rubber, a synthetic rubber, an elastic fiber, a foam, or a thermoplastic elastomer. In another example, the cushion layer CSL may include at least one of polyolefine, polyvinyl chloride, elastomeric silicone, elastomeric polyurethane, or elastomeric polyisoprene. In some embodiments, a first lower adhesive layer may be located between the cushion layer CSL and the display panel 10. In some embodiments, a second lower adhesive layer may be located between the cushion layer CSL and the plurality of supporters 25. For example, at least one of the first lower adhesive layer and the second lower adhesive layer may include a pressure sensitive adhesive (PSA).

Figure 4:
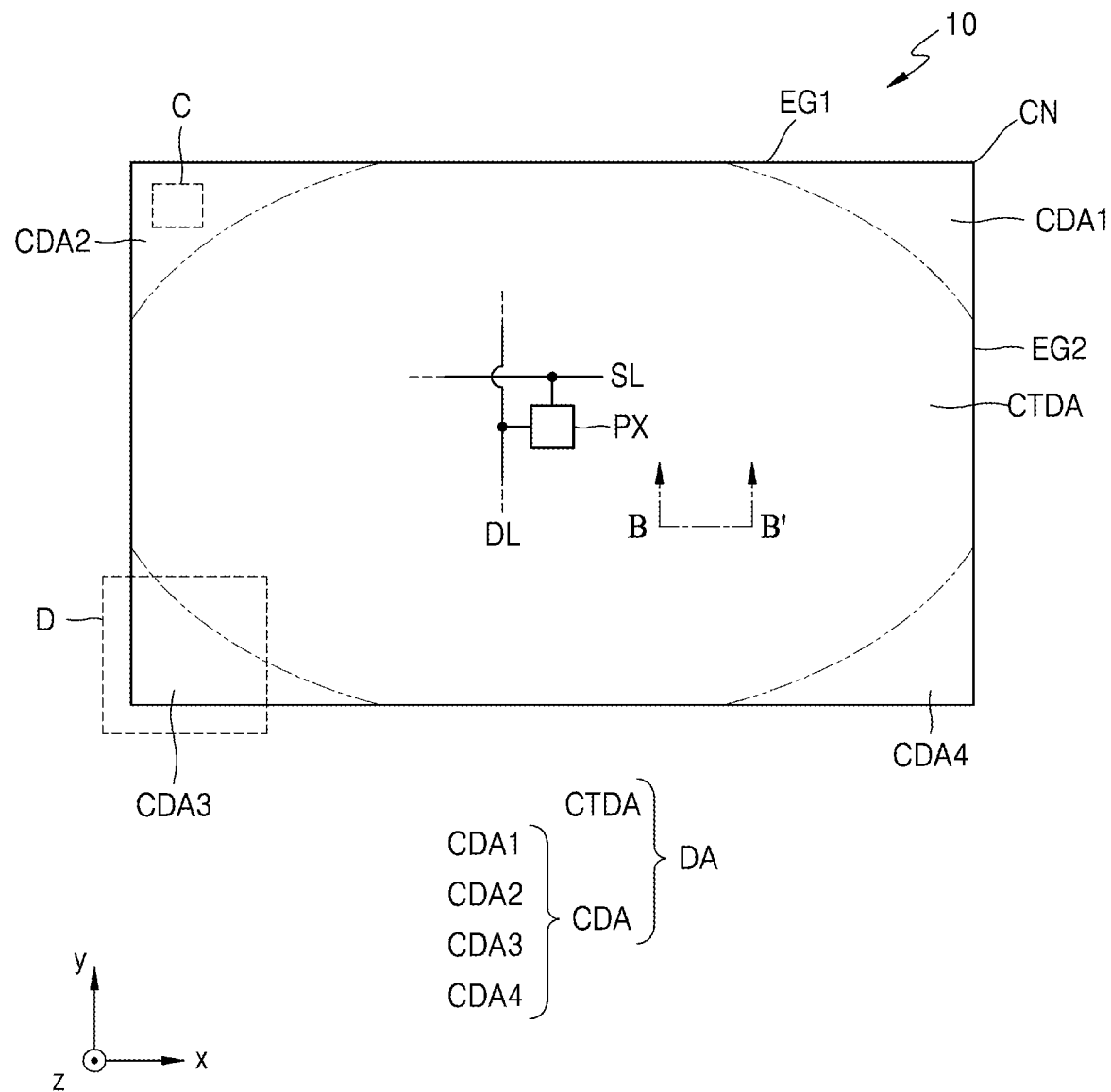
FIG. 4 is a plan view illustrating a display panel, according to an embodiment.

FIG. 4 is a plan view illustrating the display panel 10, according to an embodiment. In FIG. 4, the same elements as those illustrated in FIG. 2A are denoted by the same reference numerals, and thus a repeated description thereof will be omitted.

Referring to FIG. 4, the display panel 10 may include edges. In an embodiment, the display panel 10 may include the first edge EG1 extending in the first direction (e.g., the x direction or the −x direction) and the second edge EG2 extending in the second direction (e.g., the y direction or the −y direction). The first edge EG1 and the second edge EG2 may be ends of the display panel 10. In an embodiment, the first edge EG1 and the second edge EG2 may meet each other.

The display panel 10 may be an organic light-emitting display panel using an organic light-emitting diode including an organic emission layer as a display element. Alternatively, the display panel 10 may be a light-emitting diode display panel using a light-emitting diode (LED) as a display element. A size of the LED may be a micro scale or a nano scale. For example, the LED may be a micro-LED. Alternatively, the LED may be a nanorod LED. The nanorod LED may include gallium nitride (GaN). In an embodiment, a color conversion layer may be located on the nanorod LED. The color conversion layer may include quantum dots. Alternatively, the display panel 10 may be a quantum dot light-emitting display panel using a quantum dot light-emitting diode including a quantum dot emission layer as a display element. Alternatively, the display panel 10 may be an inorganic light-emitting display panel using an inorganic light-emitting diode including an inorganic semiconductor as a display element. The following will be described assuming that the display panel 10 is an organic light-emitting display panel using an organic light-emitting diode as a display element.

The display panel 10 may include the display area DA. The display area DA may display an image. A pixel PX may be located in the display area DA. In an embodiment, the pixel PX may be connected to a scan line SL extending in the first direction (e.g., the x direction or the −x direction). In an embodiment, the pixel PX may be connected to a data line DL extending in the second direction (e.g., the y direction or the −y direction).

The display panel 10 may include a plurality of pixels PX, and the display panel 10 may display an image by using the plurality of pixels PX. Each of the pixels PX may include sub-pixels, and each of the sub-pixels may emit light of a certain color by using a display element. The term 'sub-pixel' used herein refers to an emission area that is a minimum unit for forming an image.

In an embodiment, the display area DA may include a central display area CTDA and a corner display area CDA. The central display area CTDA may be located at the center of the display panel 10. The corner display area CDA may be located between the central display area CTDA and a corner CN where edges of the display panel 10 meet each other. The corner CN may be defined as a portion where edges extending in different directions meet each other. In an embodiment, when the display panel 10 has a polygonal shape, the display panel 10 may include a plurality of corners CN.

In an embodiment, the display panel 10 may include a plurality of corner display areas CDA. For example, the display panel 10 may include a first corner display area CDA1, a second corner display area CDA2, a third corner display area CDA3, and a fourth corner display area CDA4. In an embodiment, the first corner display area CDA1 may be located between the central display area CTDA, the first edge EG1, and the second edge EG2.

The display panel 10 may include a structure or a material that is stretchable or contractible. Accordingly, the display panel 10 may be bent from the first direction (e.g., the x direction or the −x direction) to the third direction (e.g., the z direction or the −z direction), and may be bent from the second direction (e.g., the y direction or the −y direction) to the third direction (e.g., the z direction or the −z direction).

In an embodiment, in the corner display area CDA, the display panel 10 may include a structure or a material that is stretchable or contractible. Accordingly, the corner display area CDA may be bent from the first direction (e.g., the x direction or the −x direction) to the third direction (e.g., the z direction or the −z direction), and may be bent from the second direction (e.g., the y direction or the −y direction) to the third direction (e.g., the z direction or the −z direction).

In an embodiment, the corner display area CDA may be more greatly deformed than the central display area CTDA, and a magnitude of stress applied to the corner display area CDA may be greater than a magnitude of stress applied to the central display area CTDA. When the corner display area CDA includes a structure or a material that is stretchable or contractible, a magnitude of stress applied to the corner display area CDA may be reduced, and damage to the display panel 10 in the corner display area CDA may be prevented or reduced. The central display area CTDA may also include a structure or a material that is stretchable or contractible.

Figure 5:
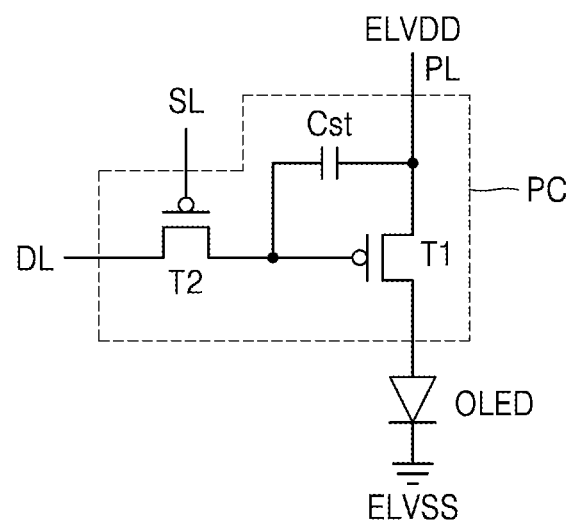
FIG. 5 is an equivalent circuit diagram illustrating a pixel circuit applicable to a display panel, according to an embodiment.

FIG. 5 is an equivalent circuit diagram illustrating a pixel circuit PC applicable to a display panel, according to an embodiment.

Referring to FIG. 5, the pixel circuit PC may be connected to a display element, for example, an organic light-emitting diode OLED.

The pixel circuit PC may include a driving thin-film transistor T1, a switching thin-film transistor T2, and a storage capacitor Cst. The organic light-emitting diode OLED may emit red, green, or blue light, or may red, green, blue, or white light.

The switching thin-film transistor T2 may be connected to the scan line SL and the data line DL, and may transmit a data signal or a data voltage input from the data line DL to the driving thin-film transistor T1 based on a scan signal or a switching voltage input from the scan line SL. The storage capacitor Cst may be connected to the switching thin-film transistor T2 and a driving voltage line PL, and may store a voltage corresponding to a difference between a voltage received from the switching thin-film transistor T2 and a first power supply voltage ELVDD supplied to the driving voltage line PL.

The driving thin-film transistor T1 may be connected to the driving voltage line PL and the storage capacitor Cst, and may control driving current flowing through the organic light-emitting diode OLED from the driving voltage line PL in response to a value of the voltage stored in the storage capacitor Cst. The organic light-emitting diode OLED may emit light having a certain luminance due to the driving current. A counter electrode of the organic light-emitting diode OLED may receive a second power supply voltage ELVSS.

Although the pixel circuit PC includes two thin-film transistors and one storage capacitor in FIG. 5, the pixel circuit PC may include three, four, five, or more thin-film transistors.

Figure 6:
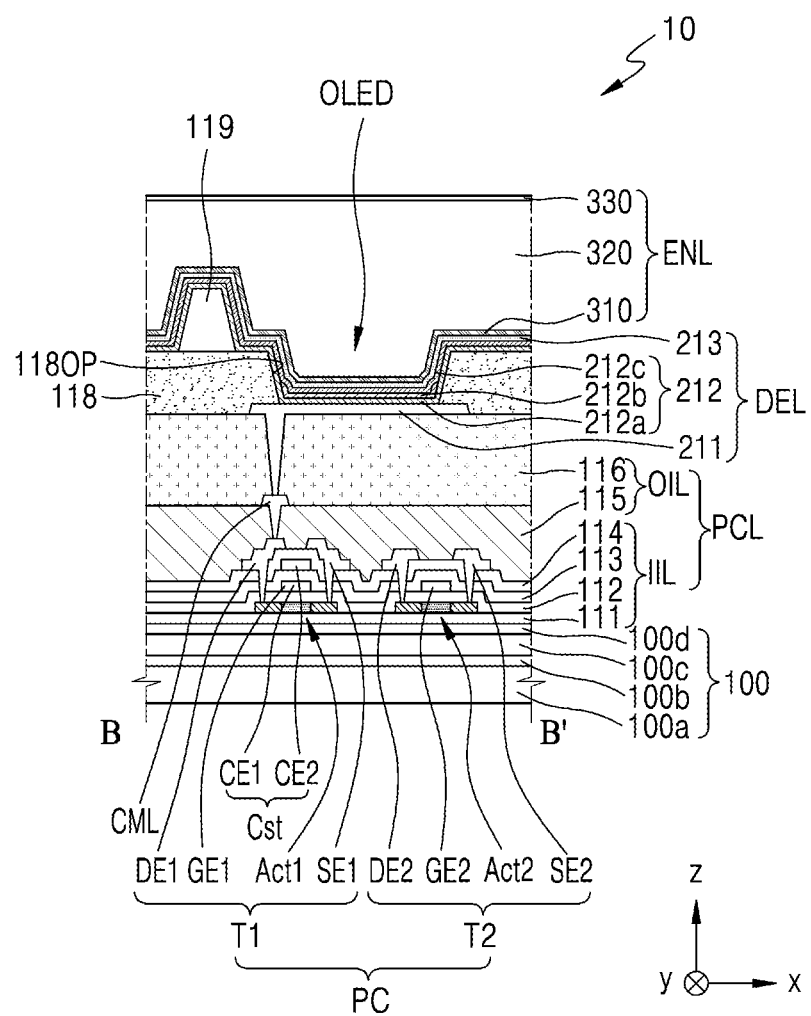
FIG. 6 is a cross-sectional view illustrating taken along line B-B' of the display panel of FIG. 4, according to an embodiment.

FIG. 6 is a cross-sectional view taken along line B-B' of the display panel of FIG. 4, according to an embodiment.

Referring to FIG. 6, the display panel 10 may include a substrate 100, a pixel circuit layer PCL, a display element layer DEL, and an encapsulation layer ENL.

In an embodiment, the substrate 100 may include a first base layer 100*a*, a first barrier layer 100*b*, a second base layer 100*c*, and a second barrier layer 100*d*. In an embodiment, the first base layer 100*a*, the first barrier layer 100*b*, the second base layer 100*c*, and the second barrier layer 100*d* may be sequentially stacked in the substrate 100. In another embodiment, the substrate 100 may include glass.

At least one of the first base layer 100*a* and the second base layer 100*c* may include a polymer resin such as polyethersulfone, polyarylate, polyetherimide, polyethylene naphthalate, polyethylene terephthalate, polyphenylene sulfide, polyimide, polycarbonate, cellulose triacetate, or cellulose acetate propionate.

Each of the first barrier layer 100*b* and the second barrier layer 100*d* which is a barrier layer for preventing penetration of an external foreign material may have a single or multi-layer structure including an inorganic material such as silicon nitride $SiN_x$, silicon oxide ($SiO_2$), or silicon oxynitride (SiON).

The pixel circuit layer PCL may be located on the substrate 100. The pixel circuit layer PCL may include the pixel circuit PC. The pixel circuit PC may include the driving thin-film transistor T1, the switching thin-film transistor T2, and the storage capacitor Cst.

The pixel circuit layer PCL may include an inorganic insulating layer IIL and an organic insulating layer OIL located under or over elements of the driving thin-film transistor T1. The inorganic insulating layer IIL may include a buffer layer 111, a first gate insulating layer 112, a second gate insulating layer 113, and an interlayer insulating layer 114. The organic insulating layer OIL may include a first organic insulating layer 115 and a second organic insulating layer 116. The driving thin-film transistor T1 may include a first semiconductor layer Act1, a first gate electrode GE1, a first source electrode SE1, and a first drain electrode DE1.

The buffer layer 111 may be located on the substrate 100. The buffer layer 111 may include an inorganic insulating material such as silicon nitride ($SiN_x$), silicon oxynitride (SiON), or silicon oxide ($SiO_2$), and may have a single or multi-layer structure including the inorganic insulating material.

The first semiconductor layer Act1 may be located on the buffer layer 111. The first semiconductor layer Act1 may include polysilicon. Alternatively, the first semiconductor layer Act1 may include amorphous silicon, an oxide semiconductor, or an organic semiconductor. The first semiconductor layer Act1 may include a channel region, and a drain region and a source region located on both sides of the channel region.

The first gate electrode GE1 may overlap the channel region. The first gate electrode GE1 may include a low-resistance metal material. The first gate electrode GE1 may include a conductive material including molybdenum (Mo), aluminum (Al), copper (Cu), or titanium (Ti), and may have a single or multi-layer structure including the above material.

The first gate insulating layer 112 between the first semiconductor layer Act1 and the first gate electrode GE1 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO).

The second gate insulating layer 113 may be provided to cover the first gate electrode GE1. The second gate insulating layer 113 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO), like the first gate insulating layer 112.

An upper electrode CE2 of the storage capacitor Cst may be located on the second gate insulating layer 113. The upper electrode CE2 may overlap the first gate electrode GE1 located below the upper electrode CE2. In this case, the first gate electrode GE1 of the driving thin-film transistor T1 and the upper electrode CE2 overlapping each other with the second gate insulating layer 113 therebetween may constitute the storage capacitor Cst. That is, the first gate electrode GE1 of the driving thin-film transistor T1 may function as a lower electrode CE1 of the storage capacitor Cst.

As such, the storage capacitor Cst and the driving thin-film transistor T1 may overlap each other. In some embodiments, the storage capacitor Cst may not overlap the driving thin-film transistor T1.

The upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), or copper (Cu), and may have a single or multi-layer structure including the above material.

The interlayer insulating layer 114 may cover the upper electrode CE2. The interlayer insulating layer 114 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO). The interlayer insulating layer 114 may have a single or multi-layer structure including the above inorganic insulating material.

Each of a first drain electrode DE1 and a first source electrode SE1 may be located on the interlayer insulating layer 114. Each of the first drain electrode DE1 and the first source electrode SE1 may include a material having high conductivity. Each of the first drain electrode DE1 and the first source electrode SE1 may include a conductive material including molybdenum (Mo), aluminum (Al), copper (Cu), or titanium (Ti), and may have a single or multi-layer structure including the above material. In an embodiment, each of the first drain electrode DE1 and the first source electrode SE1 may have a multi-layer structure including Ti/Al/Ti.

The switching thin-film transistor T2 may include a second semiconductor layer Act2, a second gate electrode GE2, a second drain electrode DE2, and a second source electrode SE2. The second semiconductor layer Act2, the second gate electrode GE2, the second drain electrode DE2, and the second source electrode SE2 are respectively similar to the first semiconductor layer Act1, the first gate electrode GE1, the first drain electrode DE1, and the first source electrode SE1, and thus a detailed description thereof will be omitted.

The first organic insulating layer 115 may be located to cover the first drain electrode DE1 and the first source electrode SE1. The first organic insulating layer 115 may include an organic material. For example, the first organic insulating layer 115 may include an organic insulating material such as a general-purpose polymer (e.g., polymethyl methacrylate (PMMA) or polystyrene (PS)), a polymer derivative having a phenol-based group, an acrylic polymer, an imide-based polymer, an aryl ether-based polymer, an amide-based polymer, a fluorinated polymer, a p-xylene-based polymer, a vinyl alcohol-based polymer, or a blend thereof.

A connection electrode CML may be located on the first organic insulating layer 115. In this case, the connection electrode CML may be electrically connected to the first drain electrode DE1 or the first source electrode SE1 through a contact hole of the first organic insulating layer 115. The connection electrode CML may include a material having high conductivity. The connection electrode CML may include a conductive material including molybdenum (Mo), aluminum (Al), copper (Cu), or titanium (Ti), and may have a single or multi-layer structure including the above material. In an embodiment, the connection electrode CML may have a multi-layer structure including Ti/Al/Ti.

The second organic insulating layer 116 may be located to cover the connection electrode CML. The second organic insulating layer 116 may include an organic material. The second organic insulating layer 116 may include an organic insulating material such as a general-purpose polymer (e.g., polymethyl methacrylate (PMMA) or polystyrene (PS)), a polymer derivative having a phenol-based group, an acrylic polymer, an imide-based polymer, an aryl ether-based polymer, an amide-based polymer, a fluorinated polymer, a p-xylene-based polymer, a vinyl alcohol-based polymer, or a blend thereof. In some embodiments, the connection electrode CML and the second organic insulating layer 116 may be omitted.

The display element layer DEL may be located on the pixel circuit layer PCL. The display element layer DEL may include a display element. The organic light-emitting diode OLED that is the display element may include a pixel electrode 211, an intermediate layer 212, and a counter electrode 213.

The pixel electrode 211 of the organic light-emitting diode OLED may be electrically connected to the connection electrode CML through a contact hole of the second organic insulating layer 116. Accordingly, the organic light-emitting diode OLED may be electrically connected to the pixel circuit PC.

The pixel electrode 211 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO). In another embodiment, the pixel electrode 211 may include a reflective film including silver (Ag), magnesium (Mg), aluminum (Al), platinum (Pt), palladium (Pd), gold (Au), nickel (Ni), neodymium (Nd), iridium (Ir), chromium (Cr), or a compound thereof. In another embodiment, the pixel electrode 211 may further include a film formed of ITO, IZO, ZnO, or $In_2O_3$ over/under the reflective film.

A pixel-defining film 118 having an opening 118OP through which a central portion of the pixel electrode 211 is exposed may be located on the pixel electrode 211. The pixel-defining film 118 may include an organic insulating material or an inorganic insulating material. The opening 118OP may define an emission area of light emitted by the organic light-emitting diode OLED. For example, a width of the opening 118OP may correspond to a width of the emission area.

A spacer 119 may be located on the pixel-defining film 118. A mask sheet may be used in a method of manufacturing the display panel 10. In this case, the mask sheet may be introduced into the opening 118OP of the pixel-defining film 118 or may be closely attached to the pixel-defining film 118. The spacer 119 may prevent damage to the substrate 100 and a part of a multi-layer film on the substrate 100 due to the mask sheet when a deposition material is deposited on the substrate 100.

The spacer 119 may include an organic material such as polyimide. Alternatively, the spacer 119 may include an inorganic insulating material such as silicon nitride ($SiN_x$) or silicon oxide ($SiO_2$), or may include an organic insulating material and an inorganic insulating material.

In an embodiment, the spacer 119 may include a material different from that of the pixel-defining film 118. In another embodiment, the spacer 119 may include the same material as that of the pixel-defining film 118, and in this case, the pixel-defining film 118 and the spacer 119 may be formed together in a mask process using a halftone mask or the like.

The intermediate layer 212 may be located on the pixel-defining film 118 and the pixel electrode 211. The intermediate layer 212 may include an emission layer 212b located in the opening 118OP of the pixel-defining film 118. The emission layer 212b may include a high molecular weight organic material or a low molecular weight organic material emitting light of a certain color.

A first functional layer 212a and a second functional layer 212c may be respectively located under and over the emission layer 212b. The first functional layer 212a may include, for example, a hole transport layer (HTL), or may include an HTL and a hole injection layer (HIL). The second functional layer 212c that is an element located over the emission layer 212b may be optional. The second functional layer 212c may include an electron transport layer (ETL) or an electron injection layer (EIL). The first functional layer 212a or the second functional layer 212c may be a common layer formed to entirely cover the substrate 100, like the counter electrode 213 described below.

The counter electrode 213 may be formed of a conductive material having a low work function. For example, the counter electrode 213 may include a (semi-)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. Alternatively, the counter electrode 213 may further include a layer formed of ITO, IZO, ZnO, or $In_2O_3$ on the (semi)transparent layer including the above material.

In some embodiments, a capping layer (not shown) may be further located on the counter electrode 213. The capping layer may include LiF, an inorganic material, or an organic material.

The encapsulation layer ENL may be located on the counter electrode 213. In an embodiment, the encapsulation layer ENL may include at least one inorganic encapsulation layer and at least one organic encapsulation layer. In an embodiment, in FIG. 6, the encapsulation layer ENL includes a first inorganic encapsulation layer 310, an organic encapsulation layer 320, and a second inorganic encapsulation layer 330 that are sequentially stacked.

Each of the first inorganic encapsulation layer 310 and the second inorganic encapsulation layer 330 may include at least one inorganic material from among aluminum oxide ($Al_2O_3$), titanium oxide ($TiO_2$), tantalum oxide ($Ta_2O_5$), hafnium oxide ($HfO_2$), zinc oxide (ZnO), silicon oxide ($SiO_2$), silicon nitride ($SiN_x$), and silicon oxynitride (SiON). The organic encapsulation layer 320 may include a polymer-based material. Examples of the polymer-based material may include an acrylic resin, an epoxy resin, polyimide, and polyethylene. In an embodiment, the organic encapsulation layer 320 may include acrylate.

Although not shown in FIG. 6, a touch electrode layer may be located on the encapsulation layer ENL, and an optical functional layer may be located on the touch electrode layer. The touch electrode layer may obtain coordinate information according to an external input, for example, a touch event. The optical functional layer may reduce a reflectance of light (external light) incident on the display apparatus, or improve color purity of light emitted from the display apparatus. In an embodiment, the optical functional layer may include a phase retarder or a polarizer. The phase retarder may be of a film type or a liquid crystal coating type, and may include a λ/2 phase retarder or a λ/4 phase retarder. The polarizer may also be of a film type or a liquid crystal coating type. The film type polarizer may include a stretchable synthetic resin film, and the liquid crystal coating type polarizer may include liquid crystals arranged in a certain arrangement. The phase retarder and the polarizer may further include a protective film.

In another embodiment, the optical functional layer may include a black matrix and color filters. The color filters may be arranged in consideration of a color of light emitted by each of pixels of the display panel. Each of the color filters may include a red, green, or blue pigment or dye. Alternatively, each of the color filters may further include quantum dots in addition to the pigment or dye. Alternatively, some of the color filters may not include the pigment or dye, and may include scattering particles such as titanium oxide.

In another embodiment, the optical functional layer may include a destructive interference structure. The destructive interference structure may include a first reflective layer and a second reflective layer that are located on different layers. First reflected light and second reflected light respectively reflected by the first reflective layer and the second reflective layer may be destructively interfered with each other, thereby reducing a reflectance of external light.

An adhesive member may be located between the touch electrode layer and the optical functional layer. The adhesive member may be a general one well known in the art without limitation. The adhesive member may be a pressure sensitive adhesive (PSA).

Figure 7:
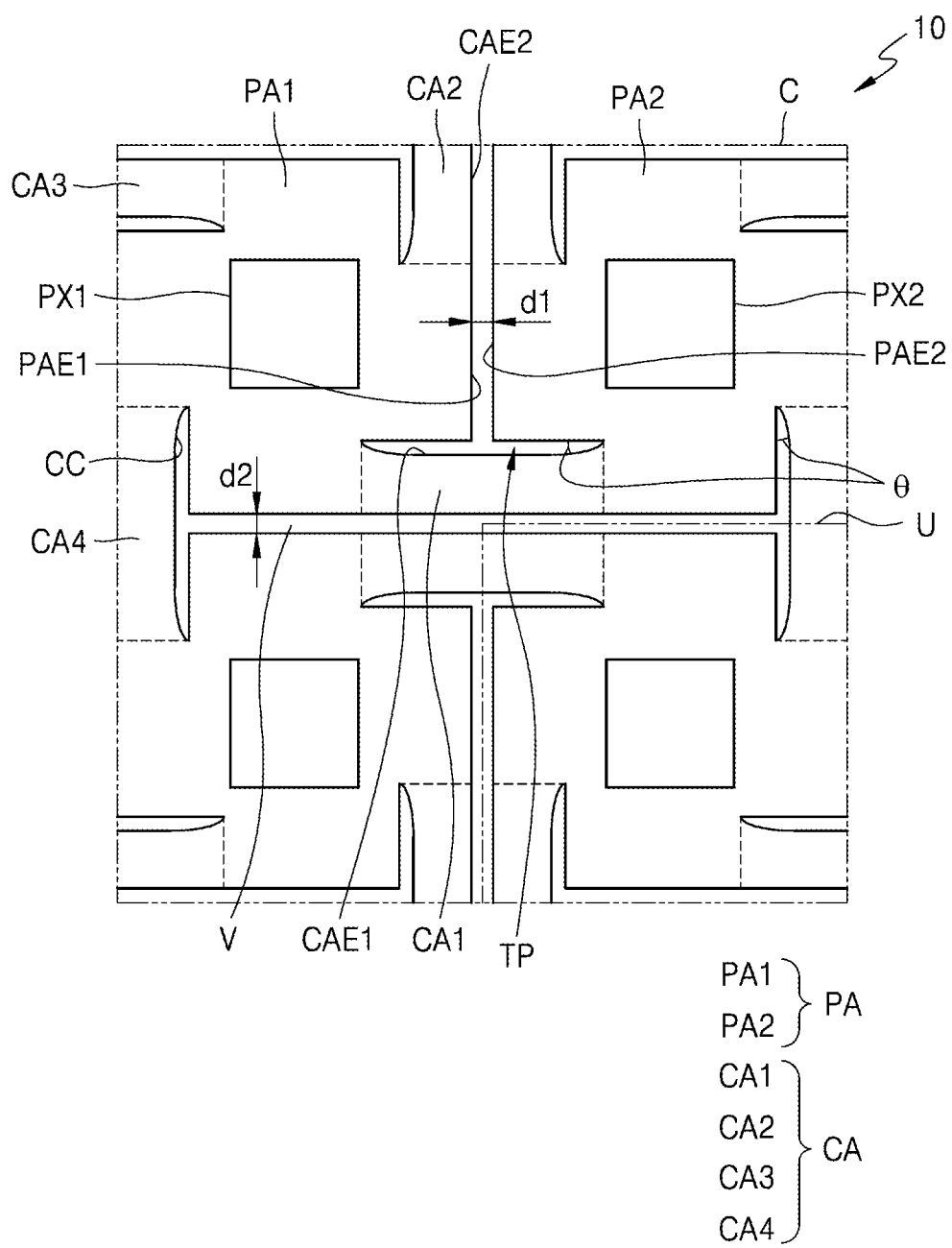
FIG. 7 is an enlarged view illustrating a portion C of the display panel of FIG. 4, according to an embodiment.
Figure 8:
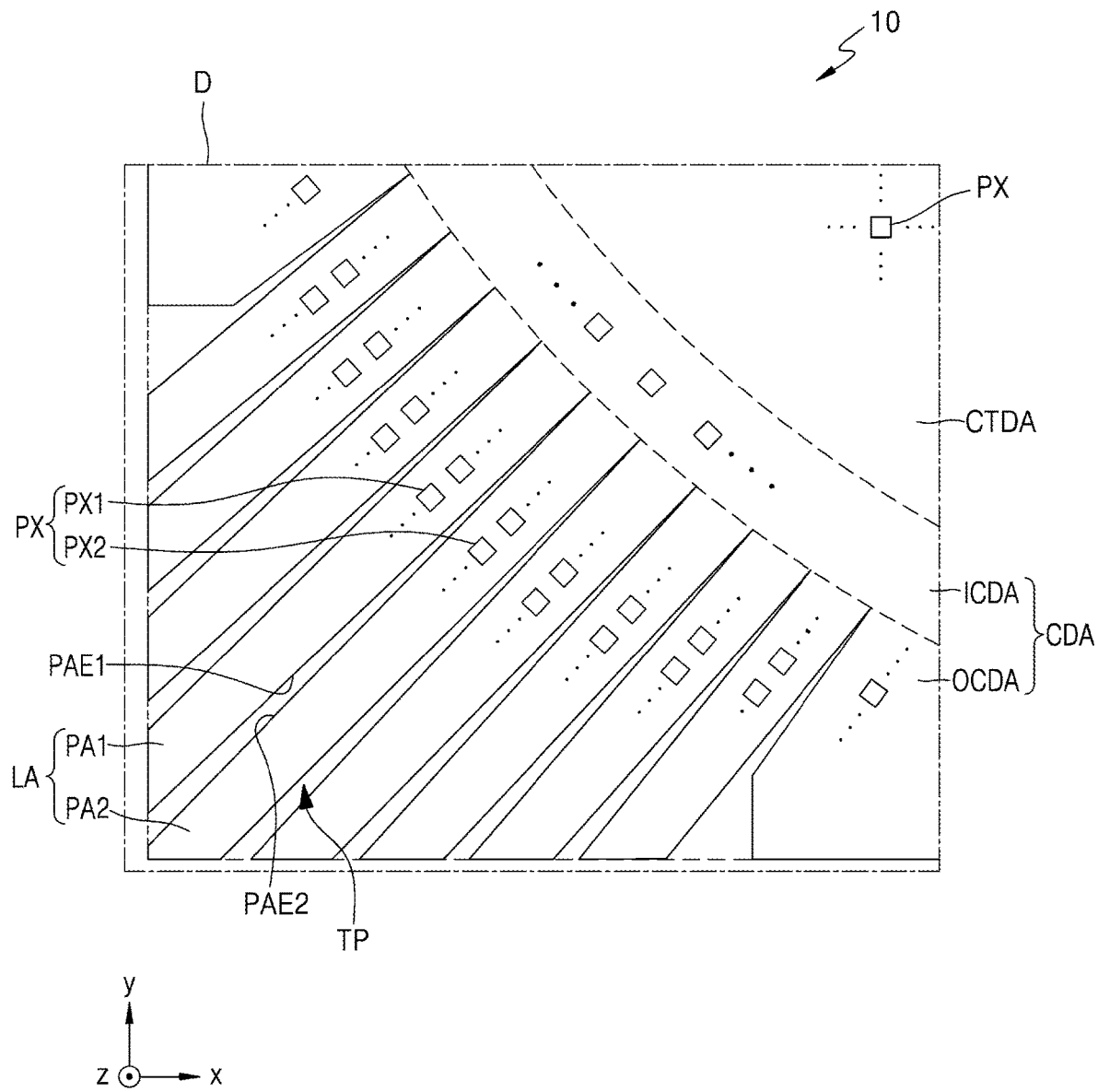
FIG. 8 is an enlarged view illustrating a portion D of the display panel of FIG. 4, according to an embodiment.

FIG. 7 is an enlarged view illustrating a portion C of the display panel 10 of FIG. 4, according to an embodiment. FIG. 8 is an enlarged view illustrating a portion D of the display panel 10 of FIG. 4, according to an embodiment.

Referring to FIGS. 7 and 8, the display panel 10 may include a through-portion TP passing through the display panel 10. An element of the display panel 10 may not be located in the through-portion TP. Accordingly, the display panel 10 may be stretched or contracted without damage. In another embodiment, the display panel 10 may not include the through-portion TP. In this case, the display panel 10 may include a material that is stretchable or contractible. The following will be described assuming that the display panel 10 includes the through-portion TP.

Referring to FIG. 7, the display panel 10 may include a pixel area PA and a connection area CA. The pixel area PA may be an area where a pixel is located. The pixel area PA may include a first pixel area PA1 and a second pixel area PA2. A first pixel PX1 may be located in the first pixel area PA1. A second pixel PX2 may be located in the second pixel area PA2. The connection area CA may include a first connection area CA1, a second connection area CA2, a third connection area CA3, and a fourth connection area CA4.

A plurality of pixel areas PA may be spaced apart from one another in the first direction (e.g., the x direction or the −x direction) or the second direction (e.g., the y direction or the −y direction). In an embodiment, the plurality of pixel areas PA may be spaced apart from one another by a first interval d1 and a second interval d2. For example, the first pixel area PA1 and the second pixel area PA2 may be spaced apart from each other in the first direction (e.g., the x direction or the −x direction) or the second direction (e.g., the y direction or the −y direction).

The connection area CA may extend between adjacent pixel areas PA. In an embodiment, each pixel area PA may be connected to four connection areas CA. Four connection areas CA connected to one pixel area PA may extend in different directions, and each connection area CA may be connected to another pixel area PA adjacent to the one pixel area PA.

In an embodiment, the first connection area CA1 may extend from the first pixel area PA1 to the second pixel area PA2. Accordingly, the first pixel area PA1 and the second pixel area PA2 may be connected by the first connection area CA1, and the first pixel area PA1, the second pixel area PA2, and the first connection area CA1 may be integrally formed with one another.

In an embodiment, at least a part of the through-portion TP may be defined by an edge PAE1 of the first pixel area PA1, an edge PAE2 of the second pixel area PA2, and an edge CAE1 of the first connection area CA1. In an embodiment, at least a part of the through-portion TP may be defined by the edge PAE1 of the first pixel area PA1, the edge PAE2 of the second pixel area PA2, the edge CAE1 of the first connection area CA1, and an edge CAE2 of the second connection area CA2.

One pixel area PA and parts of the connection areas CA extending from the pixel area PA may be defined as one basic unit U. The basic unit U may be repeatedly located in the first direction (e.g., the x direction or the −x direction) and the second direction (e.g., the y direction or the −y direction), and the display panel 10 may be provided by connecting the basic units U that are repeatedly located. Two adjacent basic units U may be symmetric to each other. For example, in FIG. 7, two basic units U that are laterally adjacent to each other may be symmetric to each other about an axis of symmetry that is located between the two basic units U and is parallel to the second direction (e.g., the y direction or the −y direction). Likewise, in FIG. 7, two basic units U that are vertically adjacent to each other may be symmetric to each other about an axis of symmetry that is located between the two basic units U and is parallel to the first direction (e.g., the x direction or the −x direction).

Adjacent basic units U from among the plurality of basic units U, for example, four basic units U illustrated in FIG. 7, may form a closed curve CL therebetween, and the closed curve CL may define a separation area V that is an empty space. The separation area V may be defined by the closed curve CL including edges of a plurality of pixel areas PA and edges of a plurality of connection areas CA. Each separation area V may pass through a top surface and a bottom surface of the display panel 10. The separation area V may overlap the through-portion TP of the display panel 10.

In an embodiment, an angle θ between the edge CAE1 of the first connection area CA1 and the edge PAE2 of the second pixel area PA2 may be an acute angle. When a tensile force or a compressive force is applied to the display panel 10, the angle θ between the edge CAE1 of the first connection area CA1 and the edge PAE2 of the second pixel area PA2 may be changed.

The first pixel PX1 and the second pixel PX2 may respectively overlap the first pixel area PA1 and the second pixel area PA2. In an embodiment, each of the first pixel PX1 and the second pixel PX2 may include a red sub-pixel, a green sub-pixel, and a blue sub-pixel. In another embodiment, each of the first pixel PX1 and the second pixel PX2 may include a red sub-pixel, a green sub-pixel, a blue sub-pixel, and a white sub-pixel.

Although a structure of the display panel 10 of the corner display area CDA is described as a structure of the display panel 10 of FIG. 7, in another embodiment, a structure of the display panel 10 of the central display area CTDA of FIG. 4 may also be the same as or similar to a structure of the display panel 10 of FIG. 7.

Referring to FIG. 8, the corner display area CDA may include an inner corner display area ICDA and an outer corner display area OCDA. The inner corner display area ICDA may be located between the outer corner display area OCDA and the central display area CTDA.

The outer corner display area OCDA may include an extension area LA that extends in one direction. The extension area LA may extend away from the central display area CTDA. The extension area LA may include a first pixel area PA1 and a second pixel area PA2. Each of the first pixel area PA1 and the second pixel area PA2 may extend away from the central display area CTDA. The first pixel area PA1 and the second pixel area PA2 may face each other.

A plurality of first pixels PX1 may be arranged in parallel in the first pixel area PA1. In an embodiment, the plurality of first pixels PX1 may be arranged in parallel in the first pixel area PA1 along one line. In another embodiment, the plurality of first pixels PX1 may be arranged in parallel in the first pixel area PA1 along a plurality of lines. A plurality of second pixels PX2 may be arranged in parallel in the second pixel area PA2. In an embodiment, the plurality of second pixels PX2 may be arranged in parallel in the second pixel area PA2 along one line. In another embodiment, the plurality of second pixels PX2 may be arranged in parallel in the second pixel area PA2 along a plurality of lines.

The through-portion TP may be located in the outer corner display area OCDA. The through-portion TP may be located between a plurality of extension areas LA. For example, the through-portion TP may be located between the first pixel area PA1 and the second pixel area PA2. At least a part of the through-portion TP may be defined by the edge PAE1 of the first pixel area PA1 and the edge PAE2 of the second pixel area PA2. In an embodiment, the through-portion TP may have a shape with one open side.

The through-portion TP may not be located in the inner corner display area ICDA. The pixels PX may be located in the inner corner display area ICDA.

Figure 9:
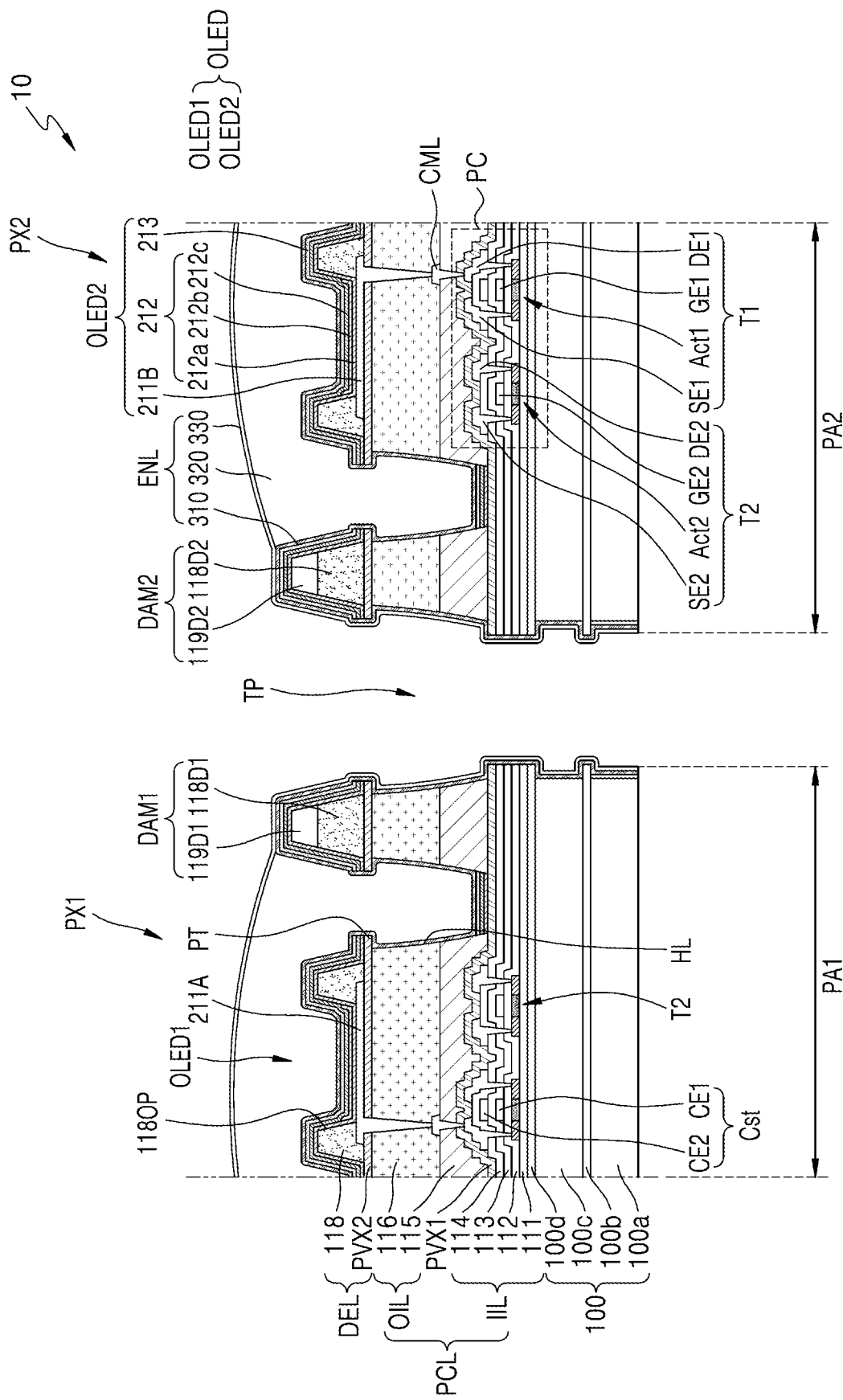
FIG. 9 is a cross-sectional view illustrating a display panel including a through-portion, according to an embodiment.

FIG. 9 is a cross-sectional view illustrating the display panel 10 including the through-portion TP, according to an embodiment. In FIG. 9, the same elements as those illustrated in FIG. 6 are denoted by the same reference numerals, and thus a repeated description thereof will be omitted.

Referring to FIG. 9, the display panel 10 may include the through-portion TP. The first pixel area PA1 and the second pixel area PA2 may be separated from each other with the through-portion TP therebetween. An edge of the first pixel area PA1 and an edge of the second pixel area PA2 may define at least a part of the through-portion TP.

The display panel 10 may include the substrate 100, the pixel circuit layer PCL, the display element layer DEL, and the encapsulation layer ENL. In an embodiment, the substrate 100, the pixel circuit layer PCL, the display element layer DEL, and the encapsulation layer ENL may be separated with the through-portion TP therebetween. In an embodiment, the pixel circuit layer PCL may further include a first inorganic layer PVX1. In an embodiment, the display element layer DEL may further include a second inorganic layer PVX2.

Hereinafter, a stacked structure of the display panel 10 including the through-portion TP will be described in detail. However, a stacked structure of the display panel 10 including the through-portion TP is not limited thereto, and various embodiments may be made.

The organic insulating layer OIL may have a hole HL. In an embodiment, the hole HL may be provided by overlapping a hole of the first organic insulating layer 115 and a hole of the second organic insulating layer 116. In another embodiment, the hole HL may be provided in the second organic insulating layer 116. In this case, a top surface of the first organic insulating layer 115 may be exposed through the hole of the second organic insulating layer 116. The following will be described assuming that the hole HL is provided in the first organic insulating layer 115 and the second organic insulating layer 116.

In some embodiments, the organic insulating layer OIL may include a groove formed in a thickness direction of the organic insulating layer OIL, instead of the hole HL. In some embodiments, the organic insulating layer OIL may not include the hole HL or the groove.

In an embodiment, the first inorganic layer PVX1 may be located between the interlayer insulating layer 114 and the first organic insulating layer 115. The first inorganic layer PVX1 may cover the first source electrode SE1, the first drain electrode DE1, the second source electrode SE2, and the second drain electrode DE2. In an embodiment, the first inorganic layer PVX1 may have a contact hole through which the first source electrode SE1 or the first drain electrode DE1 is electrically connected to the connection electrode CML.

In another embodiment, the first inorganic layer PVX1 may be located between the first organic insulating layer 115 and the second organic insulating layer 116. In this case, the first inorganic layer PVX1 may cover the connection electrode CML. At least a part of the first inorganic layer PVX1 may be exposed through the hole HL. The first inorganic layer PVX1 may have a single or multi-layer structure including an inorganic material such as silicon nitride (SiNx) or silicon oxide (SiO$_2$). In some embodiments, the first inorganic layer PVX1 may be omitted.

The organic light-emitting diode OLED may be located on the second organic insulating layer 116. The organic light-emitting diode OLED may include a first organic light-emitting diode OLED1 and a second organic light-emitting diode OLED2. The first organic light-emitting diode OLED1 that is a first display element may be located on the substrate 100 to overlap the first pixel area PA1. The first organic light-emitting diode OLED1 may implement the first pixel PX1. The second organic light-emitting diode OLED2 that is a second display element may be located on the substrate 100 to overlap the second pixel area PA2. The second organic light-emitting diode OLED2 may implement the second pixel PX2.

The first organic light-emitting diode OLED1 may include a first pixel electrode 211A, the intermediate layer 212, and the counter electrode 213. The second organic light-emitting diode OLED2 may include a second pixel electrode 211B, the intermediate layer 212, and the counter electrode 213. Each of the first pixel electrode 211A and the second pixel electrode 211B may be connected to the connection electrode CML through a contact hole of the second organic insulating layer 116.

The second inorganic layer PVX2 may be located between the organic light-emitting diode OLED and the second organic insulating layer 116. The second inorganic layer PVX2 may include a plurality of inorganic patterns spaced apart from one another on the second organic insulating layer 116. The second inorganic layer PVX2 may include a protruding tip PT that protrudes toward the center of the hole HL. Accordingly, a bottom surface of the protruding tip PT may be exposed through the hole HL. That is, the hole HL may have an undercut structure. The second inorganic layer PVX2 may have a single or multi-layer structure including an inorganic material such as silicon nitride (SiN$_x$) or silicon oxide (SiO$_2$).

The hole HL and the protruding tip PT of the second inorganic layer PVX2 may be a structure for disconnecting the first functional layer 212a and the second functional layer 212c. In an embodiment, the first functional layer 212a, the second functional layer 212c, and the counter electrode 213 may be formed on an entire surface of the substrate 100. In this case, each of the first functional layer 212a and the second functional layer 212c may include an organic material, and external oxygen or moisture may be introduced from the through-portion TP into the organic light-emitting diode OLED through at least one of the first functional layer 212a and the second functional layer 212c. The oxygen or moisture may damage the organic light-emitting diode OLED. The hole HL and the protruding tip PT of the second inorganic layer PVX2 may disconnect the first functional layer 212a and the second functional layer 212c, and separated first functional layer pattern and second functional layer pattern may be located in the hole HL. Accordingly, introduction of moisture or oxygen from the through-portion TP into the organic light-emitting diode OLED may be prevented, and damage to the organic light-emitting diode OLED may be prevented. However, a structure for disconnecting the first functional layer 212a and the second functional layer 212c is not limited thereto, and any of various structures for disconnecting the first functional layer 212a and the second functional layer 212c may be applied to the display panel 10.

A first dam portion DAM1 and a second dam portion DAM2 may be located on the second inorganic layer PVX2. Each of the first dam portion DAM1 and the second dam portion DAM2 may protrude in a thickness direction of the substrate 100 from the second inorganic layer PVX2. The first dam portion DAM1 and the second dam portion DAM2 may be located adjacent to the through-portion TP.

The first dam portion DAM1 may be located in the first pixel area PA1. In an embodiment, the first dam portion DAM1 may surround the first organic light-emitting diode OLED1. The first dam portion DAM1 may be located closer to the through-portion TP than the hole HL. The first dam portion DAM1 may include a first lower layer 118D1 and a first upper layer 119D1. In an embodiment, the first lower layer 118D1 may include the same material as that of the pixel-defining film 118. The first upper layer 119D1 may include an organic insulating material or an inorganic insulating material.

The second dam portion DAM2 may be located in the second pixel area PA2. In an embodiment, the second dam portion DAM2 may surround the second organic light-emitting diode OLED2. The second dam portion DAM2 may be located closer to the through-portion TP than the hole HL. The second dam portion DAM2 may include a second lower layer 118D2 and a second upper layer 119D2. In an embodiment, the second lower layer 118D2 may include the same material as that of the pixel-defining film 118 and the first lower layer 118D1. The pixel-defining film 118, the first lower layer 118D1, and the second lower layer 118D2 may be simultaneously formed. The second upper layer 119D2 may include an organic insulating material or an inorganic insulating material. The second upper layer 119D2 may include the same material as that of the first upper layer 119D1. The first upper layer 119D1 and the second upper layer 119D2 may be simultaneously formed. In some embodiments, at least one of the first dam portion DAM1 and the second dam portion DAM2 may be omitted.

The encapsulation layer ENL may cover the first organic light-emitting diode OLED1 and the second organic light-emitting diode OLED2. The encapsulation layer ENL may be located on the counter electrode 213. The encapsulation layer ENL may be separated with the through-portion TP therebetween. In an embodiment, the encapsulation layer ENL may include at least one inorganic encapsulation layer and at least one organic encapsulation layer. In an embodiment, in FIG. 9, the encapsulation layer ENL includes the first inorganic encapsulation layer 310, the organic encapsulation layer 320, and the second inorganic encapsulation layer 330 that are sequentially stacked.

The first inorganic encapsulation layer 310 may cover the organic light-emitting diode OLED. The first inorganic encapsulation layer 310 may entirely and continuously cover the substrate 100. The first inorganic encapsulation layer 310 may cover the first organic light-emitting diode OLED1, the hole HL, the first dam portion DAM1, the second dam portion DAM2, and the second organic light-emitting diode OLED2. The first inorganic encapsulation layer 310 may contact the protruding tip PT of the second inorganic layer PVX2. The first inorganic encapsulation layer 310 may contact the first inorganic layer PVX1. Accordingly, moisture or oxygen may be prevented from being introduced from the through-portion TP into the organic light-emitting diode OLED through a layer including an organic material. Also, the first inorganic encapsulation layer 310 may be separated by the through-portion TP.

The organic encapsulation layer 320 may be located on the first inorganic encapsulation layer 310. The organic encapsulation layer 320 may overlap the first organic light-emitting diode OLED1 and the second organic light-emitting diode OLED2, and the organic encapsulation layer 320 may fill the hole HL. In an embodiment, the organic encapsulation layer 320 may be separated by the through-portion TP. For example, the organic encapsulation layer 320 overlapping the first organic light-emitting diode OLED1 may extend to the first dam portion DAM1. The organic encapsulation layer 320 overlapping the second organic light-emitting diode OLED2 may extend to the second dam portion DAM2. Because the first dam portion DAM1 and the second dam portion DAM2 protrude in the thickness direction of the substrate 100 from a top surface of the second inorganic layer PVX2, the flow of the organic encapsulation layer 320 may be controlled.

The second inorganic encapsulation layer 330 may cover the organic encapsulation layer 320. The second inorganic encapsulation layer 330 may entirely and continuously cover the substrate 100. The second inorganic encapsulation layer 330 may contact the first inorganic encapsulation layer 310 on the first dam portion DAM1 and the second dam portion DAM2. Accordingly, the organic encapsulation layer 320 may be separated by the first dam portion DAM1 and the second dam portion DAM2. Also, the second inorganic encapsulation layer 330 may be separated by the through-portion TP.

Hereinafter, various embodiments of a method of controlling a display apparatus for bending the display panel 10 by controlling the display apparatus 1 described with reference to FIGS. 1 through 9 will be described.

Figure 10:
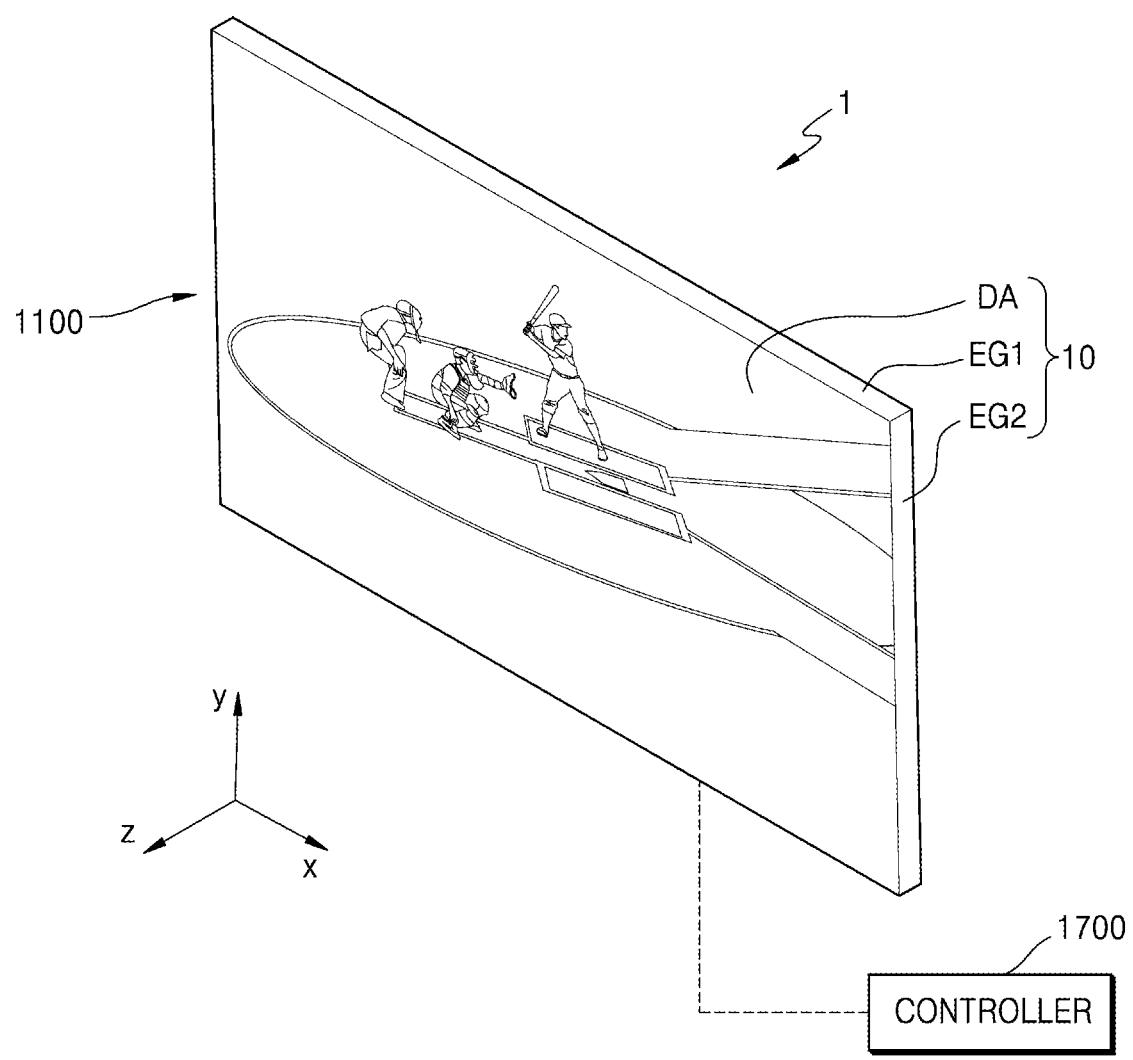
FIG. 10 is a perspective view illustrating a shape before a display apparatus for displaying an image is bent.
Figure 11A:
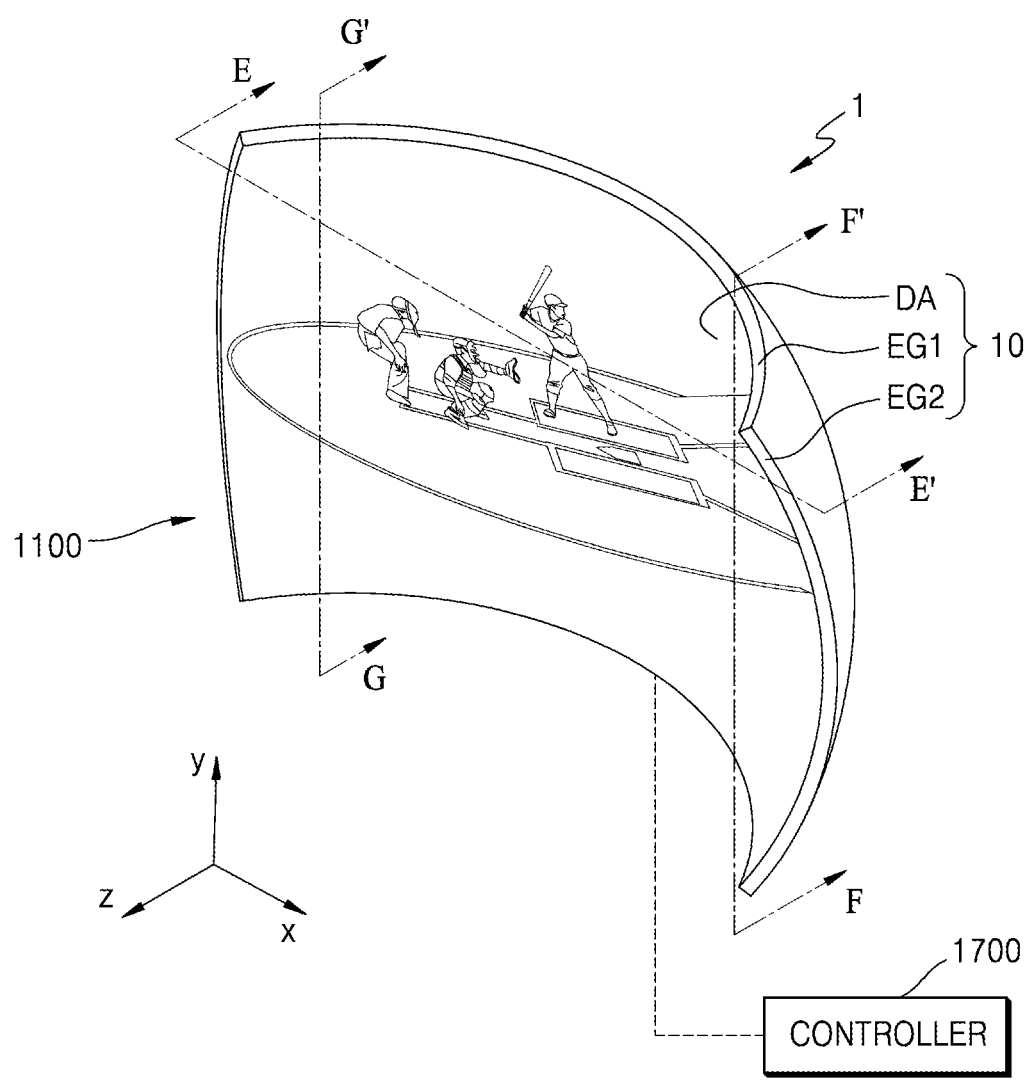
FIGS. 11A and 11B are perspective views each illustrating a shape after a display apparatus for displaying an image is bent.
Figure 11B:
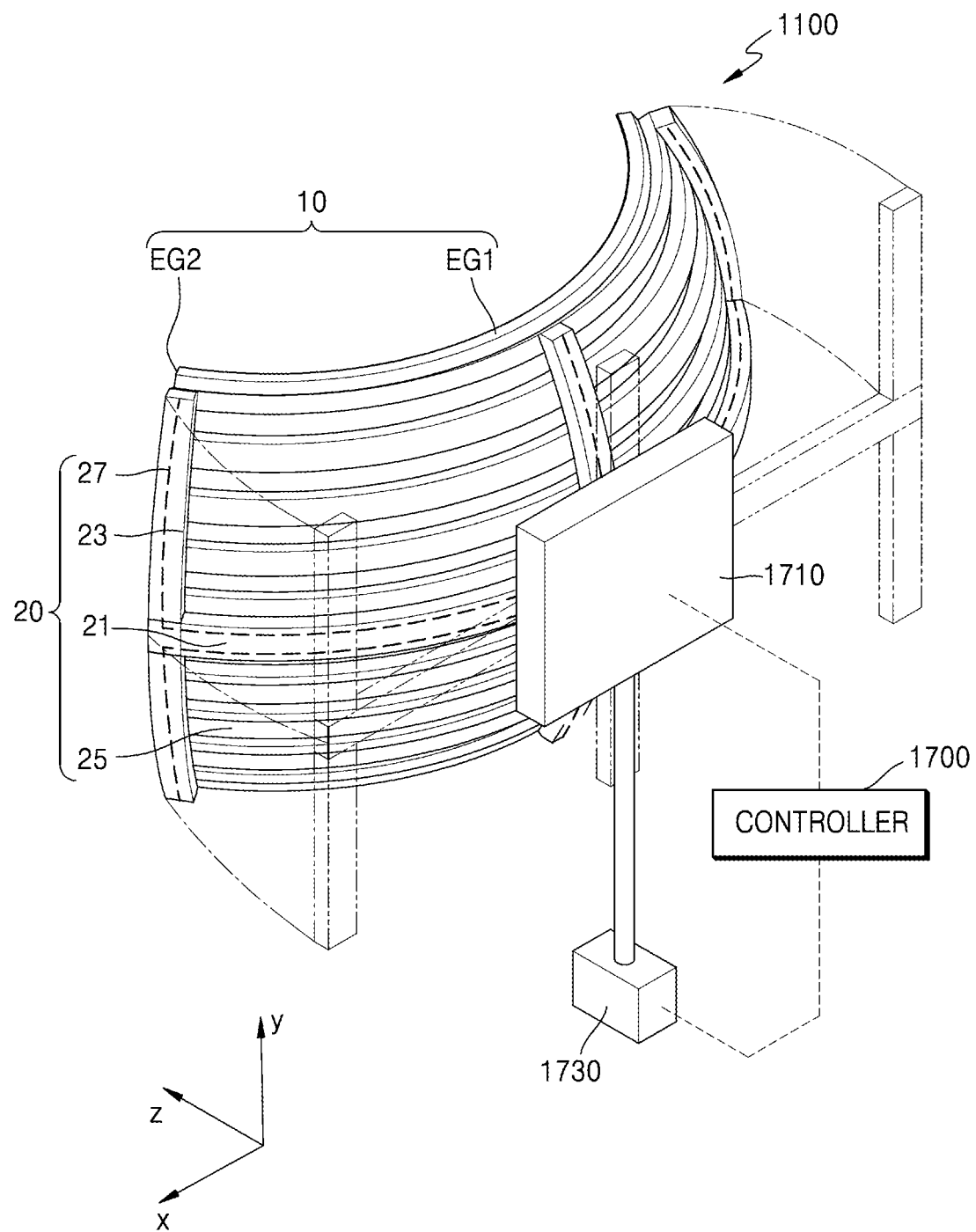

FIG. 10 is a perspective view illustrating a shape before the display apparatus 1 for displaying an image is bent. FIGS. 11A and 11B are perspective views each illustrating a shape after the display apparatus 1 for displaying an image is bent. FIG. 11A is a perspective view illustrating a front surface of the display unit 1100. FIG. 11B is a perspective view illustrating a rear surface of the display unit 1100.

Referring to FIG. 10, an image may be displayed in the display area DA of the display panel 10. The display panel 10 may include edges. In an embodiment, the display panel 10 may include the first edge EG1 extending in the first direction (e.g., the x direction or the −x direction) and the second edge EG2 extending in the second direction (e.g., the y direction or the −y direction).

In an embodiment, when the first edge EG1 extends in the first direction (e.g., the x direction or the −x direction) and the second edge EG2 extends in the second direction (e.g., the y direction or the −y direction), the display area DA of the display panel 10 may be a flat plane. When the display area DA is a flat plane, a distortion felt by a plurality of users who watch an image displayed in the display area DA may be prevented or reduced. Also, even when an image of the display apparatus 1 is watched from various angles, a distortion felt by a user may be prevented or reduced.

The controller 1700 may obtain information to bend the display panel 10. In an embodiment, the information obtained to bend the display panel 10 may be information corresponding to a manipulation of a remote controller connected to the display apparatus 1. In another embodiment, the information obtained to bend the display panel 10 may be information corresponding to a voice signal of the user who watches the image. In another embodiment, the information obtained to bend the display panel 10 may be information on a type of content included in the image. In another embodiment, the information obtained to bend the display panel 10 may be location information of at least one user who watches the image. For example, the location information of the at least one user may be location information of one user. In another example, the location information of the at least one user may be location information of a plurality of users. A detailed description of the information for bending the display panel 10 will be provided below.

Referring to FIGS. 11A and 11B, the controller 1700 may bend the display panel 10 so that each of the first edge EG1 and the second edge EG2 has a curvature by considering the obtained information. In an embodiment, in a state where the display panel 10 is bent, the first edge EG1 may have a curvature. In this case, a location of a point of the second edge EG2 may be changed in the first direction (e.g., the x direction or the −x direction). The location of the point of the second edge EG2 may be changed to be closer to the center of the display panel 10. Also, the location of the point of the second edge EG2 may be changed in the third direction (e.g., the z direction or the −z direction). In particular, the location of the point of the second edge EG2 may be changed in the z direction of FIGS. 11A and 11B.

In an embodiment, in a state where the display panel 10 is bent, the second edge EG2 may have a curvature. In this case, a location of a point of the first edge EG1 may be changed in the second direction (e.g., the y direction or the −y direction). The location of the point of the first edge EG1 may be changed to be closer to the center of the display panel 10. Also, the location of the point of the first edge EG1 may be changed in the third direction (e.g., the z direction or the −z direction). In particular, the location of the point of the first edge EG1 may be changed in the z direction of FIGS. 11A and 11B. Accordingly, the display panel 10 may be changed into a concave shape. In this case, the presence or immersion of a user who watches an image displayed in the display area DA may increase.

Although the display panel 10 is changed from a flat shape into a concave shape, the display panel 10 may be changed from a concave shape into a flat shape.

An embodiment may include a state where the display panel 10 is flat and a state where the display panel 10 is bent and is concave. Accordingly, a size of a space occupied by the display apparatus 1 may be adjusted.

According to an embodiment, the controller 1700 may bend the display panel so that each of the first edge EG1 and the second edge EG2 has a curvature by considering obtained information. Accordingly, according to an embodiment, various viewing experiences may be provided to a user based on obtained information, and the utilization of the display apparatus 1 may be diversified.

Referring to FIG. 11B, the frame assembly 20 may bend the display panel 10. The frame assembly 20 may bend the display panel 10 from the first direction (e.g., the x direction or the −x direction) to the third direction (e.g., the z direction or the −z direction). The first edge EG1 of the bent display panel 10 may have a curvature.

When an element is bent from the first direction (e.g., the x direction or the −x direction) to the third direction (e.g., the z direction or the −z direction), it means that a cross-section of the element intersecting a plane (e.g., an xz plane) extending in the first direction (e.g., the x direction or the −x direction) and the third direction (e.g., the z direction or the −z direction) is bent to be concave or convex.

The frame assembly 20 may bend the display panel 10 from the second direction (e.g., the y direction or the −y direction) to the third direction (e.g., the z direction or the −z direction). In this case, the second edge EG2 of the bent display panel 10 may have a curvature.

When an element is bent from the second direction (e.g., the y direction or the −y direction) to the third direction (e.g., the z direction or the −z direction), it means that a cross-section of the element intersecting a plane (e.g., a yz plane) extending in the second direction (e.g., the y direction or the −y direction) and the third direction (e.g., the z direction or the −z direction) is bent to be concave or convex.

The first frame 21 may extend in the first direction (e.g., the x direction or the −x direction), and may be located behind the display panel 10. The first frame 21 may be bent from the first direction (e.g., the x direction or the −x direction) to the third direction (e.g., the z direction or the −z direction). The first frame 21 may be bent under the control of the controller 1700. Accordingly, the first frame 21 may bend the display panel 10 from the first direction (e.g., the x direction or the −x direction) to the third direction (e.g., the z direction or the −z direction). Also, the first frame 21 may bend the first edge EG1 of the display panel 10 to have a curvature.

The second frame 23 may extend in the second direction (e.g., the y direction or the −y direction), and may be located behind the display panel 10. The second frame 23 may be bent from the second direction (e.g., the y direction or the −y direction) to the third direction (e.g., the z direction or the −z direction). The second frame 23 may be bent under the control of the controller 1700. Accordingly, the second frame 23 may bend the display panel 10 from the second direction (e.g., the y direction or the −y direction) to the third direction (e.g., the z direction or the −z direction). Also, the second frame 23 may bend the second edge EG2 of the display panel 10 to have a curvature.

In an embodiment, the wire 27 may bend the first frame 21 or the second frame 23. For example, when the wire 27 is contracted or a length of the wire 27 is reduced by a motor, the first frame 21 or the second frame 23 may be bent.

In an embodiment, the plurality of supporters 25 may extend in the first direction (e.g., the x direction or the −x direction). In an embodiment, the plurality of supporters 25 may be spaced apart from one another in the second direction (e.g., the y direction or the −y direction).

The plurality of supporters 25 may be bent from the first direction (e.g., the x direction or the −x direction) to the third direction (e.g., the z direction or the −z direction). In an embodiment, the first frame 21 may bend the plurality of supporters 25 from the first direction (e.g., the x direction or the −x direction) to the third direction (e.g., the z direction or the −z direction). For example, when the first frame 21 is bent from the first direction (e.g., the x direction or the −x direction) to the third direction (e.g., the z direction or the −z direction), the plurality of supporters 25 may also be bent from the first direction (e.g., the x direction or the −x direction) to the third direction (e.g., the z direction or the −z direction). Accordingly, the display panel 10 may be bent from the first direction (e.g., the x direction or the −x direction) to the third direction (e.g., the z direction or the −z direction).

At least one of the plurality of supporters 25 may move in the third direction (e.g., the z direction or the −z direction). For example, the supporter 25 adjacent to the first edge EG1 from among the plurality of supporters 25 may move in the third direction (e.g., the z direction or the −z direction). In an embodiment, the second frame 23 may move at least one of the plurality of supporters 25 in the third direction (e.g., the z direction or the −z direction). For example, when the second frame 23 is bent from the second direction (e.g., the y direction or the −y direction) to the third direction (e.g., the z direction or the −z direction), at least one of the plurality of supporters 25 may move in the third direction (e.g., the z direction or the −z direction). Accordingly, the display panel 10 may be bent from the second direction (e.g., the y direction or the −y direction) to the third direction (e.g., the z direction or the −z direction).

The controller 1700 may obtain information to bend the display panel 10, and may bend the display panel 10 by using the obtained information. The controller 1700 may include the first driver 1710 and the second driver 1730.

The first driver 1710 may control the frame assembly 20. In an embodiment, the first driver 1710 may control bending of the first frame 21 or the second frame 23. In an embodiment, the first driver 1710 may include a motor. The motor may contract the wire 27, or may reduce a length of the wire 27 by winding the wire 27.

In an embodiment, the first driver 1710 may include a plurality of motors. The plurality of motors may control bending of the first frame 21 and the second frame 23. In an embodiment, the plurality of motors may control bending of one frame. For example, when the plurality of motors control the first frame 21, the plurality of motors may independently adjust bending of both ends of the first frame 21. In another example, when the plurality of motors control the second frame 23, the plurality of motors may independently adjust bending of both ends of the second frame 23. Accordingly, the display panel 10 may be bent into various shapes.

The second driver 1730 may control the display unit 1100 to rotate about the second direction (e.g., the y direction or the −y direction). In an embodiment, the second driver 1730 may include a motor. The motor may rotate the display unit 1100 about the second direction (e.g., the y direction or the −y direction). Accordingly, the display panel 10 may rotate about the second direction (e.g., the y direction or the −y direction) due to the controller 1700.

Figure 12A:
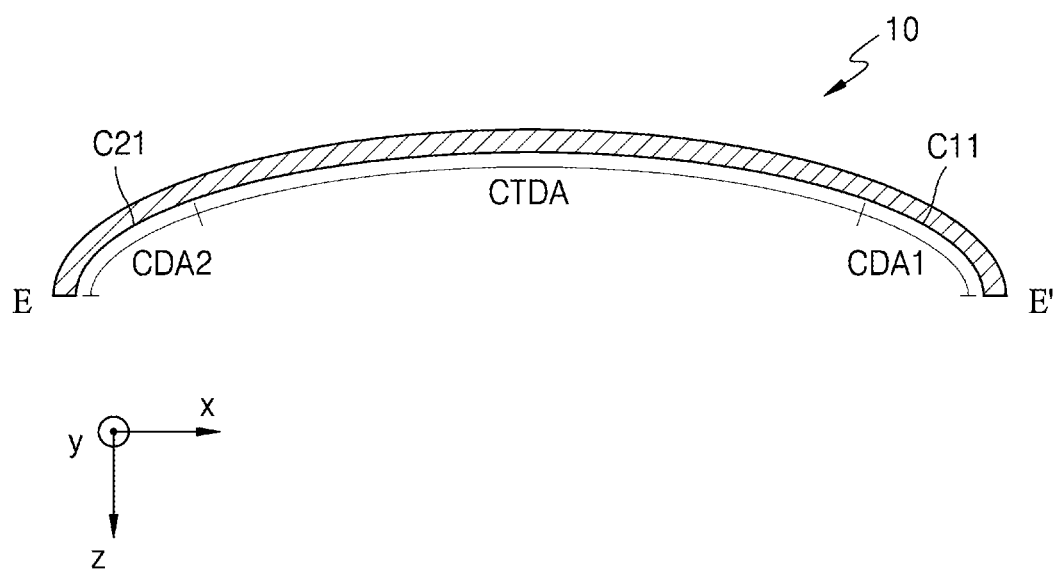
FIG. 12A is a cross-sectional view taken along line E-E' of a bent display panel of FIG. 11A.
Figure 12B:
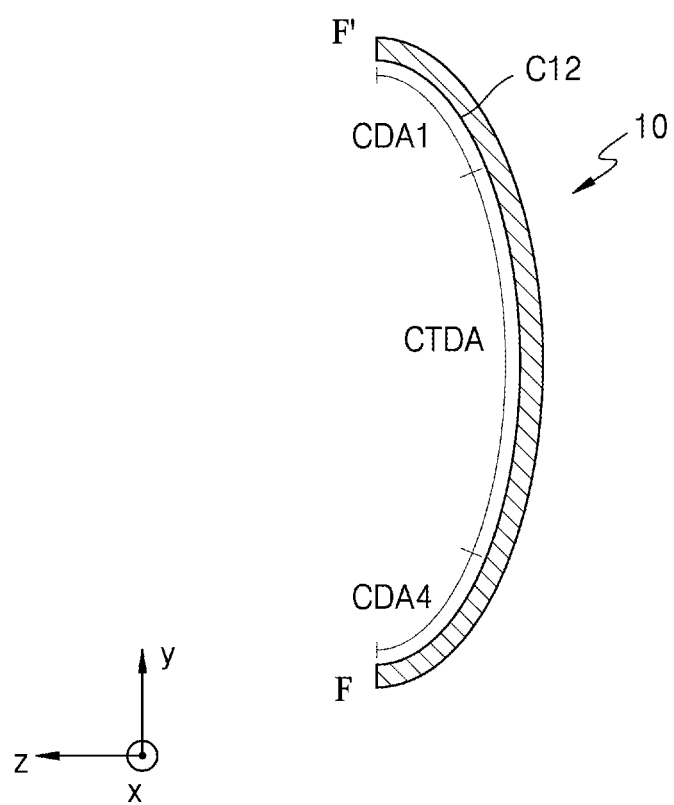
FIG. 12B is a cross-sectional view taken along line F-F' of the bent display panel of FIG. 11A.
Figure 12C:
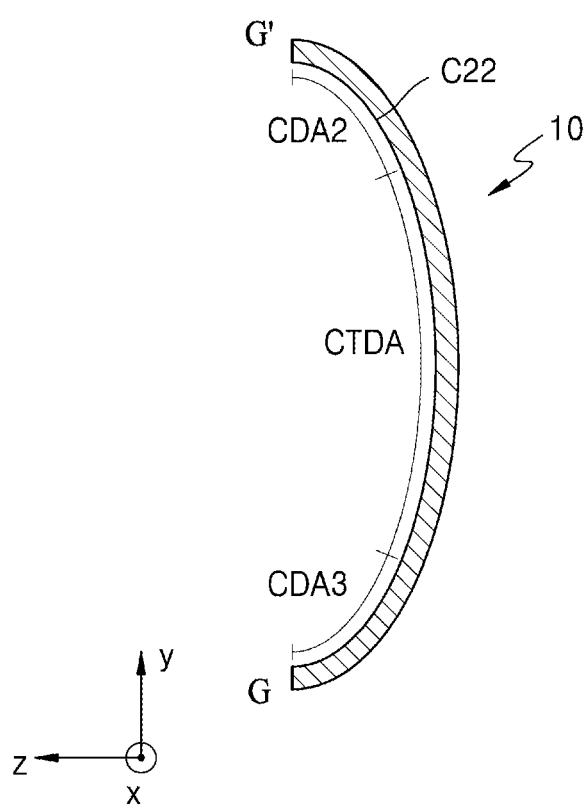
FIG. 12C is a cross-sectional view taken along line G-G' of the bent display panel of FIG. 11A.

FIG. 12A is a cross-sectional view taken along line E-E' of the bent display panel 10 of FIG. 11A. FIG. 12B is a cross-sectional view taken along line F-F' of the bent display panel 10 of FIG. 11A. FIG. 12C is a cross-sectional view taken along line G-G' of the bent display panel 10 of FIG. 11A. In FIGS. 12A through 12C, the same elements as those illustrated in FIG. 4 are denoted by the same reference numerals, and thus a repeated description thereof will be omitted.

Referring to FIGS. 12A through 12C, the display panel 10 may include a display area. The display area of the bent display panel 10 may have a concave shape. The display area may include the central display area CTDA and a corner display area. The central display area CTDA may be located at the center of the display panel 10. The corner display area may be located between the central display area CTDA and a corner where edges of the display panel 10 meet each other.

The display panel 10 may include a plurality of corner display areas. For example, the display panel 10 may include the first corner display area CDA1, the second corner display area CDA2, the third corner display area CDA3, and the fourth corner display area CDA4.

The corner display areas may include a first direction curvature and a second direction curvature. The first direction curvature may be defined as a curvature in a cross-section (e.g., an xz cross-section) in the first direction (e.g., the x direction or the −x direction). The second direction curvature may be defined as a curvature in a cross-section (e.g., an yz cross-section) in the second direction (e.g., the y direction or the −y direction).

In an embodiment, the first corner display area CDA1 may include a first direction first curvature C11 and a second direction first curvature C12. In an embodiment, the second corner display area CDA2 may include a first direction second curvature C21 and a second direction second curvature C22. In an embodiment, the third corner display area CDA3 may include a first direction third curvature and a second direction third curvature. In an embodiment, the fourth corner display area CDA4 may include a first direction fourth curvature and a second direction fourth curvature.

Accordingly, the bent display panel 10 may be concave when viewed in the cross-section (e.g., the xz cross-section) in the first direction (e.g., the x direction or the −x direction). The bent display panel 10 may be concave when viewed in the cross-section (e.g., the yz cross-cross-section) in the second direction (e.g., the y direction or the −y direction).

In an embodiment, at least one of the plurality of corner display areas may not have a first direction curvature. In an embodiment, at least one of the plurality of corner display areas may not have a second direction curvature.

In an embodiment, a first direction curvature of one of the plurality of corner display areas may be the same as a first direction curvature of another one of the plurality of corner display areas. For example, the first direction first curvature C11 of the first corner display area CDA1 may be the same as the first direction second curvature C21 of the second corner display area CDA2. In another embodiment, a first direction curvature of one of the plurality of corner display areas may be different from a first direction curvature of another one of the plurality of corner display areas. For example, the first direction first curvature C11 of the first corner display area CDA1 may be different from the first direction second curvature C21 of the second corner display area CDA2. The first direction first curvature C11 of the first corner display area CDA1 may be less or greater than the first direction second direction C21 of the second corner display area CDA2. The controller 1700 may adjust first direction curvatures of the plurality of corner display areas by controlling the first frame 21 of FIG. 11B.

In an embodiment, a second direction curvature of one of the plurality of corner display areas may be the same as a second direction curvature of another one of the plurality of corner display areas. For example, the second direction first curvature C12 of the first corner display area CDA1 may be the same as the second direction second curvature C22 of the second corner display area CDA2. In another embodiment, a first direction curvature of one of the plurality of corner display areas may be different from a first direction curvature of another one of the plurality of corner display areas. For example, the second direction first curvature C12 of the first corner display area CDA1 may be different from the second direction second curvature C22 of the second corner display area CDA2. The second direction first curvature C12 of the first corner display area CDA1 may be less or greater than the second direction second curvature C22 of the second corner display area CDA2. The controller 1700 may adjust second direction curvatures of the plurality of corner display areas by controlling the second frame 23 of FIG. 11B.

The display panel 10 may include a structure or a material that is stretchable or contractible. Accordingly, the display panel 10 may be bent from the first direction (e.g., the x direction or the −x direction) to the third direction (e.g., the z direction or the −z direction), and may be bent from the second direction (e.g., the y direction or the −y direction) to the third direction (e.g., the z direction or the −z direction). The controller 1700 may bend the display panel 10 into various shapes by controlling the first frame 21 and the second frame 23.

Figure 13:
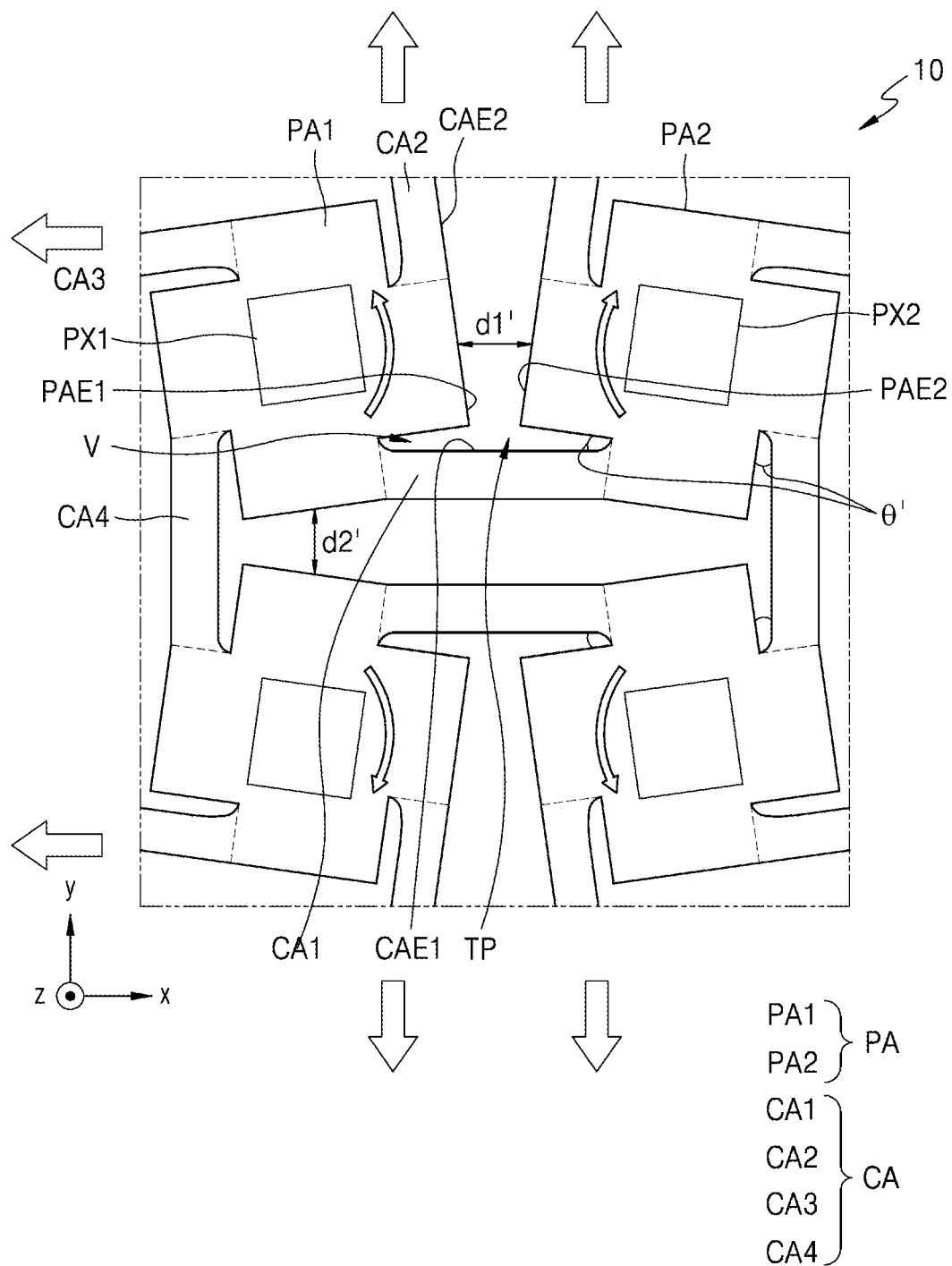
FIG. 13 is an enlarged view illustrating a portion of a display area of a bent display panel, according to an embodiment.

FIG. 13 is an enlarged view illustrating a part of a display area of the bent display panel 10, according to an embodiment. In FIG. 13, the same elements as those illustrated in FIG. 7 are denoted by the same reference numerals, and thus a repeated description thereof will be omitted.

Referring to FIG. 13, the display panel 10 may include the through-portion TP passing through the display panel 10. An element of the display panel 10 may not be located in the through-portion TP. Accordingly, the display panel 10 may be stretched or contracted without damage.

In an embodiment, a shape of the through-portion TP of the bent display panel 10 may be changed. An angle θ' between the edge CAE1 of the first connection area CA1 and the edge PAE2 of the second pixel area PA2 in the bent display panel 10 may be changed, a size or a shape of a separation area V' may be changed, and a position of the pixel area PA may also be changed.

Through such a change in the angle θ', an increase in the separation area V', or a change in the shape, each pixel area PA may rotate at a certain angle. Due to the rotation of each pixel area PA, an interval between the pixel areas PA, for example, a first interval d1' and a second interval d2' may vary according to locations.

In the bent display panel 10, stress may be generated in the first direction (e.g., the x direction or the −x direction), the second direction (e.g., the y direction or the −y direction), or the third direction (e.g., the z direction or the −z direction). When the display panel 10 includes the through-portion TP, a shape of the through-portion TP of the bent display panel 10 may be changed, and stress may be reduced in the first direction (e.g., the x direction or the −x direction), the second direction (e.g., the y direction or the −y direction), or the third direction (e.g., the z direction or the −z direction). Accordingly, damage to the display panel 10 may be prevented or reduced.

Figure 14A:
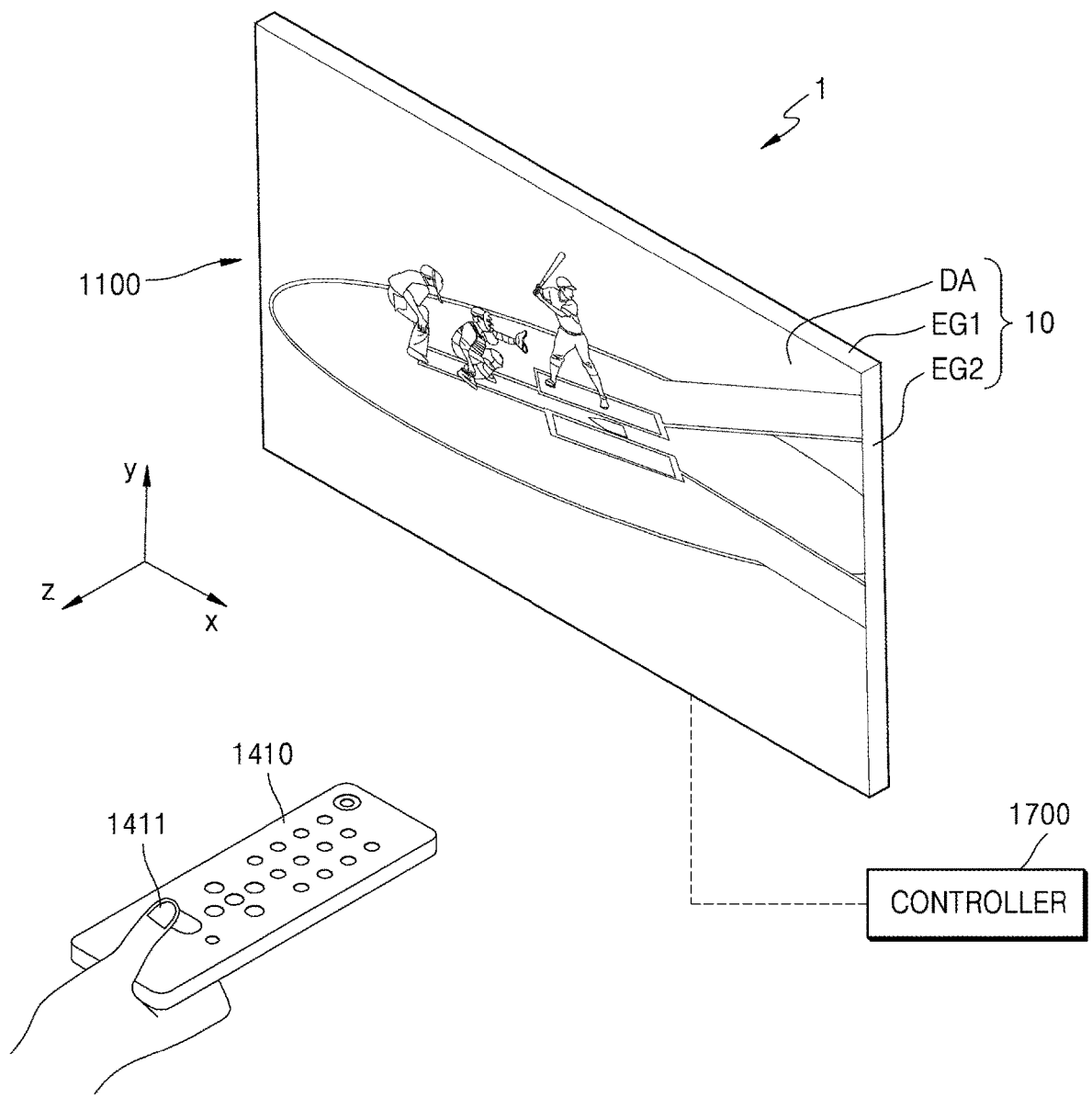
FIGS. 14A and 14B are views illustrating that a display panel is bent by considering information corresponding to a manipulation of a remote controller, according to an embodiment.
Figure 14B:
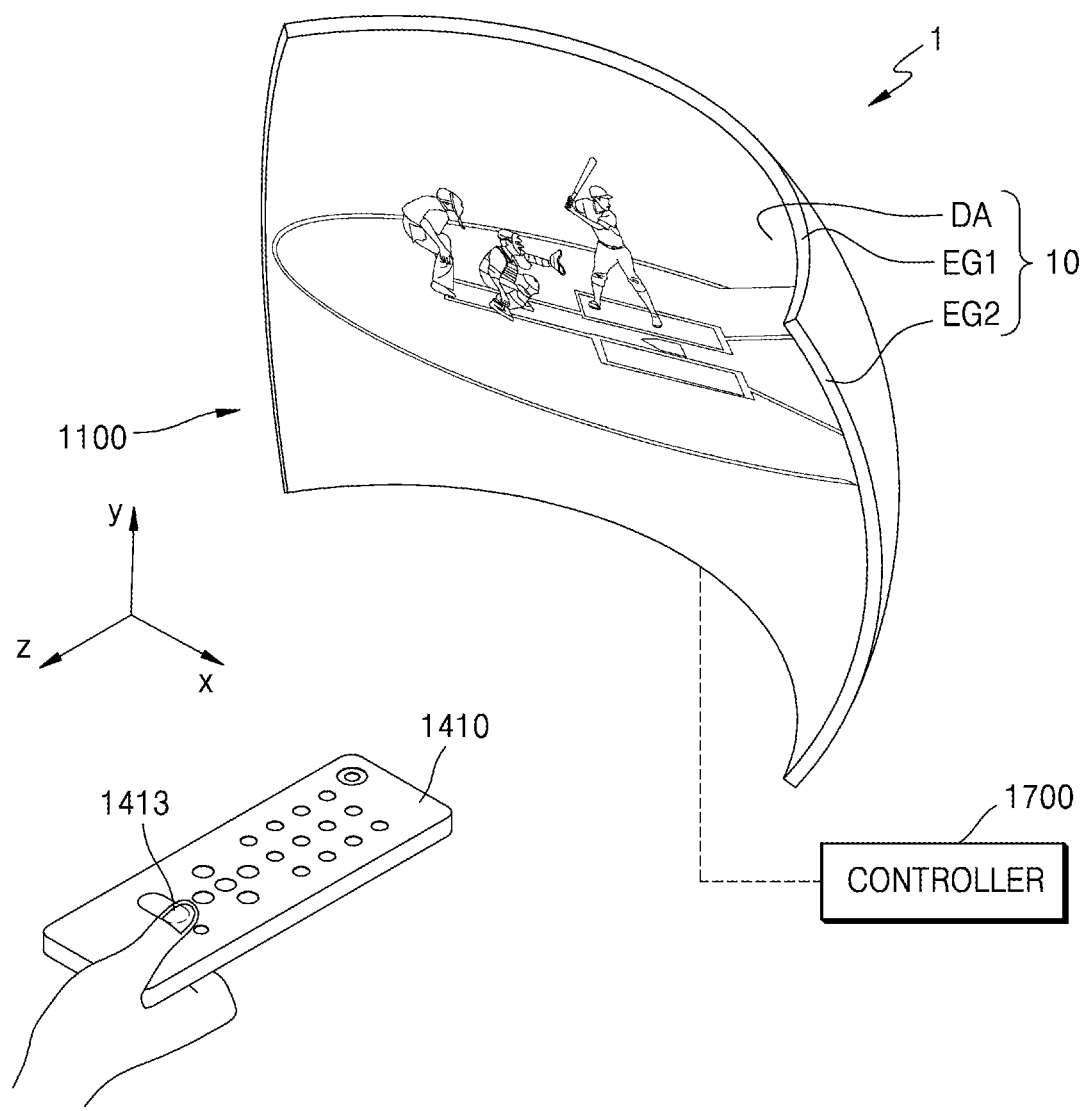

FIGS. 14A and 14B are views illustrating that the display panel 10 is bent by considering information corresponding to a manipulation of a remote controller, according to an embodiment. In FIGS. 14A and 14B, the same elements as those illustrated in FIGS. 10 and 11A are denoted by the same reference numerals, and thus a repeated description thereof will be omitted.

Referring to FIGS. 14A and 14B, an image may be displayed in the display area DA of the display panel 10. The display panel 10 may include edges. In an embodiment, the display panel 10 may include the first edge EG1 extending in the first direction (e.g., the x direction or the −x direction) and the second edge EG2 extending in the second direction (e.g., the y direction or the −y direction).

The controller 1700 may obtain information to bend the display panel 10. The information obtained to bend the display panel 10 may be information corresponding to a manipulation of a remote controller 1410 connected to the display apparatus 1. The information corresponding to the manipulation of the remote controller 1410 may be an output signal generated in response to a manipulation of a user who selects a button of the remote controller 1410 or a menu of the remote controller 1410 to bend the display panel 10.

The controller 1700 may control the display panel 10 so that the display panel 10 is bent and an image is displayed, by considering the information corresponding to the manipulation of the remote controller 1410.

Referring to FIG. 14A, the information corresponding to the manipulation of the remote controller 1410 may be a first output signal corresponding to a manipulation of the remote controller 1410 of the user who selects a first button 1411 of the remote controller. The controller 1700 may obtain the first output signal to bend the display panel 10, and may control the display panel 10 to be bent and an image to be displayed by considering the obtained first output signal. In an embodiment, the controller 1700 may control the first edge EG1 and the second edge EG2 to respectively extend in the first direction (e.g., the x direction or the −x direction) and the second direction (e.g., the y direction or the −y direction). Accordingly, the display panel 10 may be flat.

Referring to FIG. 14B, the information corresponding to the manipulation of the remote controller 1410 may be a second output signal corresponding to a manipulation of the remote controller 1410 of the user who selects a second button 1413 of the remote controller. The controller 1700 may obtain the second output signal to bend the display panel 10, and may control the display panel 10 to be bent and an image to be displayed by considering the obtained second output signal. In an embodiment, the controller 1700 may bend the display panel 10 so that each of the first edge EG1 and the second edge EG2 has a curvature by considering the second output signal.

Although one second button 1413 is illustrated in FIG. 14B, in another embodiment, a plurality of second buttons 1413 may be provided. In this case, the information corresponding to the manipulation of the remote controller 1410 may be a second output signal corresponding to a manipulation of the remote controller 1410 of the user who selects at least one of the plurality of second buttons 1413. In an embodiment, the controller 1700 may control a degree to which the display panel 10 is bent from the first direction (e.g., the x direction or the −x direction) to the third direction (e.g., the z direction or the −z direction) by considering a second output signal corresponding to a manipulation of the remote controller 1410 of the user who selects at least one of the plurality of second buttons 1413. In an embodiment, the controller 1700 may control a degree to which the display panel 10 is bent from the second direction (e.g., the y direction or the −y direction) to the third direction (e.g., the z direction or the −z direction) by considering a second output signal corresponding to a manipulation of the remote controller 1410 of the user who selects another one of the plurality of second buttons 1413. Accordingly, the user may watch an image displayed in the display panel 10 bent into various shapes.

Figure 15A:
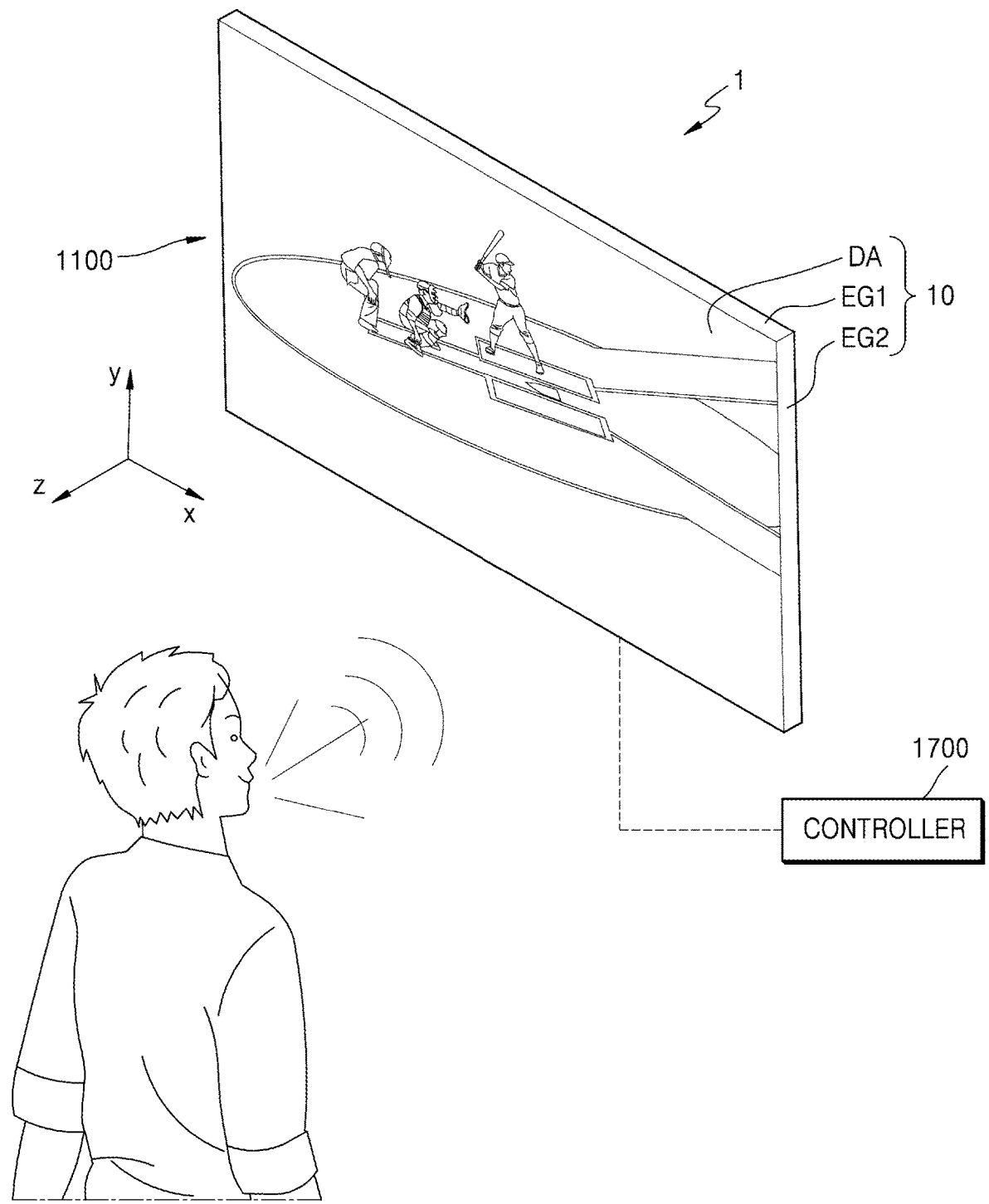
FIGS. 15A and 15B are views illustrating that a display panel is bent by considering information corresponding to a voice signal of a user, according to an embodiment.
Figure 15B:
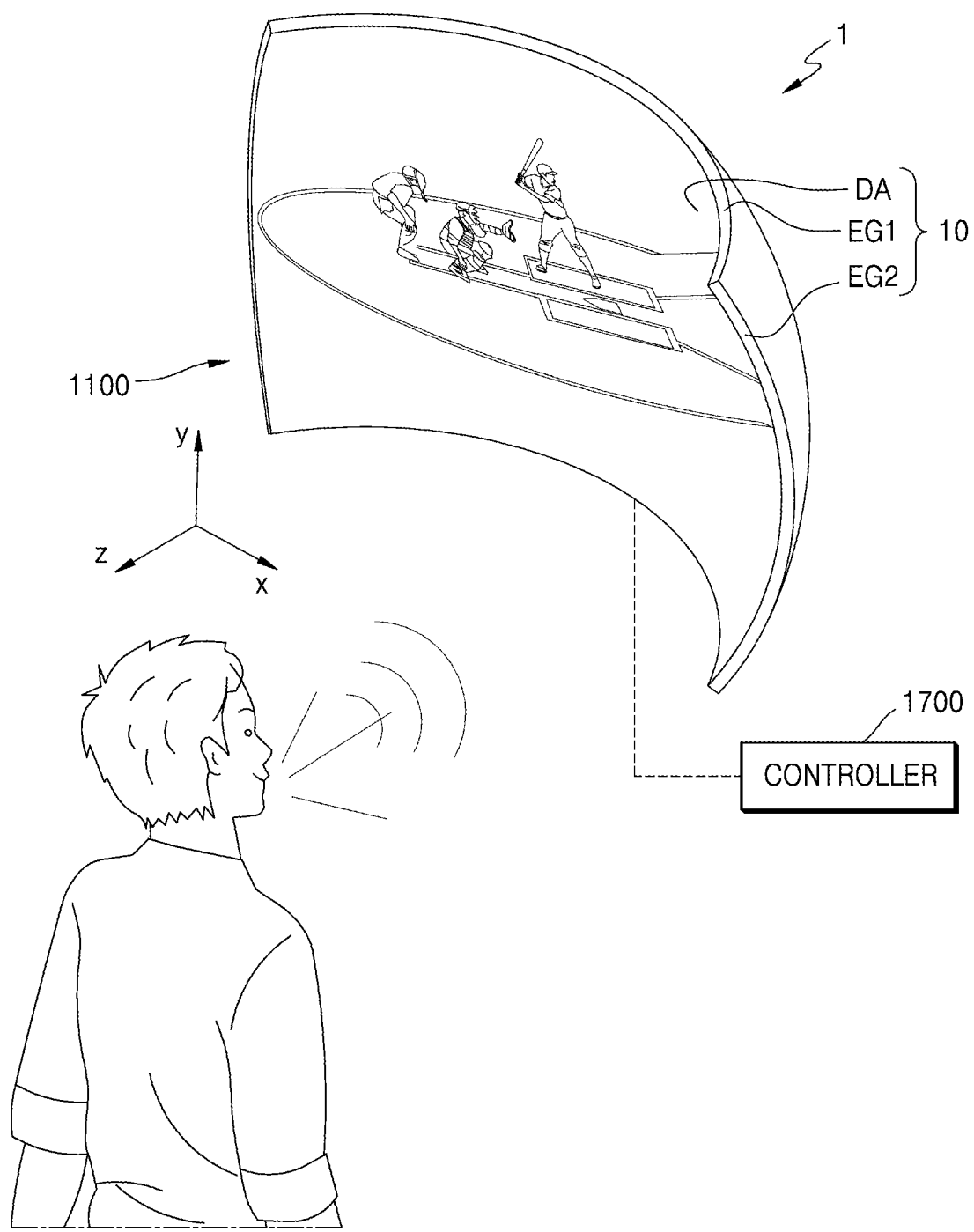

FIGS. 15A and 15B are views illustrating that the display panel 10 is bent by considering information corresponding to a voice signal of a user, according to an embodiment. In FIGS. 15A and 15B, the same elements as those illustrated in FIGS. 14A and 14B are denoted by the same reference numerals, and thus a repeated description thereof will be omitted.

Referring to FIGS. 15A and 15B, an image may be displayed in the display area DA of the display panel 10. The display panel 10 may include edges. In an embodiment, the display panel 10 may include the first edge EG1 extending in the first direction (e.g., the x direction or the −x direction) and the second edge EG2 extending in the second direction (e.g., the y direction or the −y direction).

The controller 1700 may obtain information to bend the display panel 10. The information obtained to bend the display panel 10 may be information corresponding to a voice signal of a user who watches an image.

The controller 1700 may obtain information corresponding to a voice signal of the user to bend the display panel 10, and may control the display panel 10 to be bent and an image to be displayed by considering the obtained information corresponding to the voice signal of the user.

Referring to FIG. 15A, the voice signal of the user may be a preset first voice signal. For example, the preset first voice signal may be a voice signal indicating that an image is to be displayed in a flat surface. In this case, the controller 1700 may control the first edge EG1 and the second edge EG2 to respectively extend in the first direction (e.g., the x direction or the −x direction) and the second direction (e.g., the y direction or the −y direction). Accordingly, the display panel 10 may be flat.

Referring to FIG. 15B, the voice signal of the user may be a preset second voice signal. For example, the preset second voice signal may be a voice signal indicating that "an image is to be displayed in a curved surface". Alternatively, the preset second voice signal may be a voice signal indicating that "I'd like to watch an image alone". In this case, the controller 1700 may control the display panel 10 to be bent so that each of the first edge EG1 and the second edge EG2 has a curvature by considering the obtained information.

Figure 16A:
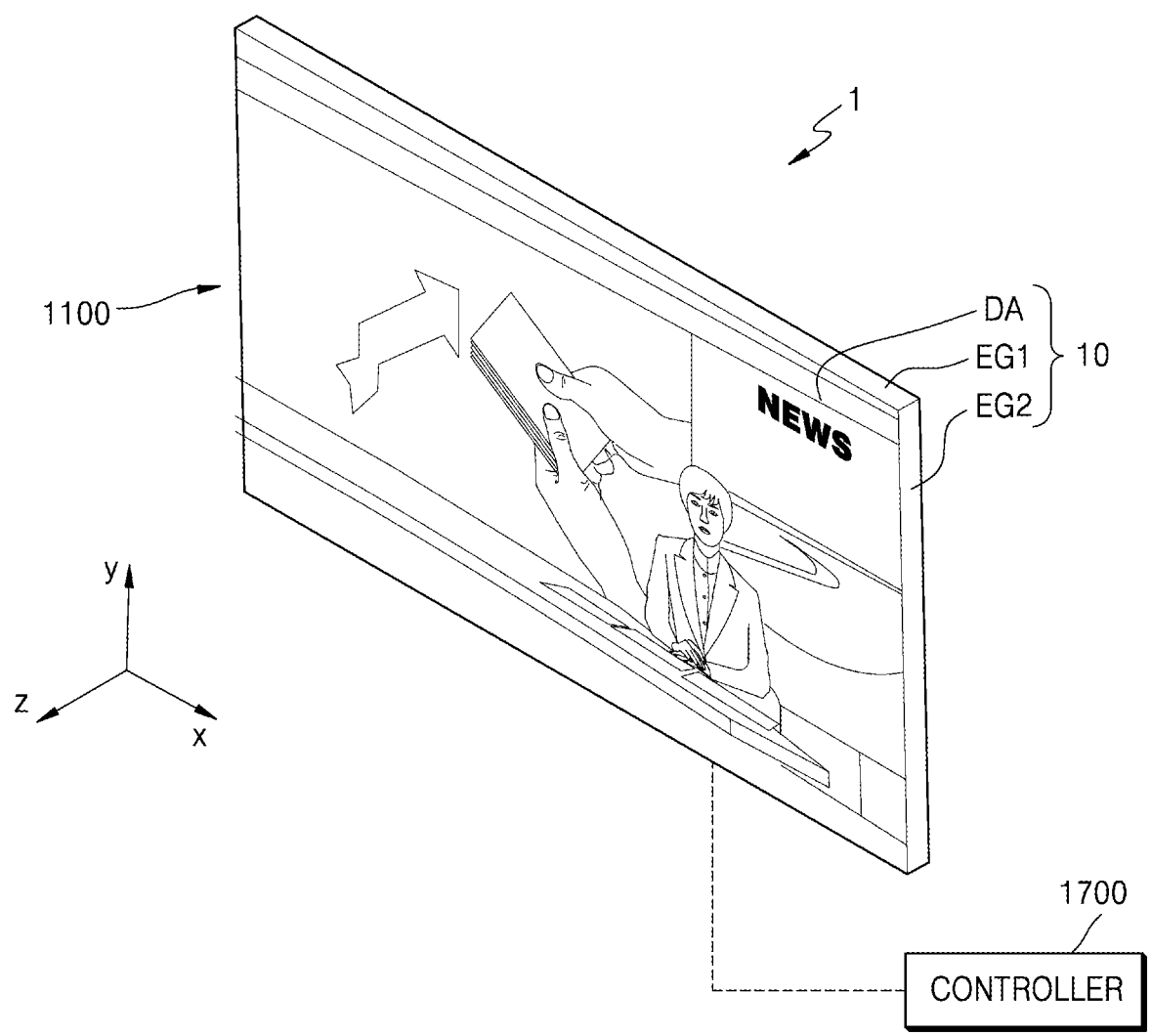
FIGS. 16A and 16B are views illustrating that a display panel is bent by considering a type of content included in an image, according to an embodiment.
Figure 16B:
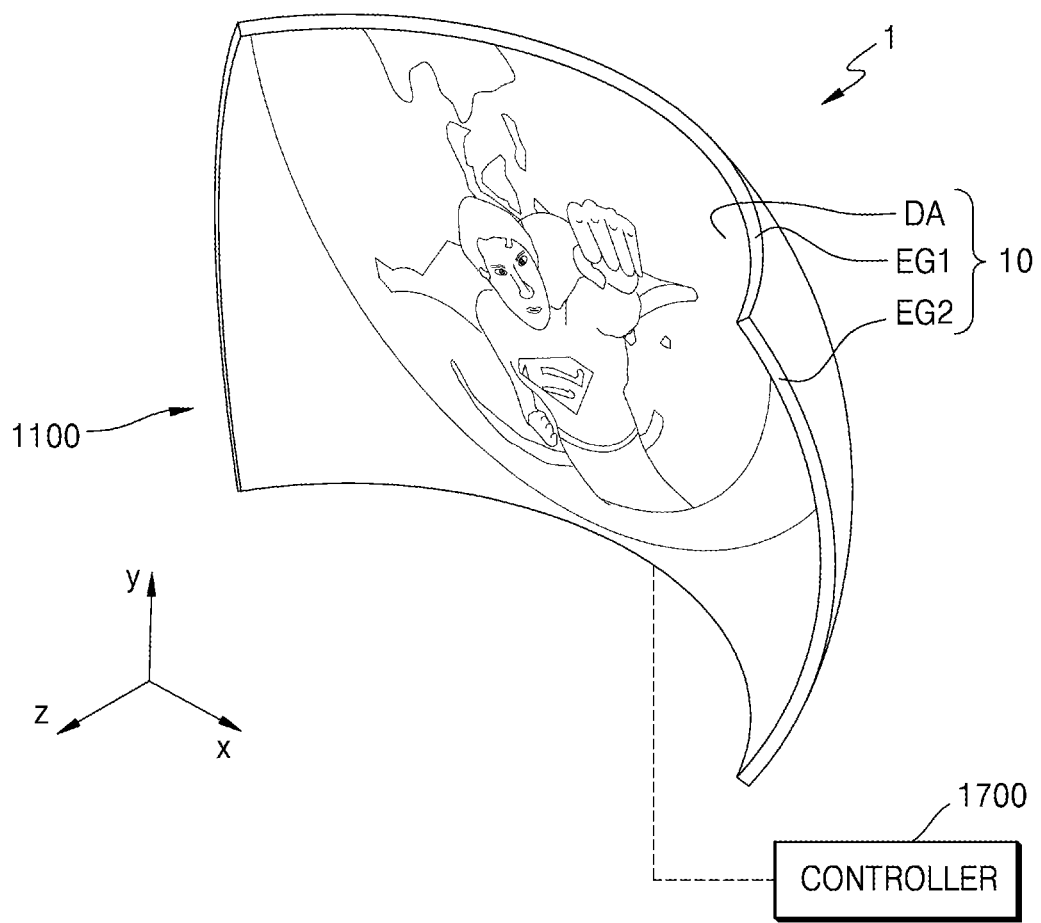

FIGS. 16A and 16B are views illustrating that the display panel 10 is bent by considering a type of content included in content, according to an embodiment. In FIGS. 16A and 16B, the same elements as those illustrated in FIGS. 14A and 14B are denoted by the same reference numerals, and thus a repeated description thereof will be omitted.

Referring to FIGS. 16A and 16B, an image may be displayed in the display area DA of the display panel 10. The display panel 10 may include edges. In an embodiment, the display panel 10 may include the first edge EG1 extending in the first direction (e.g., the x direction or the −x direction) and the second edge EG2 extending in the second direction (e.g., the y direction or the −y direction).

The controller 1700 may obtain information to bend the display panel 10. The information obtained to bend the display panel 10 may be information on a type of content included in the image. In an embodiment, the information on the type of the content included in the image may be obtained from metadata of the content included in the image.

Referring to FIG. 16A, the type of the content included in the image may be a type of preset first content. For example, the type of the preset first content may be a type of content including at least one of news, home shopping, and drama. In this case, the controller 1700 may control the first edge EG1 and the second edge EG2 to respectively extend in the first direction (e.g., the x direction or the −x direction) and the second direction (e.g., the y direction or the −y direction). Accordingly, the display panel 10 may be flat.

Referring to FIG. 16B, the type of the content included in the image may be a type of preset second content. For example, the type of the preset second content may be a type of content including at least one of movie and game. In this case, the controller 1700 may control the display panel 10 to be bent so that each of the first edge EG1 and the second edge EG2 has a curvature by considering the obtained information.

FIGS. 17, 18, and 19A through 19C are views illustrating that the display panel 10 is bent by considering a location of a user, according to an embodiment. FIGS. 17, 18, and 19A through 19C illustrate a xz cross-section of the display panel 10.

Figure 17:
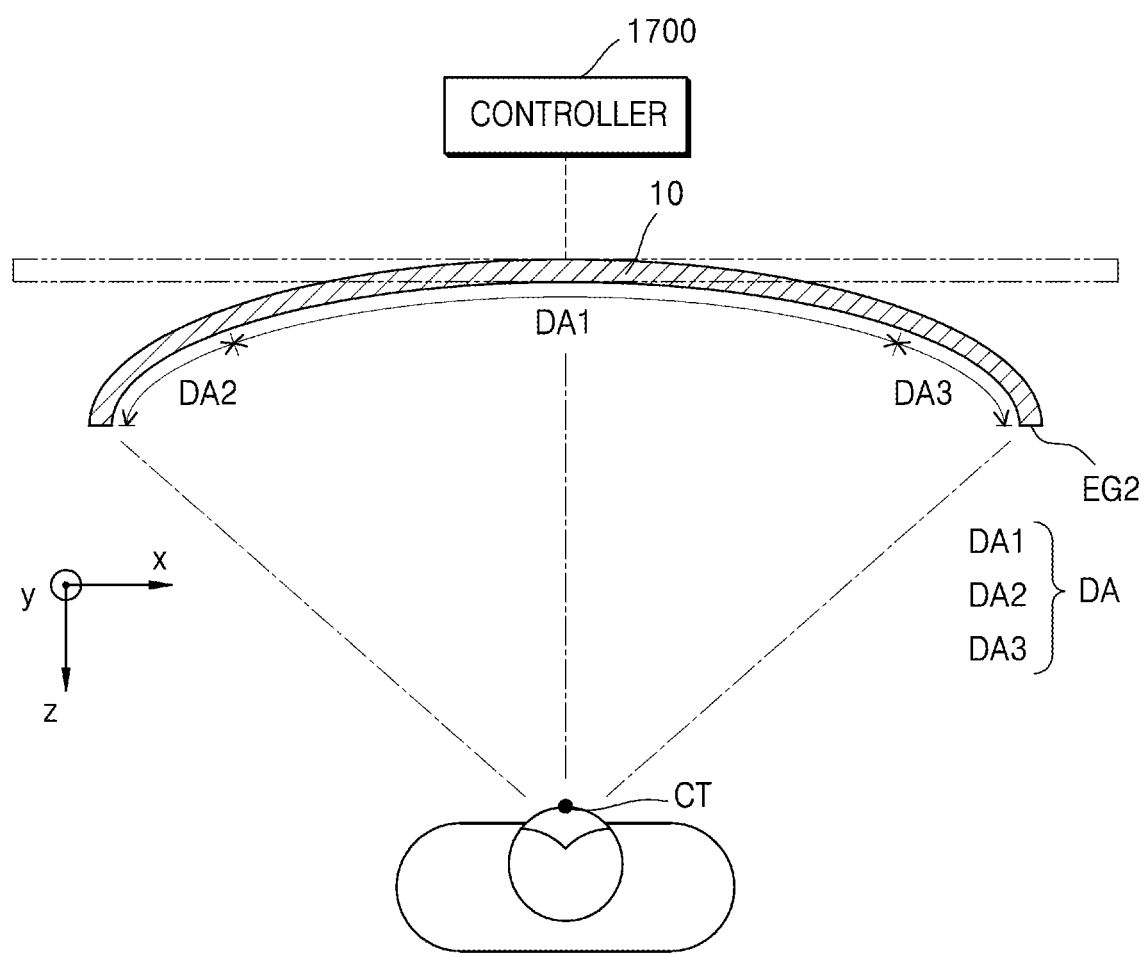
FIGS. 17, 18, and 19A through 19C are views illustrating that a display panel is bent by considering a location of a user, according to an embodiment.

Referring to FIG. 17, an image may be displayed in the display area DA of the display panel 10. In an embodiment, the display area DA may include a first display area DA1, a second display area DA2, and a third display area DA3. In an embodiment, the second display area DA2 and the third display area DA3 may be located at both ends of the first display area DA1 in the first direction (e.g., the x direction or the −x direction).

The display panel 10 may include edges. In an embodiment, the display panel 10 may include the first edge extending in the first direction (e.g., the x direction or the −x direction) and the second edge EG2 extending in the second direction (e.g., the y direction or the −y direction).

The controller 1700 may obtain information to bend the display panel 10. The information obtained to bend the display panel 10 may be information on a location of at least one user. In an embodiment, the location of the at least one user may be defined as a location of the at least one user's head with respect to the display panel 10.

In an embodiment, the location information of the at least one user may be location information of one user. In another embodiment, the location information of the at least one user may be location information of a plurality of users.

In an embodiment, the controller 1700 may obtain information on a location of a user by using a position sensor of the display apparatus 1. The position sensor may be, for example, a laser displacement sensor or an ultrasonic displacement sensor.

The controller 1700 may bend the display panel 10 so that each of a first edge and the second edge EG2 has a curvature by considering the information on the location of the user. In an embodiment, the controller 1700 may bend the display panel 10 so that the first edge has a preset curvature and the edge EG2 has a preset curvature by considering information set by the user. For example, when the location of the at least one user is location information of one user, the controller 1700 may bend the display panel 10 so that each of the first edge and the second edge EG2 has a curvature. In another example, when the location information of the at least one user is location information of a plurality of users, the controller 1700 may maintain the display panel in a flat shape. In another example, when the location information of the at least one user is location information of a plurality of users, the controller 1700 may bend the display panel 10 so that each of the first edge and the second edge EG2 has a curvature by considering any one of the location information of the plurality of users.

In an embodiment, the controller 1700 may bend the display panel 10 so that the center of curvature CT of the display panel 10 matches a location of the user. The center of curvature CT of the display panel 10 may be the center of a curvature of the first edge, and the center of a curvature of the second edge EG2.

Figure 18:
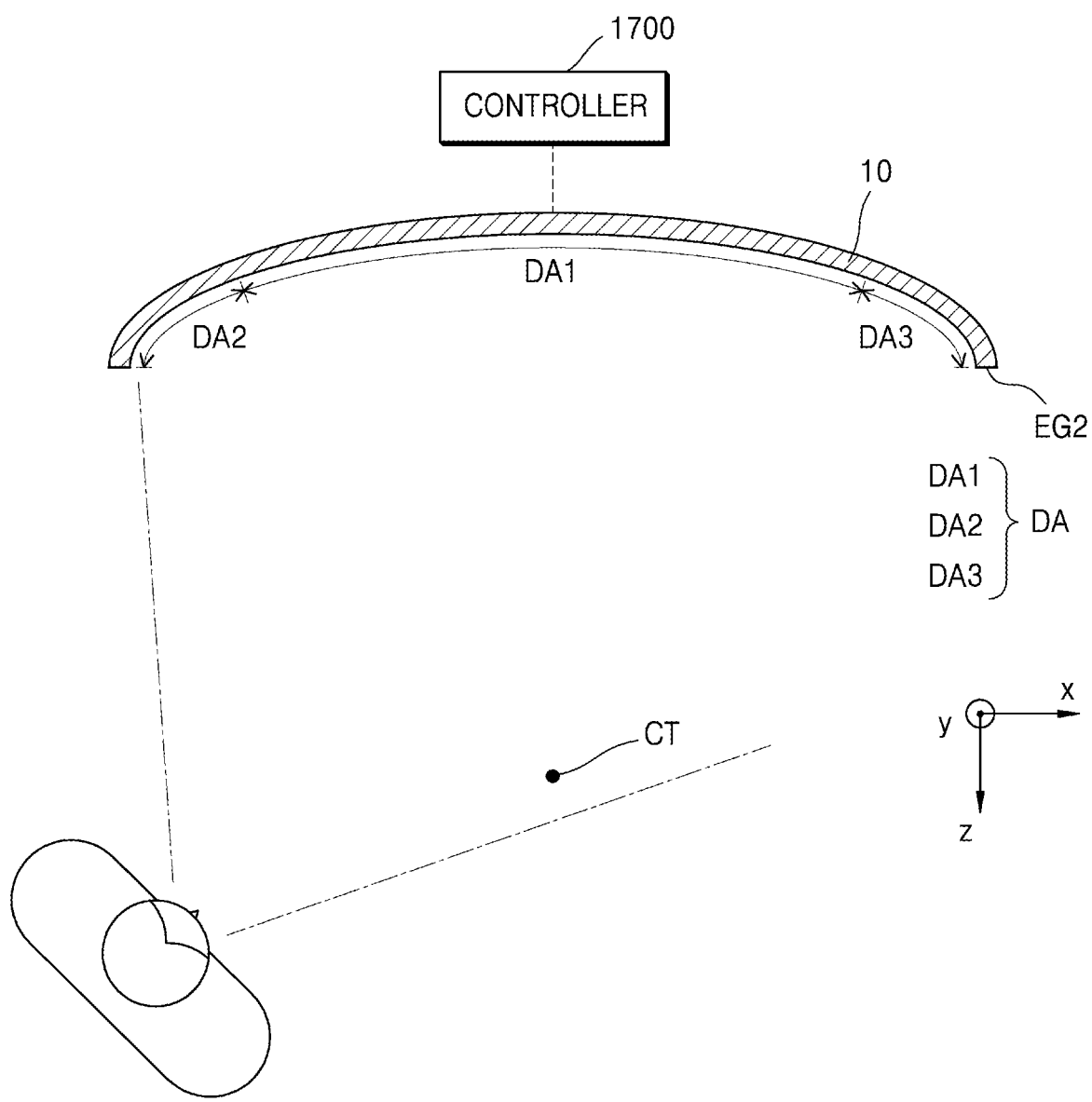

Referring to FIG. 18, the location of the user may be changed. In an embodiment, the location of the user may be changed in the first direction (e.g., the x direction or the −x direction) or the third direction (e.g., the z direction or the −z direction).

The controller 1700 may obtain information to bend the display panel 10. In an embodiment, the controller 1700 may compare information on the location of the user with the preset center of curvature CT of the display panel 10.

Figure 19A:
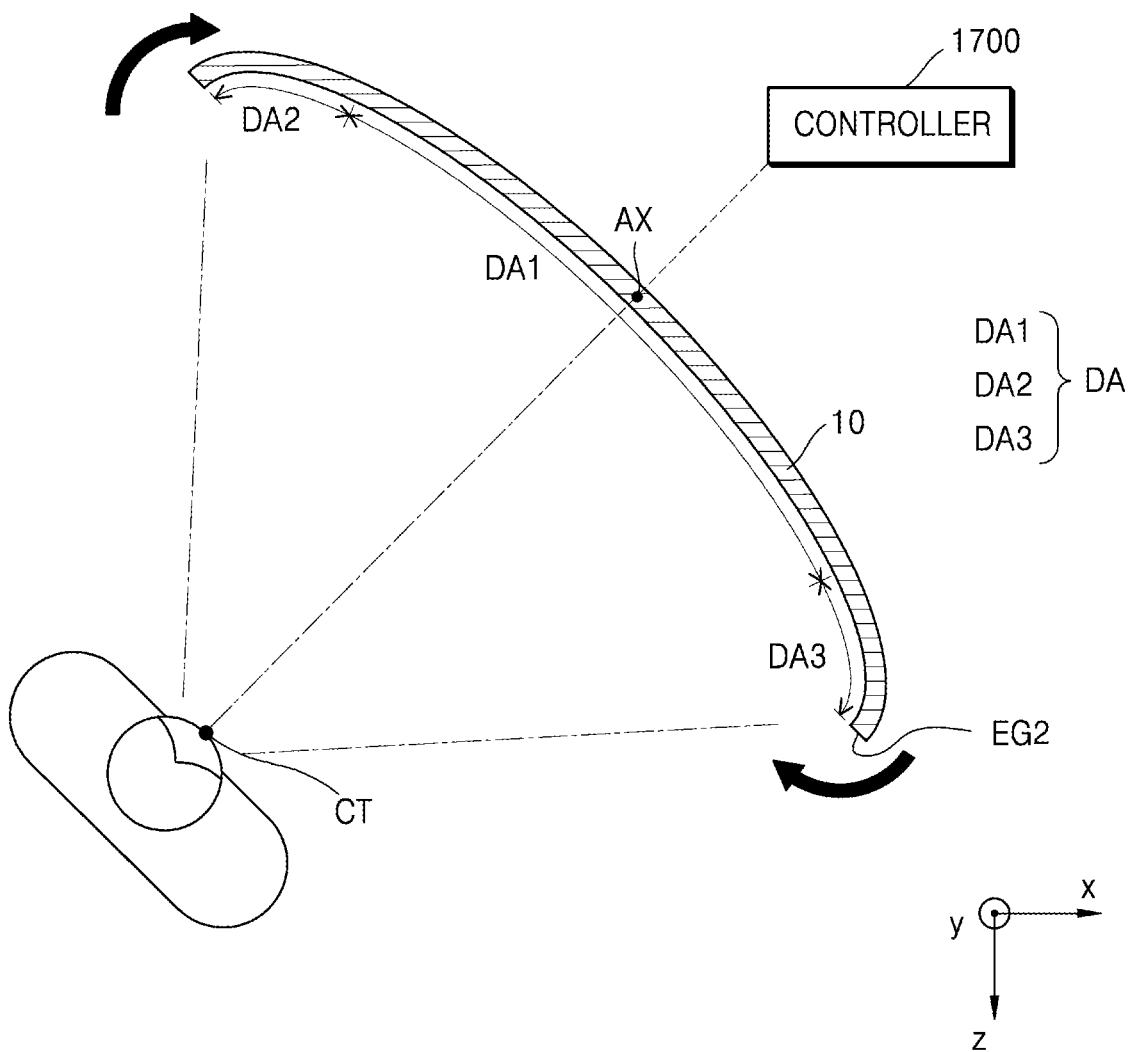
Figure 19B:
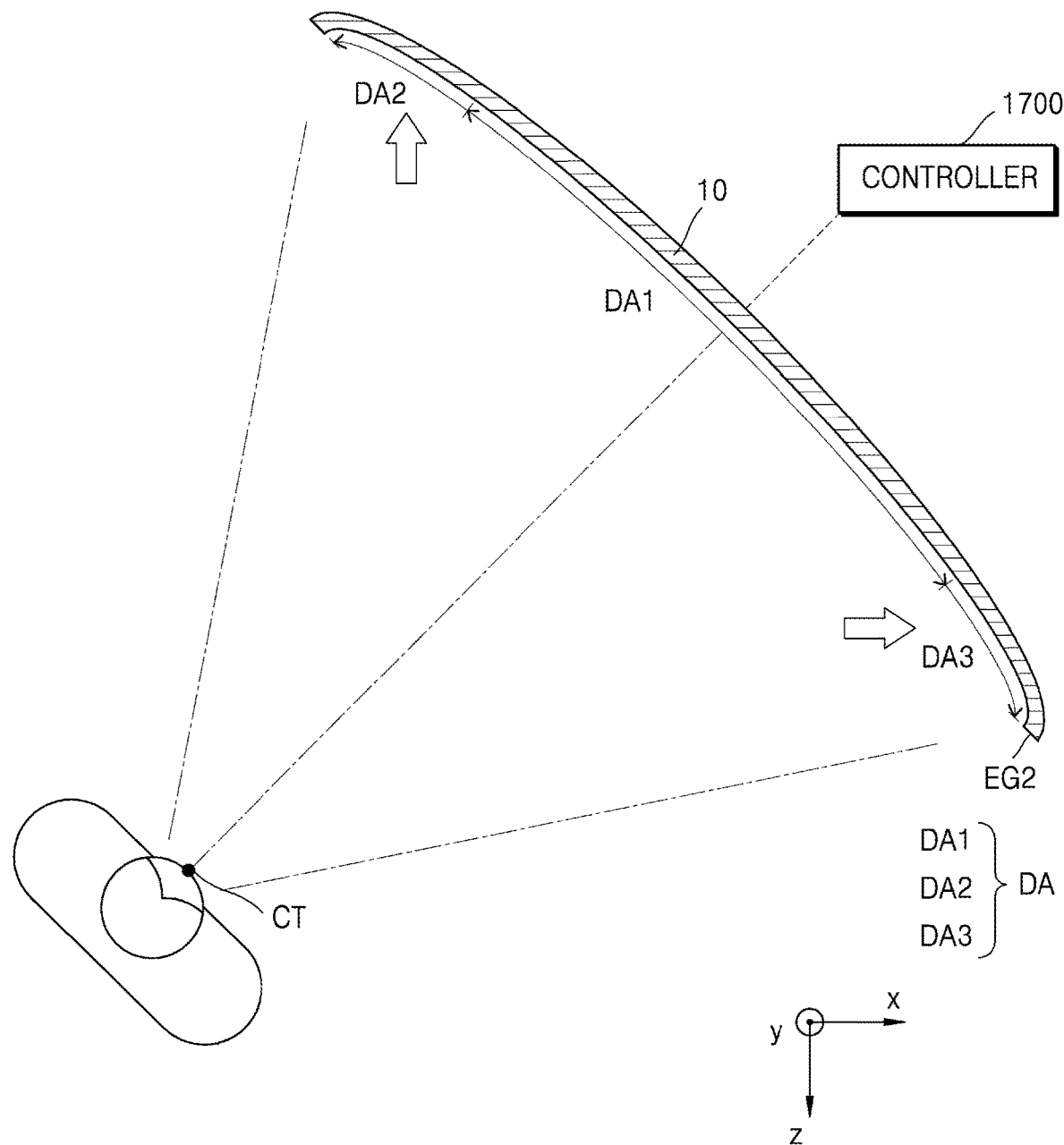
Figure 19C:
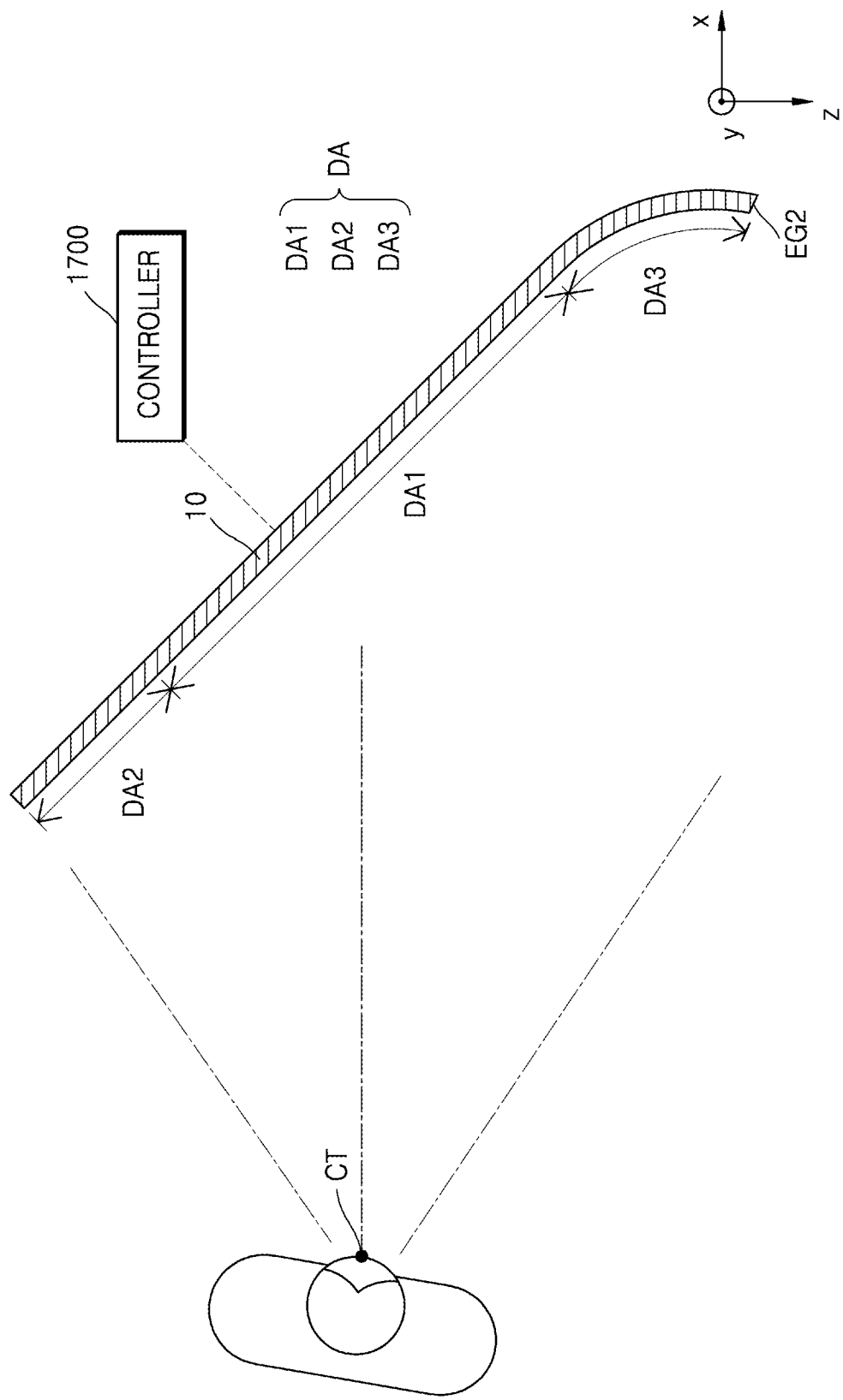

Referring to FIGS. 19A through 19C, when the information on the location of the user does not match the preset center of curvature of the display panel 10, the controller 1700 may cause the location information of the user to match the center of curvature CT of the display panel 10.

Referring to FIG. 19A, the controller 1700 may rotate the display panel 10 using the second direction (e.g., the y direction or the −y direction) as an axis AX.

Referring to FIGS. 19B and 19C, the controller 1700 may bend the display panel 10 so that each of the first edge and the second edge EG2 has a curvature by considering the obtained information.

Referring to FIG. 19B, when a distance between the user and the display panel 10 increases, at least one of the curvature of the first edge and the curvature of the second edge EG2 may decrease. A distance between the user and the display panel 10 may be defined as a distance between the center of the display panel 10 and the location of the user. In this case, curvatures of the first display area DA1, the second display area DA2, and the third display area DA3 may decrease. That is, degrees to which the first display area DA1, the second display area DA2, and the third display area DA3 are bent may be relatively small. In another embodiment, when a distance between the user and the display panel 10 decreases, at least one of the curvature of the first edge and the curvature of the second edge EG2 may increase. In this case, curvatures of the first display area DA1, the second display area DA2, and the third display area DA3 may increase. That is, degrees to which the first display area DA1, the second display area DA2, and the third display area DA3 are bent may be relatively large.

Referring to FIG. 19C, the controller 1700 may bend the display panel 10 so that each of the first edge and the second edge EG2 has a curvature by considering the information on the location of the user. In an embodiment, a curvature of the second display area DA2 and a curvature of the third display area DA3 may be different from each other. For example, the second display area DA2 may not be bent. The third display area DA3 may be bent.

Although the display panel 10 may rotate about the second direction (e.g., the y direction or the −y direction), a rotation range of the display panel 10 may be limited. In the present embodiment, the controller 1700 may bend the display panel 10 by considering the information on the location of the user. In particular, the controller 1700 may bend the display panel 10 so that a curvature of the second display area DA2 and a curvature of the third display area DA3 are different from each other. Accordingly, even when the user is located beyond the rotation range of the display panel 10, the user may watch an image.

Figure 20:
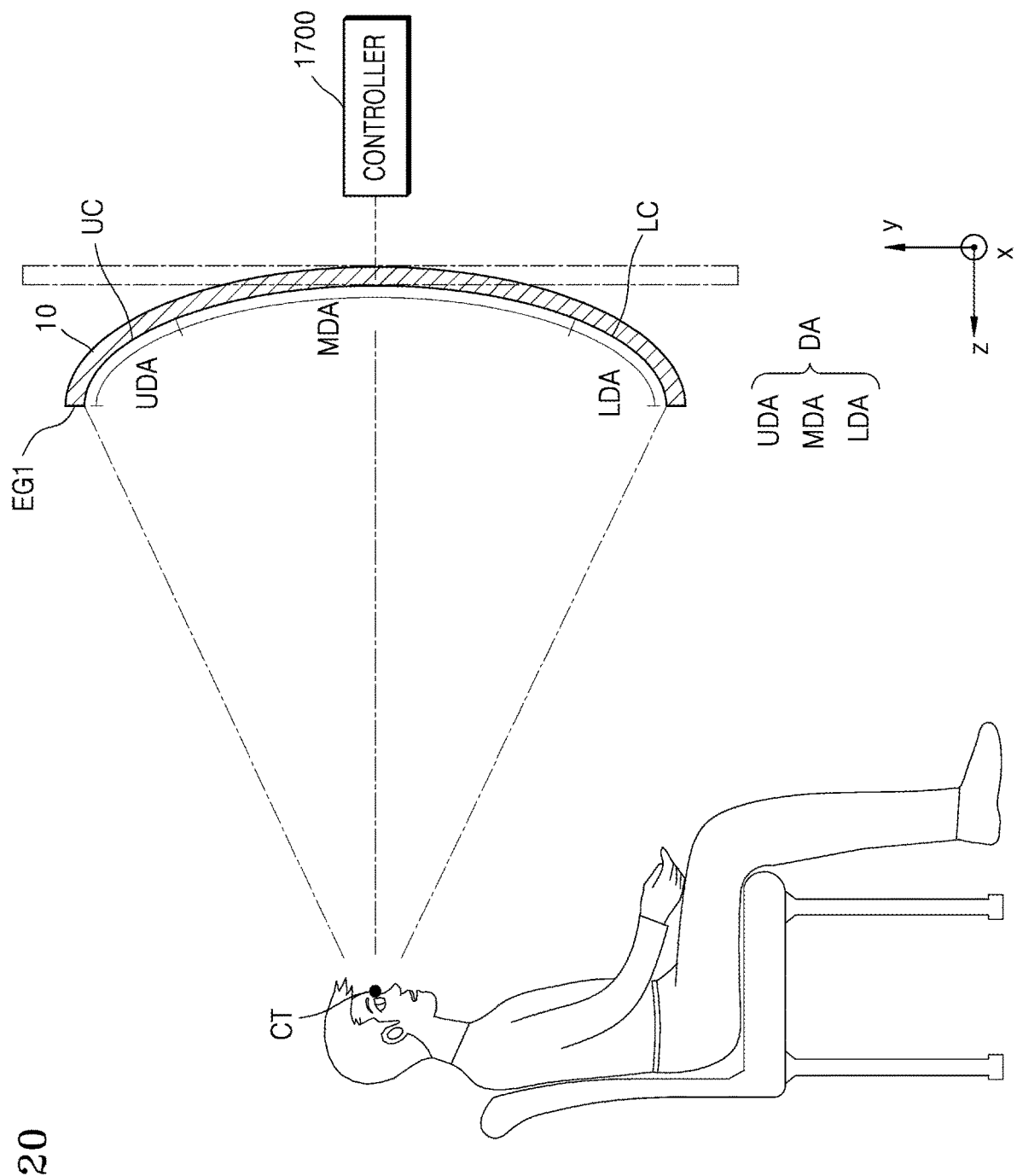
FIGS. 20, 21A, and 21B are views illustrating that a display panel is bent by considering a location of a user, according to another embodiment.
Figure 21A:
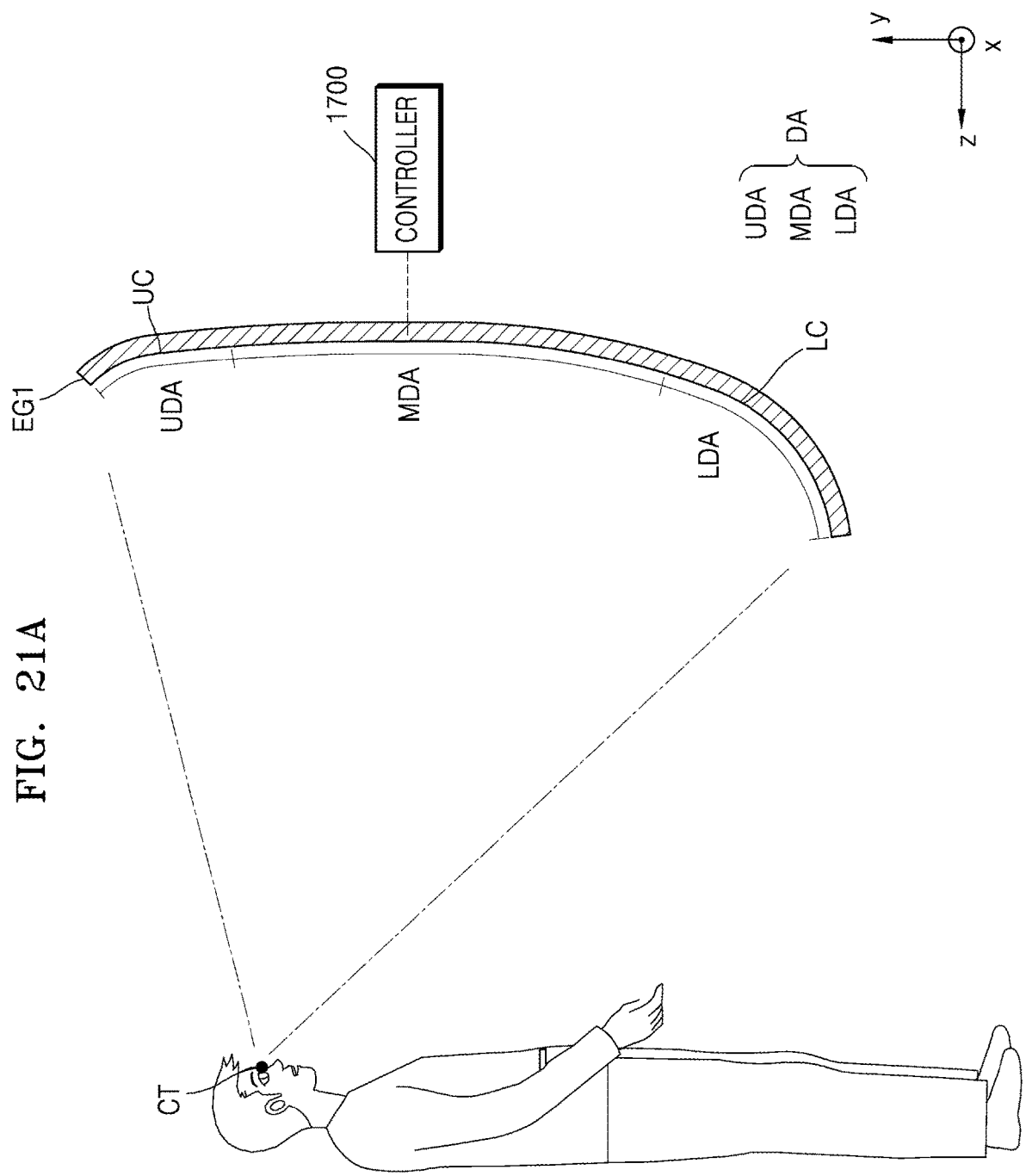
Figure 21B:
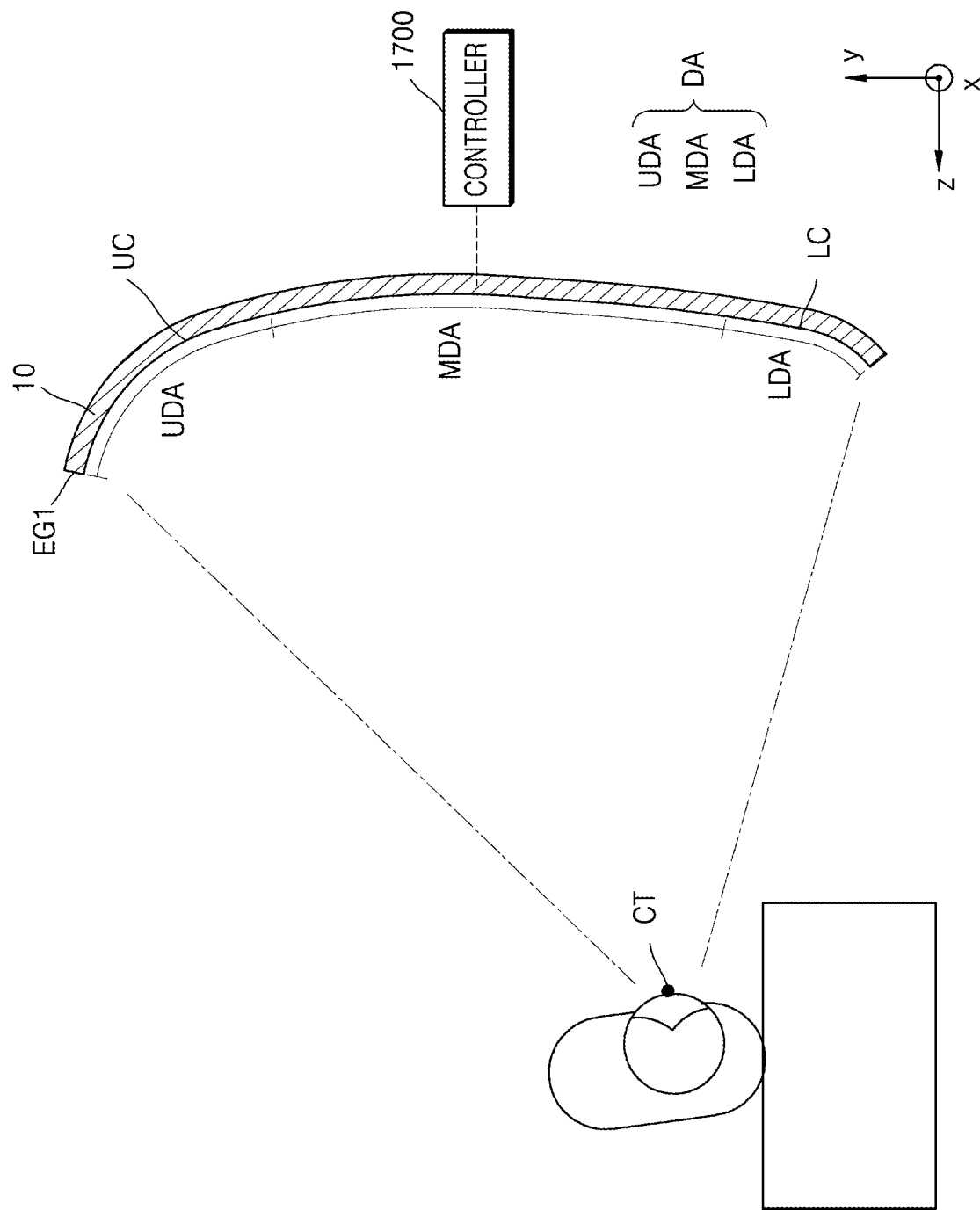

FIGS. 20, 21A, and 21B are views illustrating that the display panel 10 is bent by considering a location of a user, according to another embodiment. FIGS. 20, 21A, and 21B illustrate a yz cross-section of a display panel.

Referring to FIG. 20, an image may be displayed in the display area DA of the display panel 10. In an embodiment, the display area DA may include an intermediate display area MDA, an upper display area UDA, and a lower display area LDA. The upper display area UDA and the lower display area LDA may be located at both ends of the intermediate display area MDA in the second direction (e.g., the y direction or the −y direction).

The display panel 10 may include edges. In an embodiment, the display panel 10 may include the first edge EG1 extending in the first direction (e.g., the x direction or the −x direction) and a second edge extending in the second direction (e.g., the y direction or the −y direction).

The controller 1700 may obtain information to bend the display panel 10. The information obtained to bend the display panel 10 may be information on a location of at least one user. In an embodiment, the location of the at least one user may be defined as a location of the at least one user's head with respect to the display panel 10.

The controller 1700 may bend the display panel 10 so that each of the first edge EG1 and the second edge has a curvature by considering information on a location of a user. In an embodiment, the controller 1700 may bend the display panel 10 so that the first edge EG1 has a preset curvature and the second edge has a preset curvature by considering information set by the user.

In an embodiment, the controller 1700 may bend the display panel 10 so that the center of curvature CT of the display panel 10 matches the location of the user. In an embodiment, the center of curvature CT of the display panel 10 may be the center of a curvature of the first edge EG1 and the center of a curvature of the second edge.

Referring to FIGS. 21A and 21B, the location of the user may be changed. In an embodiment, the location of the user may be changed in the second direction (e.g., the y direction or the −y direction). The controller 1700 may obtain information to bend the display panel 10. The controller 1700 may bend the display panel 10 so that each of the first edge EG1 and the second edge has a curvature by considering the obtained information. In an embodiment, the controller 1700 may change a curvature of the second edge by considering the obtained information. In this case, an upper curvature UC of the upper display area UDA and a lower curvature LC of the lower display area LDA may be changed to be different from each other. In an embodiment, the upper curvature UC of the upper display area UDA and the lower curvature LC of the lower display area LDA may be changed so that the location of the user and the center of curvature CT of the display panel 10 match each other.

Referring to FIG. 21A, the location of the user may be changed in the y direction of FIG. 21A. In an embodiment, the upper curvature UC of the upper display area UDA may be less than the lower curvature LC of the lower display area LDA.

Referring to FIG. 21B, the location of the user may be changed in the −y direction of FIG. 21B. In an embodiment, the upper curvature UC of the upper display area UDA may be greater than the lower curvature LC of the lower display area LDA.

Figure 22A:
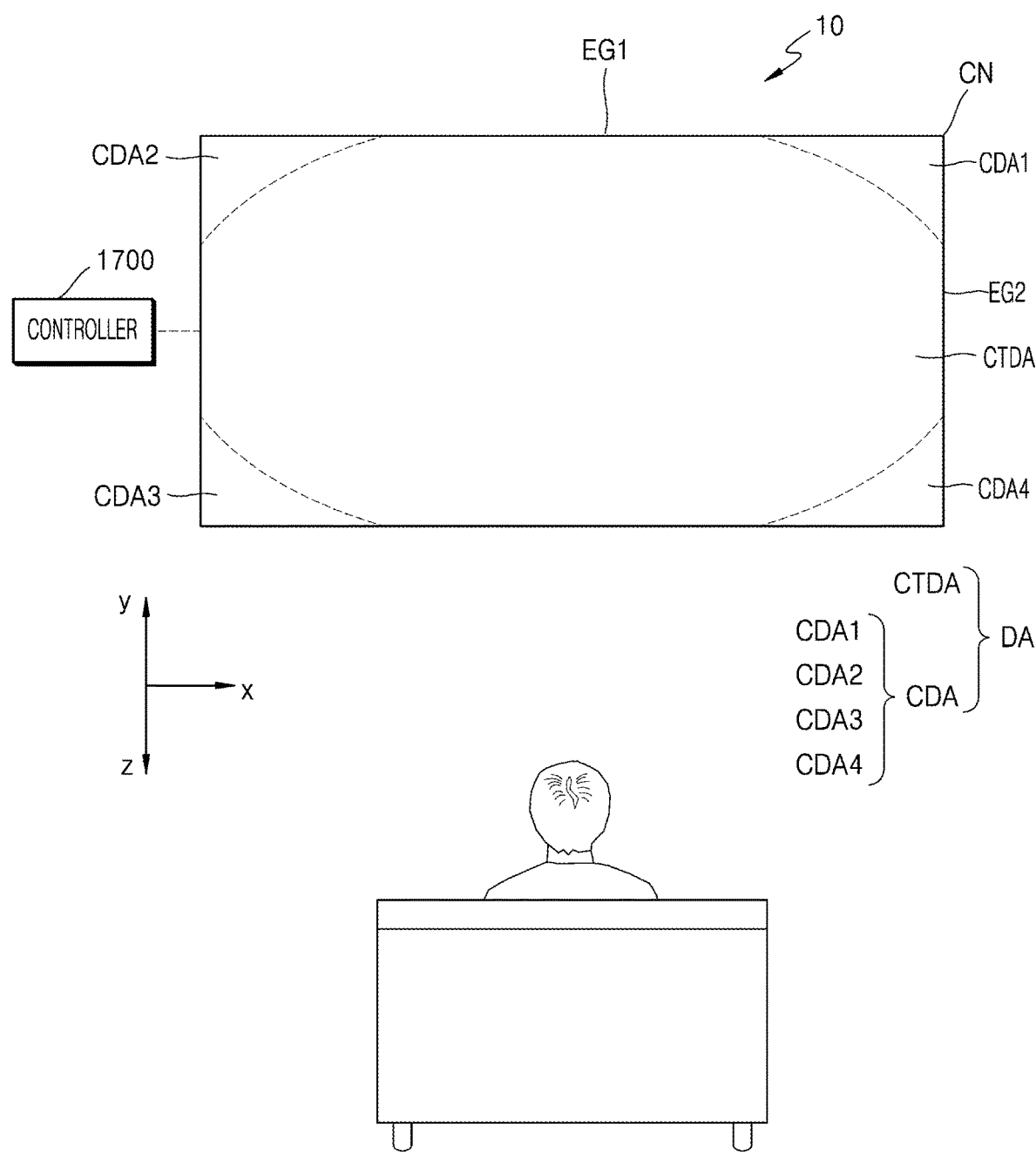
FIGS. 22A through 22C are views illustrating that a display panel is bent by considering a location of a user, according to another embodiment.
Figure 22B:
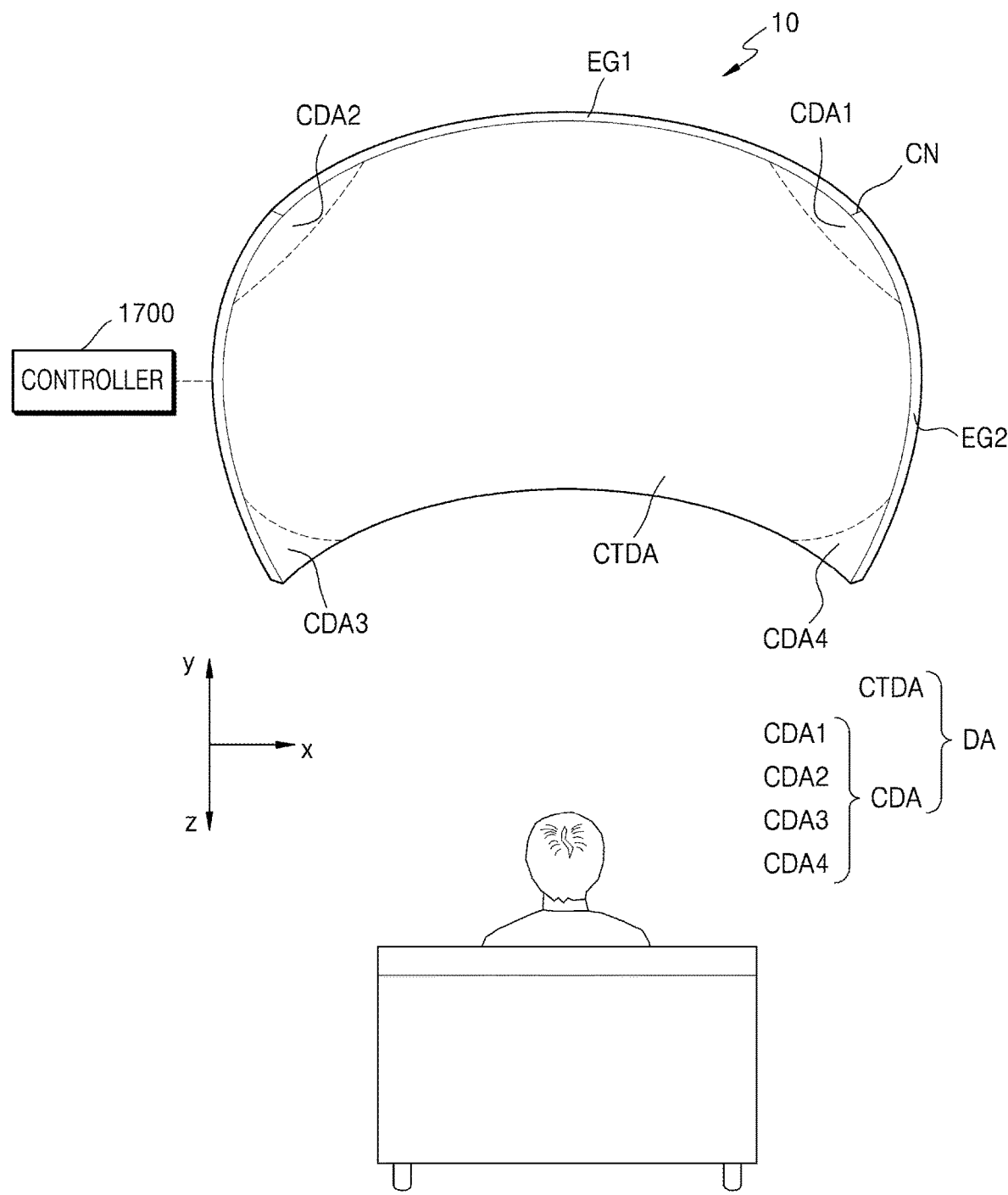
Figure 22C:
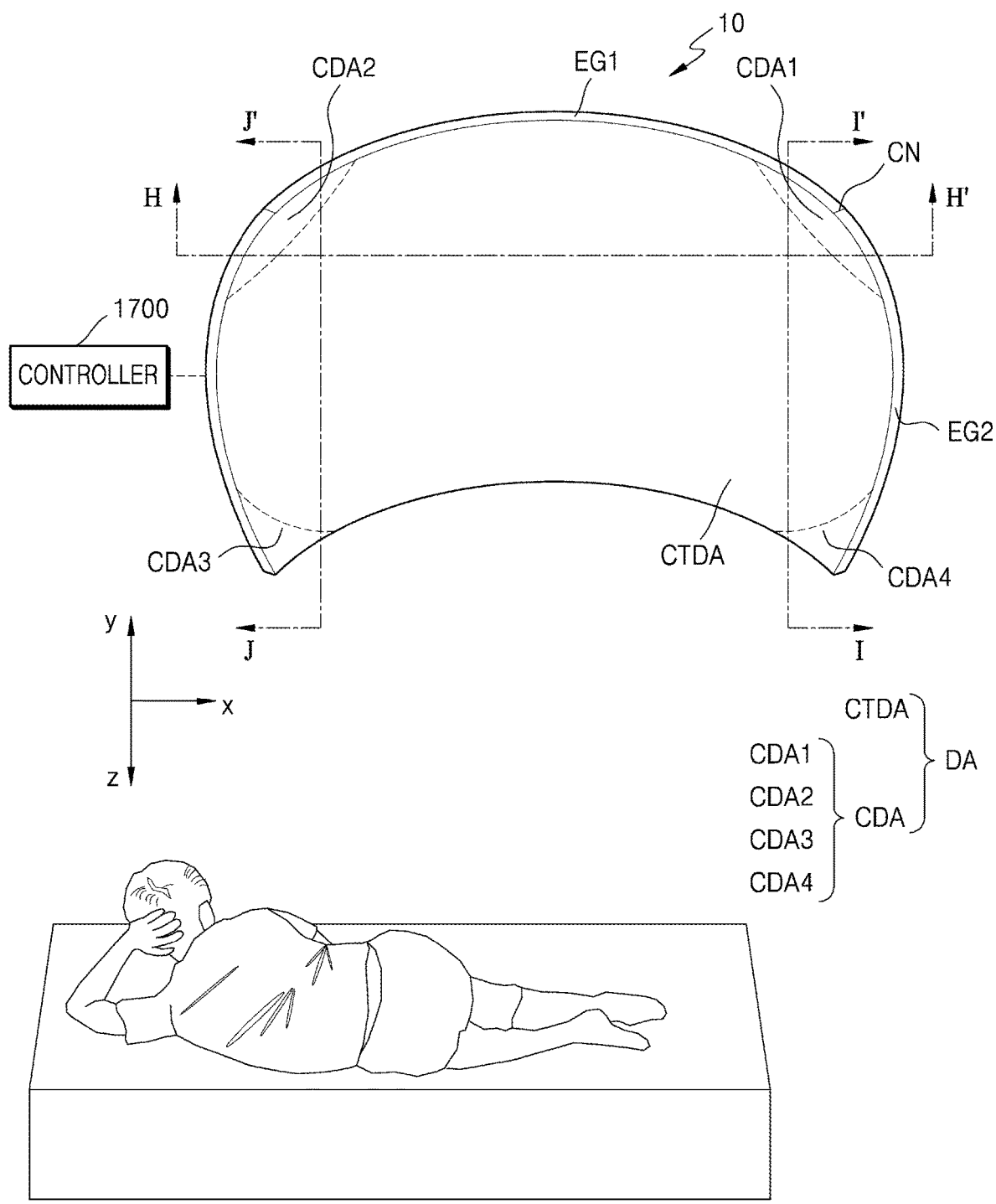
Figure 23A:
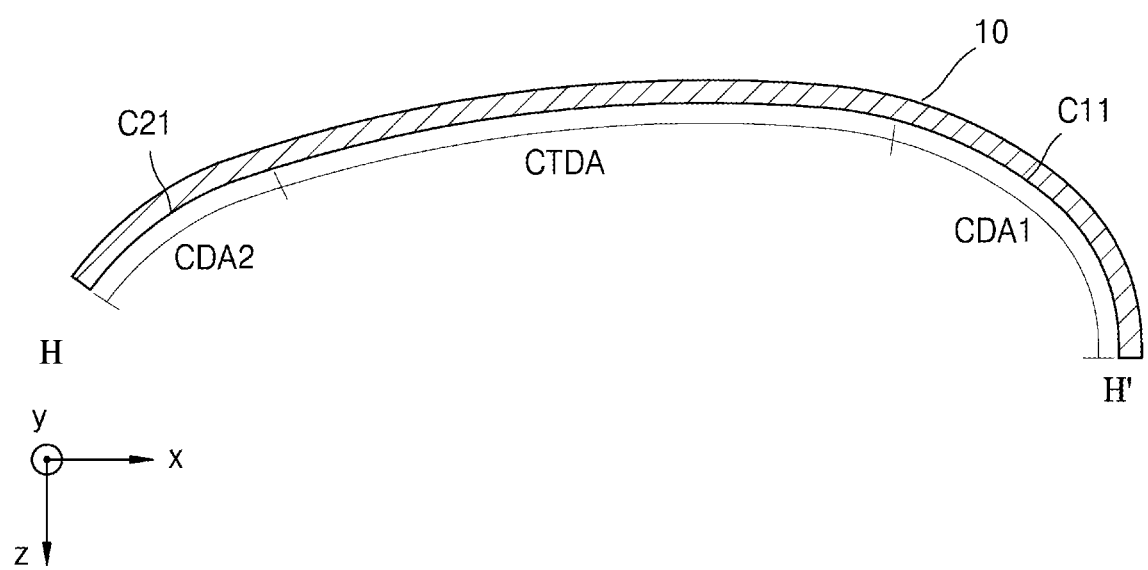
FIG. 23A is a cross-sectional view taken along line H-H' of the display panel of FIG. 22C.
Figure 23B:
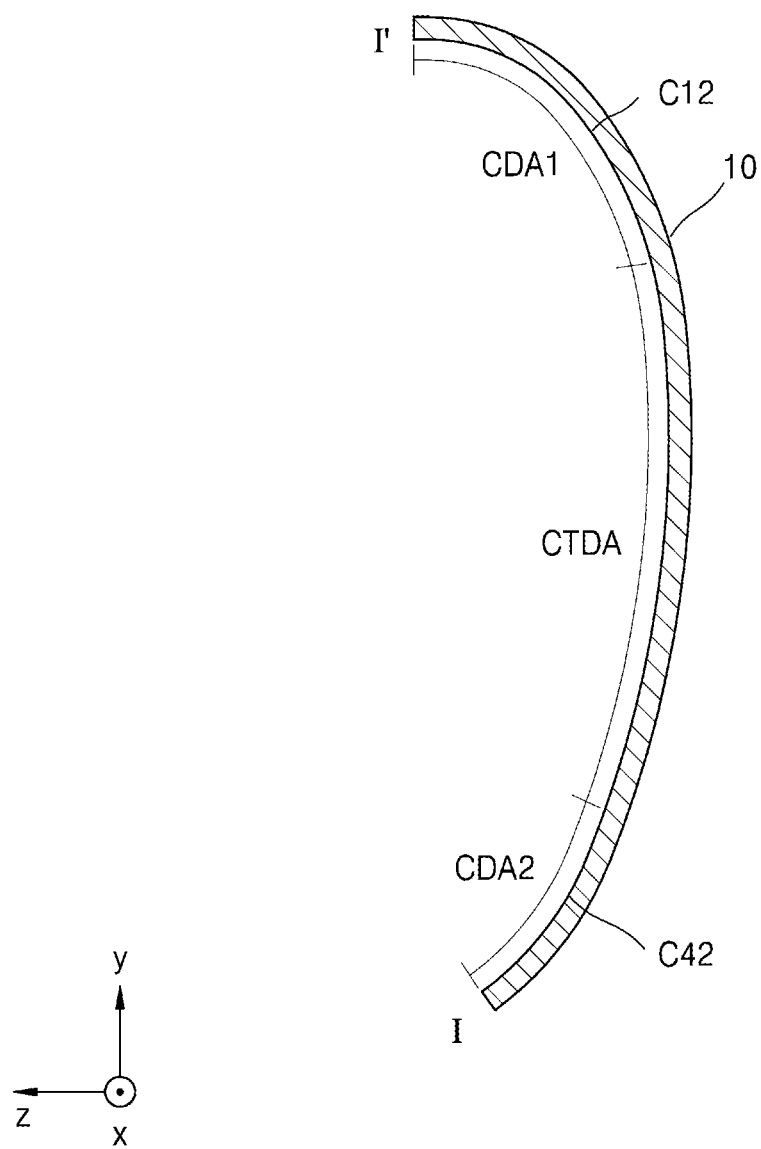
FIG. 23B is a cross-sectional view taken along line I-I' of the display panel of FIG. 22C.
Figure 23C:
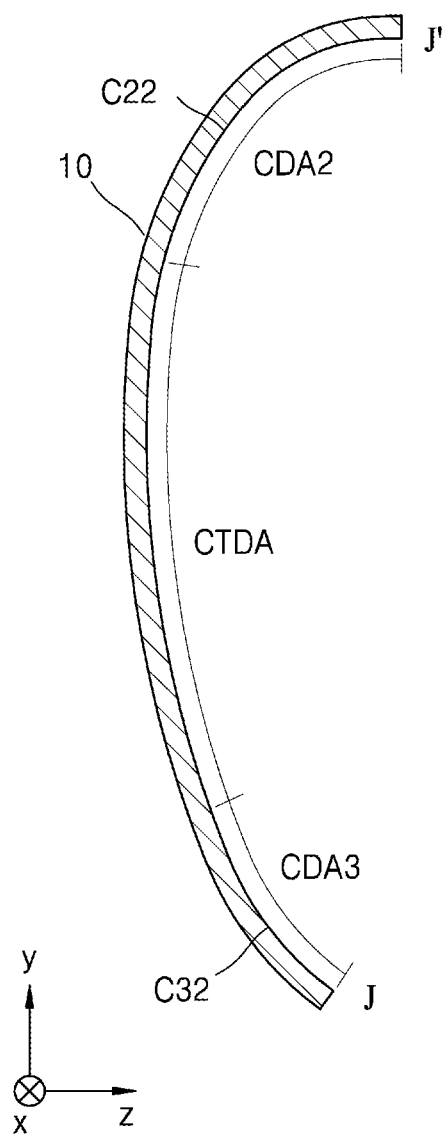
FIG. 23C is a cross-sectional view taken along line J-J' of the display panel of FIG. 22C.

FIGS. 22A through 22C are views illustrating that the display panel 10 is bent by considering a location of a user, according to another embodiment. FIG. 23A is a cross-sectional view taken along line H-H' of the display panel 10 of FIG. 22C. FIG. 23B is a cross-sectional view taken along line I-I' of the display panel 10 of FIG. 22C. FIG. 23C is a cross-sectional view taken along line J-J' of the display panel 10 of FIG. 22C.

Referring to FIG. 22A, an image may be displayed in the display area DA of the display panel 10. The display area DA may include the central display area CTDA and the corner display area CDA. The central display area CTDA may be located at the center of the display panel 10. The corner display area CDA may be located between the central display area CTDA and the corner CN where edges of the display panel 10 meet each other.

The display panel 10 may include a plurality of corner display areas CDA. For example, the display panel 10 may include the first corner display area CDA1, the second corner display area CDA2, the third corner display area CDA3, and the fourth corner display area CDA4.

The display panel 10 may include edges. In an embodiment, the display panel 10 may include the first edge EG1 extending in the first direction (e.g., the x direction or the −x direction) and the second edge EG2 extending in the second direction (e.g., the y direction or the −y direction).

The controller 1700 may obtain information to bend the display panel 10. The information obtained to bend the display panel 10 may be information on a location of at least one user. In an embodiment the location of the at least one user may be defined as a location of the at least one user's head with respect to the display panel 10.

Referring to FIGS. 22B and 22C, the controller 1700 may bend the display panel 10 so that each of the first edge EG1 and the second edge EG2 has a curvature by considering information on a location of a user. In an embodiment, the controller 1700 may bend the display panel 10 so that each of the first edge EG1 has a preset curvature and the second edge EG2 has a preset curvature by considering information set by the user. In an embodiment, the display area DA of the bent display panel 10 may have a concave shape.

Referring to FIGS. 22C and 23A through 23C, the location of the user may be changed. In an embodiment, the location of the user may be changed in the first direction (e.g., the x direction or the −x direction) or the second direction (e.g., the y direction or the −y direction). For example, in FIG. 22C, the location of the user is changed in the −x direction and the −y direction.

The controller 1700 may obtain information to bend the display panel 10. The controller 1700 may bend the display panel 10 so that each of the first edge EG1 and the second edge EG2 has a curvature by considering the obtained information.

The corner display areas CDA may include a first direction curvature in a cross-section (e.g., an xz cross-section) in the first direction (e.g., the x direction or the −x direction) and a second direction curvature in a cross-section (e.g., an yz cross-section) in the second direction (e.g., the y direction or the −y direction).

In an embodiment, the first corner display area CDA1 may include the first direction first curvature C11 and the second direction first curvature C12. In an embodiment, the second corner display area CDA2 may include the first direction second curvature C21 and the second direction second curvature C22. In an embodiment, the third corner display area CDA3 may include a first direction third curvature and a second direction third curvature. In an embodiment, the fourth corner display area CDA4 may include a first direction fourth curvature and a second direction fourth curvature.

In an embodiment, a first direction curvature of one of the plurality of corner display areas may be different from a first direction curvature of another one of the plurality of corner display areas. For example, the first direction first curvature C11 of the first corner display area CDA1 may be different from the first direction second curvature C21 of the second corner display area CDA2. The first direction first curvature C11 of the first corner display area CDA1 may be greater than the first direction second curvature C21 of the second corner display area CDA2.

A second direction curvature of one of the plurality of corner display areas may be different from a second direction curvature of another one of the plurality of corner display areas. For example, the second direction first curvature C12 of the first corner display area CDA1 may be greater than a second curvature C42 of the fourth corner display area CDA4. The second direction second curvature C22 of the second corner display area CDA2 may be greater than a second curvature C32 of the third corner display area CDA3.

The display panel 10 of an embodiment may be bent from the first direction (e.g., the x direction or the −x direction) to the third direction (e.g., the z direction or the −z direction), and may be bent from the second direction (e.g., the y direction or the −y direction) to the third direction (e.g., the z direction or the −z direction). Such bending may be possible because the display panel 10 is a stretchable or contractible display panel.

Also, the controller 1700 may bend the display panel 10 into various shapes by considering obtained information. Accordingly, various viewing experiences may be provided to a user who watches an image in the display area DA, and a screen distortion felt by the user may be reduced.

In some embodiments, information obtained to bend the display panel 10 may include not only location information of at least one user who watches an image but also at least one of information corresponding to a manipulation of a remote controller connected to the display panel 10, information corresponding to a voice signal of the at least one user who watches the image, and information on a type of content included in the image. In this case, the controller 1700 may bend the display panel 10 so that each of the first edge EG1 and the second edge EG2 has a curvature by considering the obtained information.

Figure 24:
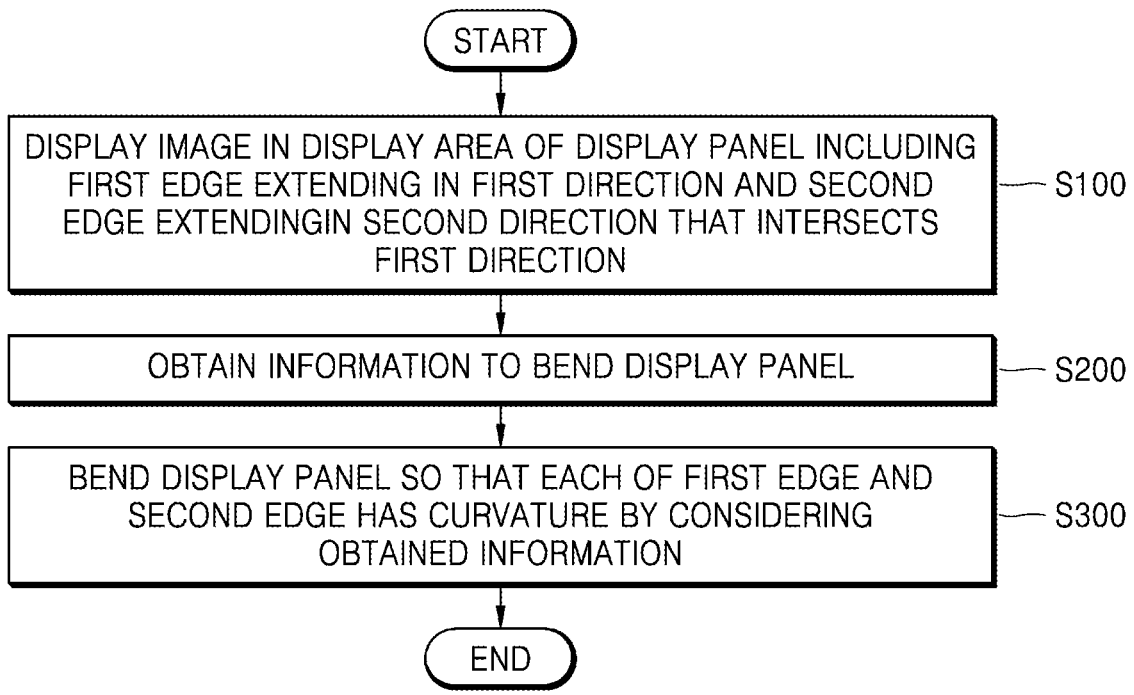
FIG. 24 is a flowchart illustrating a method of controlling a display apparatus, according to an embodiment.

FIG. 24 is a flowchart illustrating a method of controlling a display apparatus, according to an embodiment.

Referring to FIG. 24, an image may be displayed in a display area of a display panel including a first edge extending in a first direction and a second edge extending in a second direction that intersects the first direction (S100).

Next, information may be obtained to bend the display panel (S200).

Next, the display panel may be bent so that each of the first edge and the second edge has a curvature by considering the obtained information (S300).

As described above, according to the one or more embodiments, a display panel may be bent so that each of a first edge and a second edge has a curvature by considering obtained information. Accordingly, various viewing experiences may be provided to a user who watches an image. Also, a screen distortion felt by the user who watches the image displayed in a display apparatus may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:
1. A display apparatus comprising:
a display panel, in a flat mode, comprising a first edge extending in a first direction, a second edge extending in a second direction that intersects the first direction, and a display area where an image is displayed, the display panel configured to be bent from the flat mode to a bent mode;
a frame assembly located behind the display panel; and
a cushion layer arranged between the display panel and the frame assembly, the cushion layer acting as a buffer layer between the display panel and the frame assembly, wherein the frame assembly includes a plurality of supporters supporting the display panel, extending in the first direction, and spaced apart from one another in the second direction, wherein the cushion layer is in contact with the plurality of supporters along lengths of the plurality of supporters, wherein the display area comprises a central display area, and a corner display area located between the central display area and a corner where the first edge and the second edge meet each other, and wherein, in the bent mode, the corner display area is bent in a direction intersecting the plane of the display panel in the flat mode.

2. The display apparatus of claim 1, wherein the corner display area comprises a first corner display area and a second corner display area, wherein, in the bent mode, the first corner display area comprises a first curvature in a cross-section in the first direction, and a second curvature in a cross-section in the second direction, and the second corner display area comprises a third curvature in a cross-section in the first direction, and a fourth curvature in a cross-section in the second direction, wherein the first curvature and the third curvature are different from each other.

3. A display apparatus comprising:
a display panel, in a flat mode, comprising a first edge extending in a first direction, a second edge extending in a second direction that intersects the first direction, and a display area where an image is displayed, the display panel configured to be bent from the flat mode to a bent mode;
a frame assembly located behind the display panel; and
a cushion layer arranged between the display panel and the frame assembly, the cushion layer acting as a buffer layer between the display panel and the frame assembly,
wherein the frame assembly includes a plurality of supporters supporting the display panel, extending in the first direction, and spaced apart from one another in the second direction,
wherein the cushion layer is in contact with the plurality of supporters along lengths of the plurality of supporters, and
wherein the display panel further comprises a through-portion passing through the display panel.

4. A display apparatus comprising:
a display panel comprising a first pixel and a second pixel and implementing a flat mode and a bent mode, wherein, in the bent mode, at least a portion of the display panel is bent with respect to a plane of the display panel in the flat mode in a direction intersecting the plane;
a cover window arranged over a first surface of the display panel;
a plurality of supporters arranged over a second surface opposite to the first surface of the display panel, the plurality of supporters providing support for the display panel; and
a cushion layer arranged between the display panel and the plurality of supporters, the cushion layer acting as a buffer layer between the display panel and the plurality of supporters,
wherein, in the bent mode, the plurality of supporters and the cushion layer move in a direction intersecting the plane of the display panel in the flat mode,
wherein a distance between the first pixel and the second pixel of the display panel in the bent mode is different from a distance between the first pixel and the second pixel of the display panel in the flat mode, and
wherein the cushion layer is in contact with the plurality of supporters along lengths of the plurality of supporters.

5. The display apparatus of claim 4, wherein the cushion layer comprises an elastomer.

6. The display apparatus of claim 4, wherein the cover window comprises a flexible or stretchable materials.

7. The display apparatus of claim 4, further comprising a first adhesive layer arranged between the display panel and the cover window.

8. The display apparatus of claim 4, further comprising a second adhesive layer arranged between the display panel and the cushion layer.

9. The display apparatus of claim 4, further comprising a third adhesive layer arranged between the cushion layer and the plurality of supporters.

10. The display apparatus of claim 4, further comprising an encapsulation layer arranged over the first and second pixels, wherein the encapsulation layer comprises at least one inorganic encapsulation layer and at least one organic encapsulation layer.

11. The display apparatus of claim 10, further comprising a touch electrode layer arranged between the encapsulation layer and the cover window.

12. The display apparatus of claim 4, further comprising a controller configured to control the plurality of supporters.

13. The display apparatus of claim 4, wherein the plurality of supporters are arranged spaced apart from each other, and the cushion layer is arranged continuously between the display panel and the plurality of supporters.

14. The display apparatus of claim 13, wherein a position of the cushion layer is continuously changed according to discontinuous moving distances of the plurality of supporters.

* * * * *